FIP8102 XR 3,523,249

X2103M

X5220E

Aug. 4, 1970 A. C. PALATINUS 3,523,249

COMPLEMENTARY PAIRING OF ISB MODULATION AND ANALYSIS METHODS

Filed Feb. 8, 1968 22 Sheets-Sheet 1

INVENTOR.
ANTHONY C. PALATINUS
BY Ernest F. Weinberger
ATTORNEYS

INVENTOR
ANTHONY C. PALATINUS
BY Ernest J. Weinberger
Leon D. Cyzelel
ATTORNEYS

INVENTOR
ANTHONY C. PALATINUS
BY Ernest J Weinberger
Louis B. Applebaum
ATTORNEYS INVENTOR
ANTHONY C. PALATINUS
BY Ernest J. Weinberger
Leon B. Cyzgleba
ATTORNEYS INVENTOR
ANTHONY C. PALATINUS
BY Ernest J. Weinberger
Louis B. Applebaum
ATTORNEYS INVENTOR
ANTHONY C. PALATINUS
BY Ernest J Weinberger
[signature]
ATTORNEYS INVENTOR
ANTHONY C. PALATINUS
BY Ernest J. Weinberger
Leon D. Cogsdale
ATTORNEYS INVENTOR
ANTHONY C. PALATINUS
BY Ernest F. Weinberger
Leon B. [signature]
ATTORNEYS INVENTOR.
ANTHONY C. PALATINUS
BY Ernest F. Weinberger
Leon B. Coryllaban
ATTORNEYS

INVENTOR.
ANTHONY C. PALATINUS

BY Ernest J. Weinberger
Lon B. Applebaum
ATTORNEYS

Aug. 4, 1970 A. C. PALATINUS 3,523,249

COMPLEMENTARY PAIRING OF ISB MODULATION AND ANALYSIS METHODS

Filed Feb. 8, 1968 22 Sheets-Sheet 11

INVENTOR
ANTHONY C. PALATINUS
BY Ernest J. Weinberger
Lon B. Gzydela
ATTORNEYS

INVENTOR
ANTHONY C. PALATINUS
BY Ernest J. Weinberger
Leon D. Grylebar [signature]
ATTORNEYS INVENTOR
ANTHONY C. PALATINUS
BY Ernest J. Weinberger
Leon S. Gyzler
ATTORNEYS Aug. 4, 1970 A. C. PALATINUS 3,523,249

COMPLEMENTARY PAIRING OF ISB MODULATION AND ANALYSIS METHODS

Filed Feb. 8, 1968 22 Sheets-Sheet 14

INVENTOR
ANTHONY C. PALATINUS

BY Ernest J. Weinberger
Leon B. Cygler

ATTORNEYS

INVENTOR
ANTHONY C. PALATINUS
BY Ernest J. Weinberger
Leon B. Czyzlaba
ATTORNEYS INVENTOR
ANTHONY C. PALATINUS
BY Ernest J Weinberger
Leon B. [illegible]
ATTORNEYS INVENTOR
ANTHONY C. PALATINUS
BY Ernest J. Weinberger
Lon B. Cozzolino
ATTORNEYS INVENTOR
ANTHONY C. PALATINUS
BY Ernest F. Weinberger
Louis B. Applebaum
ATTORNEYS Aug. 4, 1970 A. C. PALATINUS 3,523,249

COMPLEMENTARY PAIRING OF ISB MODULATION AND ANALYSIS METHODS

Filed Feb. 8, 1968 22 Sheets-Sheet 19

INVENTOR
ANTHONY C. PALATINUS
BY Ernest J. Weinberger
Louis B. Applebaum
ATTORNEYS INVENTOR
ANTHONY C. PALATINUS
BY Ernest J Weinberger
Leon B. Czyzlak
ATTORNEYS

INVENTOR
ANTHONY C. PALATINUS

BY Ernest J. Weinberger
Leon B. Czyzewski (signature)
ATTORNEYS

Aug. 4, 1970 A. C. PALATINUS 3,523,249

COMPLEMENTARY PAIRING OF ISB MODULATION AND ANALYSIS METHODS

Filed Feb. 8, 1968 22 Sheets-Sheet 22

INVENTOR
ANTHONY C. PALATINUS

BY Ernest F. Weinberger
[signature]
ATTORNEYS

United States Patent Office 3,523,249
Patented Aug. 4, 1970

3,523,249
COMPLEMENTARY PAIRING OF ISB MODULATION AND ANALYSIS METHODS
Anthony C. Palatinus, Maspeth, N.Y.
(15 Rooney Court, Glen Cove, N.Y. 11542)
Filed Feb. 8, 1968, Ser. No. 704,092
Int. Cl. H04b 1/68; H04j 1/00
U.S. Cl. 325—49 6 Claims

ABSTRACT OF THE DISCLOSURE

This specification discloses the novel compositional pairing of methods of symmetrical independent sideband (ISB) communications, broadly identified as "oppositely offset phase symmetrical intermediate sideband modulation" processes, having confunctional properties associated with intermediate and oppositely offset in-common carrier signal generation techniques within the symmetric passband of a multi-channel ISB radio communications system.

In a related "Independent Sideband Transmission System," U.S. Pat. 3,217,256 issued Nov. 9, 1965, a pair of asymmetric channels for separate voice inputs are established utilizing an oppositely offset carrier system.

Two compatible modes of compositely paired intermediate sideband modulation processes, and the instrumentation thereof, are presented; wherein one mode associates an "intermediate quadrature modulation" (IQM) approach with a "hybrid intermediate phase shift" (HIPS) technique, and another mode integrates an advanced form of the "intermediate quadrature modulation" process with a "pure intermediate phase shift (PIPS) modulation operation. One of the two intermediate phase shift techniques coacts therewith through the "hybrid" form of intermediary phasing that produces undesired sideband cancellation by an unfolding of half-bandwidth products within a fully occupied band channel. The other intermediary phasing process results in suppression of the undesired sideband by full band cancelling properties. The latter procedure on a comparatve basis is termed a "pure" form, where the phase-filtering modulation approach features audio frequency carrier quadrature signals and in-path quadrature operations occur over an audio region of less than 2.5 to 1 frequency ratio.

A congruent in-common stage section designated as a "Pal Channelizer" provides for a plural adaptive link to a symmetric pass region transmission that effectively composes cofunctional pairs of intermediate sideband modulation into a multi-channel independent sideband output operation.

BACKGROUND OF THE INVENTION

This invention locates in the area of independent sideband, commonly designated ISB, communications for multi-channel, data link type operations. Thus this invention generally relates to the art of generation and transmission, and of reception and detection in the field of single sideband (SSB) communications. In particular, the present invention concerns methods of sideband modulation and the associated communications system instrumentation therewith, that mainly provide for the excitation and the demodulation of non-voice or data message information signals. Further, this invention considers pairs of symmetrical intermediate sideband modulation techniques wherein a plurality of sideband channels may be communicated simultaneously with each sideband channel content possessing differing data information but having a shared channel commonality for the signal path cofunctional operations.

Thereby this invention maintains a relation with the already established "Independent Sideband Transmission System," U.S. Pat. 3,217,256 granted Nov. 9, 1965 to this inventor. The relationship to the patent is with respect to the oppositely offset carrier signal generation operation made about an unaltered I.F. carrier signal reference of the overall transmission system.

With respect to the aforementioned copending patent application, the relationship thereto is founded upon the basic principles of the newly introduced modulation technique, designated therein as "Intermediate Quadrature Modulation" and abbreviated as "IQM." The nature of this mode of operation is essentially retained within the composite structure of this application but differs somewhat in that herein it is of fixed channel operation with its selectability factor removed, and further employs a different intermediate quadrature carrier reference frequency location.

The quadrature select, multi-channel independent sideband (MC–ISB) demand matched radio communication system described in the aforementioned copending patent application initiates a method of "intermediate quadrature modulation" (IQM) that possesses no limitations in achieving its stated objectives. However, a degree of inflexibility toward data channel handling capacity is present since but a single symmetric data link transmission channel is in effect at one time; though advantageous election and selection between the carrier adjacent inboard channels is uniquely provided. Note as pointed out therein, that a duality of in-line signal processing stage use produces a pair of "IQM" channel modes as suitable for two channel ISB data transmission operation.

DESCRIPTION OF PRIOR ART

The limits and faults encountered by the prior art methods of sideband type communications have been extensively delineated in the above mentioned copending patent application and particularly so where non-voice or data type information transmission is involved.

The detailed background material for prior art methods for SSB communications as given therein is likewise pertinent to the present communications system invention. In particular the long recognized wideband phase shift of the conventional phasing type system, generally referred to as the "phase shift" method, is given further examination herein, with paramount consideration directed to the subsequent removal of this obstacle. For example, U.S. Pat. 3,225,316 issued Dec. 21, 1965 to W. Saraga of England advances a phase shift SSB generator that relies upon obtaining a wideband (11.1 ratio) in-path quadrature ($\pi/2$) phase shift.

In passing through communication networks, nearly constant envelope delay over the electrical bandpass region is desired, where pulsed sinusoids, steep-front modulation envelopes and other complex waveforms of modern telecommunications are the information bearing signals. A constant envelope delay is expressed as a linear phase shift variation with frequency, and the time delay itself is defined as the phase-frequency characteristic slope or the mathematical derivative of phrase with respect to frequency.

In general, prior art filter and phasing techniques for SSB generation and reception in voice communications direct little attention to phase or time delay distortion effects on the modulating signal envelope. However, where it is required to transmit signal waveforms that do not tolerate phase distortion, the filter delay characteristics need to be compensated. To accomplish data type signal processing, with data designated as electrical signal possessing encoded information, symmetric and thus constant delay filters are found necessary. Experience shows that asymmetrical sideband filters of either piezo crystal or mechanical resonator type naturally encompass complex electro-mechanical coupling energy modes; due to resonance properties that carry vibrational interactions, which therefore becomes most difficult to realize as being of constant time delay. Note is to be made that the spurious and secondary response effects of such asymmetrical filters are recognized as limiting; and in the present art of asymmetrical filter paths, non-uniform delay responses develop. Hence the providing of a MC–ISB Communication System technique that accurately preserves complex waveforms in all independent channels is urgently required to overcome such deficiencies. Thus it is desired to retain the many featured advantages of "IQM" method and yet bring forth greater utilization as required for reliable long distance message interchange of differing information over a multiple of data link channels; where data link herein concerns the signal transmission line between the sending data terminal and the medium through which it is carried to the receiver.

In addition, more recent prior art multi-channel applications of other SSB modulation techniques such as found in "Multi-Channel Electric Wave Signalling Apparatus," U.S. Pat. 3,259,692 granted July 5, 1966 to John F. H. Aspinwell of England, become the state of the art. With respect to this reference and as stated in the specification of my copending patent application, system implementation for multi-channel ISB operation of such prior art SSB techniques necessitates the full duplication of all the in-signal path stages for use in the multiple signal processing of each channel; and this relevant approach tends to be an excessive repetition of great cost and high complexity. Furthermore, other prior art solution for the development of such multi-channel signalling systems, the above Aspinwell patent reference being but one typical example thereof, usually also resort to a four times duplication of a same and normally know sideband method of generation that results in little economy of in-signal path stage use. However, where waveform message handling becomes a consideration, the in-path signal processing stages are then to be of the linear phase-frequency characteristic type, and thus obviously more valued than where a functional stage serves merely voice traffic alone. Hence, a reduction of such in-path stages becomes significant, even where an increase of needed stages for the carrier signal generation is exhibited. This becomes more evident when it is realized that the in-path stages accommodate a band of signals while the carrier generation operations are of the single frequency type.

Considered most worthwhile to future progress of the communications field is the ready conduciveness of an ISB modulation system to the art of miniaturization. With the recent arrival of the areas of microelectronics and integrated circuitry, best stage suitability to the manufacturing process techniques germane thereto for large scale integration (LSI) is a prized objective, rather than merely the number of stages in use. To this extent, avoidance of mechanical or crystal asymmetric filtering is a proper choice, particularly so as compared to symmetrical network circuitry of usable linear phase versus frequency characteristics pass region upon which attention is primarily centered for the multiple channel modulation methods of this invention.

The modern need for a full bandwidth phase coherent communications operation is evident when one examines prior art system of frequency multiplex using other SSB modulation techniques. Present practice for a 4 K c.p.s. channel spaced data link has a net usable 3 K c.p.s. channel for voice purposes extending from about 200 to 3200 c.p.s., but only provides a phase coherent transmission path as required for data system use limited to the symmetrical 2 K c.p.s. centerband portion of about 800 to 2800 c.p.s.

Observe that independent sideband (ISB), by definition infers a minimum of two channels, and in general, a multi-channel ISB operation normally associates with more more than two channels; the usual case being four. While the duplication again of the two channel "IQM" arrangement referenced to other appropriate frequency locations produces the multi-channel (MC) system, a superficial examination reveals no particular advantage or further innovation is obtained therefrom, and such an effort appears to exhibit the faults and limitations of the above referenced prior art example. Herein a like result will be shown to develop for a simplified "oppositely offset carrier generation" system of independent sideband modulation that may couple with the "IQM" method. However, this given process, as set-up, is an exploratory type example and the deficiencies deduced therefrom indicate direction of search for a more operational compatible path from which cofunctional use can be attained.

Thus, it oftentimes develops that the repetition of the signal processing, differing only in the handling of another specified band, does not always subsequently result in providing an optimum overall communications system operation. With this awareness in mind, then a more fulfilling investigation of the underlying principles related to the nature of intermediate phasing ISB type modulation is undertaken on a unified objective basis to satisfy the not too subtle problem of prior art communications. Theoretical consideration of advantageous performance features to be acquired leads to methods of symmetrical ISB communications that incorporate with "IQM" in either one of two novel modulation modes; wherein new intermediate operations differing from "IQM" are revealed with full value.

SUMMARY OF THE INVENTION

First, let it be understood that the implemented "IQM" method as priorly disclosed functions best in the fulfillment of a vacated bandslot within the multiplex-multichannel demand matched ISB communication system structure to which it is initially addressed. The further novel modulation methods of this instant invention do not by themselves possess such a distinct capability. However, the "IQM" method achieves a greater scope of application herein.

Second, where a greater number of added stages are to be put to use, the achievement of greater functional results and more flexible performance needs to be justified for the operational conditions that apply. Thusly, a more than comprehensive examination of the associated systematic circuits arrangements embodied through the instrumentation of the new intermediate phasing ISB modulation methods under evaluation must be made. In this respect, it is best to direct the signal analysis towards uniting the intermediary phasing functions with a common property congruent to the disclosed communications approaches being jointly advanced in the generation of a pair of sidebands. Thereafter a duplicate process results in the second sideband pair of a four channel system.

Within the broad context, the novel pair of symmetrical ISB communication methods, coupled with the already established "IQM" method in a compatible and composite manner through the functional complement of "intermediate and oppositely offset in-common carrier" signal generation, identifies the combinational complex as integrated signal processes of "oppositely offset phase symmetrical intermediate sideband modulation." In exploring a newly evolved field of symmetrical ISB operation, at times the prior art abbreviations fail to properly indicate the meaning of the specific uniquely derived action at first contemplation. To avoid conflicts resulting from this inadequacy and to allow not too cumbersome explanations of the ever increasingly involved systematic embodiments that are to follow in this specification, appropriate abbreviations for the various differing signal process techniques are freely taken throughout. Thus, the communications area of "oppositely offset phase symmetrical intermediate sideband modulation" may be conventionally reduced by abbreviation to "OOPSISM"; and at points herein, reference with such designation is to be made.

The family pair of "intermediate phasing ISB" excitation systems, while related and of primary concern within this specification, are distinguished from each other in that each one distinctly possesses a definite characteristic unique into itself. Generally, the encompassing connotation of "intermediate phase shift" modulation, appropriately abbreviated as "IPS" in keeping with the priorly established "IQM" designation for "intermediate quadrature modulation," is applicable in the classification of these two modulation procedures. However, a substantial and significant difference of signal processing that serves to separate the fundamental nature of these two "intermediate phasing modulation" techniques is noted. In this respect, the signalling relationships that occur in what is being termed a "direct IPS" channel path operation is quite similar for the pair of modulation methods. But, a sharp conceptual departure focusses therebetween in the functioning of the so-called "translation IPS" channel path; wherein a further, and therefore "an intermediate," modulation process is established prior to the final modulation operation.

This is more clearly noticed when the "IPS" signal processing principles are first shown integrated into a compatible duo-modulation pattern within the already disclosed operational capabilities of "intermediate quadrature modulation" (IQM) as revealed in the aforementioned copending patent application for a featured factor case of $n$ equal to two between the mid-base band frequency signal and the "intermediate carrier" signal. Hence, a interfunctional combination between the basic natures of the "IPS" and the "IQM" methods develops; and observed to be the consequence thereof, one modulated sideband output of this type "translated intermediate phase shift" path results in one sideband structure possessing "half bandwidth unfolded" information content. This is recognized in the generation of a half-bandwidth modulation content that produces double sideband modulated products within a channel bandwidth in one final modulator output. Thereafter, one of the unfolded band products is phase cancelled in a difference combining by the "direct IPS" band modulated output of the other final modulator in use. Thereupon, the remaining products terms of the unfolded band become the transmission systems information channel output of an overall ISB operation.

Thus, the first initiated method of "IPS" operation is embodied with aspects of "unfolded in-path phasing" and "quadratic function" action, whereby the mixture of the two ingredients results in what is suitably referenced as a "Hybrid intermediate phase shift" modulation technique, which at times hereinafter is conveniently abbreviated as "HIPS."

In the embodiment of a second "IPS" modulation approach, an in-line phasing operation exists, and the system deals with the full bandwidth spectrum content throughout. In formulating a revealing utilization thereof, further innovation leads to the general "intermediate quadrature modulation" technique of the aforementioned copending application being implemented with the $n$ factor case now advanced to the value three. Accordingly thereby, a band slot in the "translated intermediate phase shift" channel path is occupied, and thereafter carried forth into the final modulation process. Of the resultant double sideband products of concern in this "IPS" process alone, at the final modulator outputs in a substractive manner, one product band phase cancels; while the remaining band products of interest are in phase and reinforce themselves. As such, this full band shifting action is more aptly designated as "pure intermediate phase shift" modulation, wherein the abbreviation as "PIPS" is to be used for purposes of convenience.

Though each "IPS" technique as applied produces the essential data channel "symmetrical independent sideband modulation," or "SISM" as abbreviated, the first and hybrid communications system operation as described herein continues to perform in conformance with the multi-channel (four) independent sideband (MC-ISB) capabilities of my copending patent application but now all being of data handling type. Therefore, the second and pure communictions system operation is conveniently presented to center on a two channel output only capacity with "quadruple mode" featured as outlined herein. In general, and without particular restrictions made thereto, either one of the described pairs of "IPS" modulation methods can be singularly put in use; as also found to be the case for the "IQM" technique of the copending application. Likewise, the four channel "hybrid" embodiment of this invention can function as a two channel output operation and of course, the two channel "pure" embodiment of this invention can be neutrally enhanced to produce four channel operation by duplication of the systematic arrangement thereof where desired. The interlaced commonality of the paired "HIPS-IQM" or "PIPS-IQM" intermediate sideband modulation processes is demonstrated.

In this integrally composite area, the most profound results are secured whereby a duo-modulation combinational means possessing a congruent in-common functional status accommodates a compatible family of interchannel modulation signals with phased carrier relations that formulates the structural translation of the information bands in a multi-channel ISB communications operation. In establishing the plural access to the symmetric pass region of a transmission line process for channelizing cofunctional pairs of intermediate sideband modulation, the singularly structured and compositionally shared sub-secton is termed a "plural access line channelizer," abbreviated as "pal channelizer," and the utilized action that results is appropriately categorized as a "pal channelizer pairing" operation, the full-import of which becomes clearer from the technical description that follows.

This invention is directed toward improvement of the overall effectiveness of utilization of the electromagnetic spectrum. Accordingly, the stated general objectives given in the specification of the aforementioned copending patent application apply hereto as pertinent to the overall modulation methods and ISB communications systems of the instant invention.

A broad object of this instant invention is to enhance upon, and uniquely extend the performance features of the basic intermediate quadrature modulation properties first presented in aforementioned copending patent application with two novel methods of intermediate phase shift modulation; and producing therefrom a pair of compositely integrated duo-modulation communications systems. It is thus the object of this invention to introduce the establishment of versitile, flexible, reliable methods for bi-directional data links in long range multiple data ISB communication channel operations.

Another object is to furnish additional traffic handling capability for a communications system that allows support of multi-ISB channels in the high frequency range and having information sideband capabilities of two upper sideband channels and two lower sideband channels (denoted as two outboard sideband channels and the two inboard sideband channels) of symmetrical type; and simultaneously providing the selectability of combining either pair of the four located channel bands as an intermediate quadrature modulated channel and an associative intermediate phase shift modulated channel.

A further object of this invention is to provide paired "intermediate sideband modulation" methods, and the instrumentation therefor, wherein in one mode associated with "intermediate quadrature modulation" operation is a hybrid form intermediate phase shift technique that cancels undersired sideband by way of an unfolded half-bandwidth procedure and in another mode associated therewith is a full bandwidth unwanted sideband cancelling approach functioning as a pure intermediate phase shift process.

It is also an object of this invention to combine and channelize cofunctional pairs of intermediate sideband modulation by providing plural access to a transmission line of symmetrical pass region having stage commonality conducive to large scale intergration; with such group composition producing therefrom two independent sideband channel outputs, either as an upper and lower sideband pair or as pairs of either upper or lower sideband.

Still another object of this invention is to provide the method and means for a multi-channel ISB communications system wherein the carrier quadrature signals are at audio frequency and the in-path quadrature operations occur over the audio region of less than 2.5 to 1 frequency ratio.

As with all methods directed to the movement of information, the scope of a new modulation approach is of the broadest consideration, and basic pair of preferred intermediate sideband modulation embodiments are featured herein.

It is not difficult to appreciate that the above stated objectives are not easily achieved. However, in accord with the principles of this invention, the factually disclosed and significant signal process techniques reveal applicable results whereby the advantageous goals are attained.

Realization of the clear value derived from the resultant operational techniques founded upon the innovations originating herein will come into sharper focus in the light of the forthcoming discussion of the new modes of communication. As may be reasoned from the following description, other objects and advantages of this invention will become evident and the uniquely distinct features will be particularly pointed out in the appended claims.

BRIEF DESCRIPTION OF PREFERRED EMBODIMENTS

Figure 1:
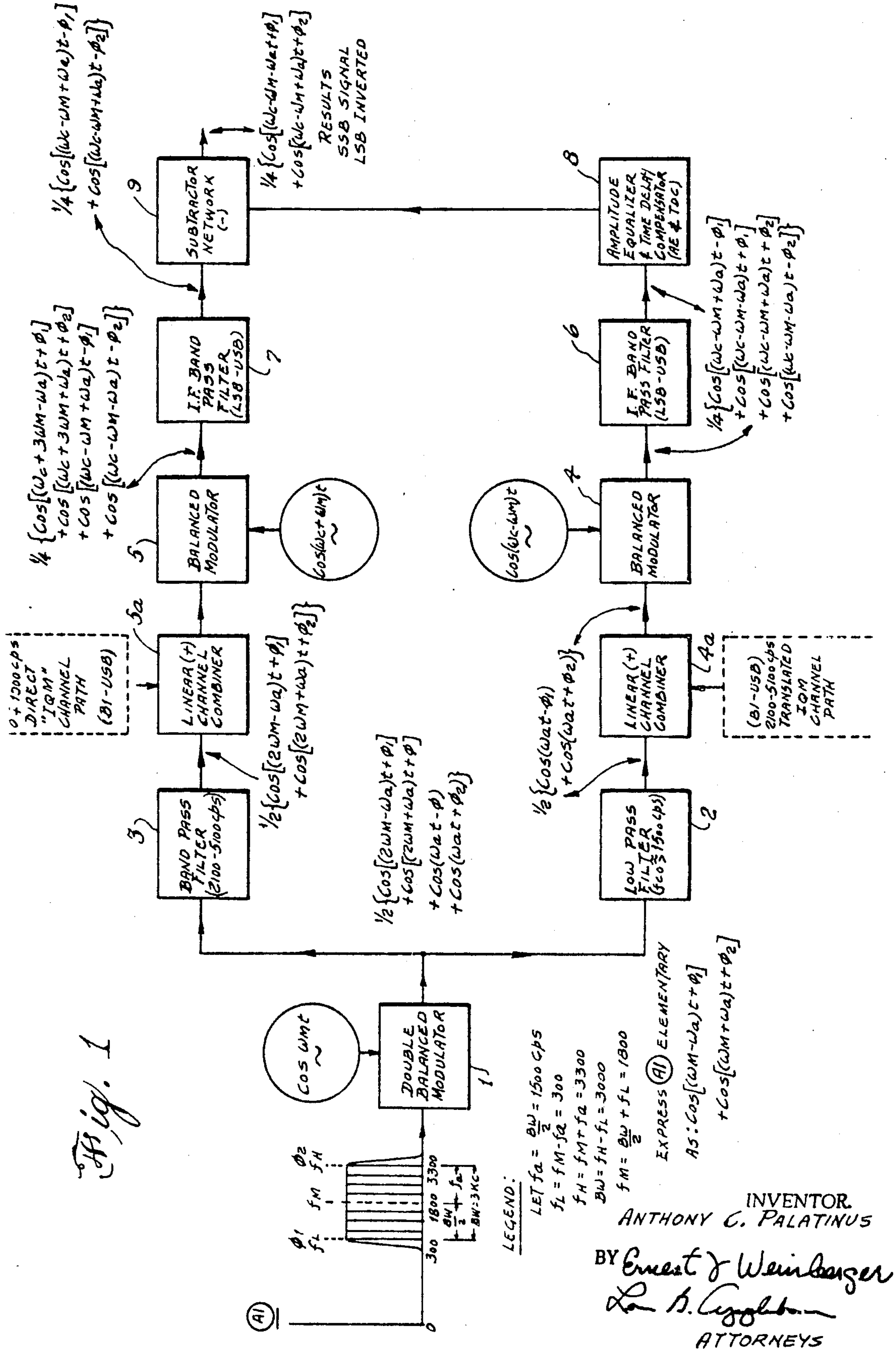
FIG. 1 is a simplified block diagram of an embodiment that examples the half-bandwidth principles in composite operation with the "intermediate quadrature modulation" channel generation.

With respect to all of the following description, trigonometric identities are defined as:

$$\sin A \sin B = \tfrac{1}{2} \cos (A-B) - \tfrac{1}{2} \cos (A+B)$$
$$\cos A \cos B = \tfrac{1}{2} \cos (A-B) + \tfrac{1}{2} \cos (A+B)$$
$$\sin A \cos B = \tfrac{1}{2} \sin (A+B) + \tfrac{1}{2} \sin (A-B)$$
$$\sin A \cos A = \tfrac{1}{2} \sin 2A$$
$$\operatorname{Cos}\left(A-\frac{\pi}{2}\right) = \sin A \text{ and } \sin(-A) = \sin A$$

The disclosure of the aforementioned copending patent application serves in its entirity as an integral support of this present specification. However, in the main, the referenced material therein need not be examined in detail except at points where further explanations are deemed necessary for a complete understanding of this application.

Because of such related background documentation and specification material as associated with the novel implementation of the "IQM" method alone, now fully "symmetrical intermediate sideband modulation" technique presents the pertinent descriptive information that most concerns the substantially unique and differing signal processing involved.

Wherever possible, the symbolic representations, analytic expressions, reference characters, and block diagram illustrations of the example circuits arrangements are maintained in consonance with the prior indications used in the specification of the reference copending application.

EXPLORATORY INTRODUCTION: FIG. 1

The techniques of intermediate sideband modulation are founded upon the further novel use of an oppositely offset carrier generation system such as presented in the aforementioned patent issue No. 3,217,256 of Nov. 9, 1965. A directly extended manner of such carrier operation that initially exploits the nature of the so-called half-bandwidth action in a modulation process is illustrated by the essential circuit elements of FIG. 1.

The FIG. 1 embodiment does not engage in an "intermediate sideband "processes; and as will be pointed out, it is a digression formulated to elucidate the novel features of this invention. This aiding practice is taken for a dual purpose. One purpose, is to serve as an exploratory vehicle for a clearer understanding of the involved operational processes that follow with the fully enhanced methods of "oppositely offset phase shift intermediate sideband modulation"; the other object being to demonstrate the value of the distinct departures that herein illustrate the intermediate carrier implementations which comprise the family of intermediate sideband modulation arrangements characterized by this invention.

As fully detailed in the aforementioned copending patent application, the "intermediate quadrature modulation" (IQM) operation for the inboard B1 signal input with the design case factor of $n$ equal to two, embodies an oppositely offset carrier generation system of $\cos W_Mt$, $\cos (W_c-W_M)t$ and $\cos (W_c+W_M)t$ signals, along with the intermediate carrier signal of $\sin 2W_Mt$. For simplicity in this introductory example of FIG. 1, only the symbolic encircled sine wave designation of the supplied oppositely offset carrier signals are shown.

Consider then the illustrated circuits arrangement of FIG. 1 comprising double balanced modulator (DBM) 1, low pass filter (LPF) 2, bandpass filter (BPF) 3, a pair channel combiners 4*a* and 5*a*, a pair of balanced modulators 4 and 5, a pair of I.F. bandpass filters 6 and 7, time delay compensation and amplitude equalization 8, and subtractor circuit 9.

It has been the convention of prior art communications analysis to carry forth the mathematical relationships with respect to an entire audio input band, as expressed by the complex signal representation of $$e(t)=\sum_{n=1}^{n} E_n \cos (W_nt+\phi_n)$$

A departure from this approach wherever half-band width operations exist is taken for best understanding the physical actions that result in quadratic function processing. In effect, the baseband end points are individually carried forth in the mathematical analysis and the modulating voice signal components that develop between the band terminations and the baseband center undergo signal processing in a like manner; with the designated D.C. coupling of modulator inputs allowing transmission of terms at the mid-band locations.

Therefore, consider the following two frequency signal method of examination. Let one frequency term be designated $f_L$ as the lowest modulating tone and this term further represents all audio terms developing below the mid-frequency value of the audio input spectrum band. Let the other term be $f_H$ and represent the highest frequency and all frequency components that then develop above the mid-band frequency of $f_M$.

In FIG. 1, the operational steps therein are located by the associated analytical designations. At the application input, let the audio band A1 signal input be generally expressed simply as:

$$\{\cos [(W_M-W_a)t+\phi_1]\}+\{\cos [W_M+W_a)t+\phi_2]\}$$

where $(W_M-W_a)=W_L$=lowest frequency modulating signal input, and $(W_M+W_a)=W_H$=highest frequency modulating signal input. The bandwidth of input band A1 then becomes $BW=(f_H-f_L)$ with a mid-band frequency of $f_M=(BW/2+f_L)$, where $(BW/2=f_a)$. Hence, the two band frequency extremes are carried forth in the following analysis, and are referenced with respect to the mid-frequency $f_M$ of the band. In actual data or voice modulation, the above tones, along with simultaneous and/or random tones occur within the band region. Accordingly, each and every tone that appears at any moment of time may be treated in the similar analytic manner; and the elementary relationships given below properly exemplify the nature of the modulation process involved and demonstrate the subsequent results of the described operation.

The band of information signals A1 is supplied to the modulating signal input of double balanced modulator 1.

The mid-base band frequency signal of $(\cos W_Mt)$ is supplied to the carrier signal input of double balanced modulator 1. A product operation results in the double sideband suppressed carrier output as $$\tfrac{1}{2}\{\cos [(2W_M-W_a)t+\phi_1]+\cos (W_at-\phi_1) +\cos [(2W_M+W_a)t+\phi_2]+\cos (W_at+\phi_2)\}$$

The output of double balanced modulator 1 connects over one path to low pass filter 2, which has its cutoff frequency slightly greater than $f_a$; and over a second path to band pass filter 3, which has its band pass region located between $(2f_M-f_a)$ and $(2f_M+f_a)$.

Accordingly, low pass filter 2 passes only the lower sideband or difference frequency terms of $$\tfrac{1}{2}\{\cos (W_at-\phi_1)+\cos (W_at+\phi_2)\}$$

at its output, and readily suppresses all other frequency components, Bandpass filter 3 allows passage of only the upper sideband or sum frequency terms of $$\tfrac{1}{2}\{\cos [2W_M-W_a)t+\phi_1]+\cos [2W_M+W_a)t+\phi_2]\}$$

and rejects all other product terms.

The output of low pass filter 2 connects to the modulating signal input of balanced modulator 4 via a linear channel combiner 4*a*. Bandpass filter 3 output feeds in the modulating signal input of balanced modulator 5 upon passage through a linear channel combiner 5*a*. The pair of channel combiners 4*a* and 5*a* are shown in order to relate this present modulation approach in compatible operation with the featured "intermediate quadrature modulation" technique of the aforementioned copending application. At this point, discussion of the channel combiner operation is omitted, and only the signal analysis pertaining to the illustrated stage functions are examined.

Balanced modulator 4 is receiving the I.F. offset carrier signal $[\cos (W_c-W_a)t]$ while the I.F. offset carrier signal $[\cos (W_c+W_a)t]$ is supplied to the carrier signal input of balanced modulator 5. For balanced modulator 4, the double sideband suppressed carrier output becomes:

$$\tfrac{1}{4}\{\cos [(W_c-W_M+W_a)t-\phi_1]+\cos [(W_c-W_M-W_a)t+\phi_1]+\cos [(W_c-W_M+W_a)t+\phi_2]+\cos [W_c-W_M-W_a)t-\phi_2]\}$$

The product operation resulting from the inputs to balanced modulator 5 produces an output expressed as:

$$\tfrac{1}{4}\{\cos [(W_c+3W_M-W_a)t+\phi_1]+\cos [(W_c-W_M+W_a)t-\phi_1]+\cos [(W_c+3W_M+W_a)t+\phi_2]+\cos [W_c-W_M-W_a)t-\phi_2]\}$$

Balanced modulator 4 applies its output to I.F. bandpass filter 6, while the output of balanced modulator 5 is connected to I.F. bandpass filter 7. The pair of I.F. bandpass filters 6 and 7 are identical, having a center frequency value of $f_c$ and flat amplitude response symmetrical phase-frequency characteristics over their bandpass region $[f_c\pm(f_M+f_a)]$, that is, of twice bandwidth of the input band.

I.F. bandpass filter 6 passes both sum and difference signal outputs of balanced modulator 4, while I.F. bandpass filter 7 allows passage of only the difference frequency terms of balanced modulator 5, and fully suppresses the sum products of:

$$\{\cos [(W_c+3W_M-W_a)t+\phi_1]+\cos[(W_c+3W_M+W_a)t+\phi_2]\}$$

The output of I.F. bandpass filter 6 is supplied to time delay compensator and amplitude equalizer stage 8, which is predetermined to accommodate for time delay and amplitude discrepancies between the pair of I.F. bandpass filter outputs. Since the presently described embodiment is used primarily to illustrate the essence of the relationship to the prior mentioned efforts, and raises some confliction, a more exacting description of the AE&TDC stage 8 operation is delayed till later in this specification.

The corrected output of the time delay compensator and amplitude equalizator (TDC & AE) 8 is connected to one input of the linear subtractor network 9. The other input of the linear subtractor 9 is supplied from the output of I.F. bandpass filter 7. In the combining operation therein, the resulting output of linear subtractor 9 becomes:

$$\tfrac{1}{4}\{\cos[(W_c-W_M-W_a)t+\phi_1] +\cos[(W_c-W_M-W_a)t+\phi_2]\}$$

Whereas the modulating band inputs to the final pair of common modulators 113 and 213 are of the same frequencies as those derived by way of the "IQM" method, in this example case, sideband reinforcing does not occur and therefore sharper filter action is required of the unsuppressed and undesired sideband components.

Clearly, a single sideband output results. But, note it is inverted with respect to the system reference carrier $f_C$, developing in the lower sideband region thereto; with the USB content reserved for a B1 information signal input handled by way of the "IQM" method delineated in the aforestated copending patent application. Thus, the modulation technique of FIG. 1 is so far observed to be incompatible with the "IQM" method as shown.

Accordingly, to be compatible therewith, the direction of delay must be synonymous with the "IQM" method. The elements of this simple example case do not possess the key ingredients for composite operation.

Figure 2A:
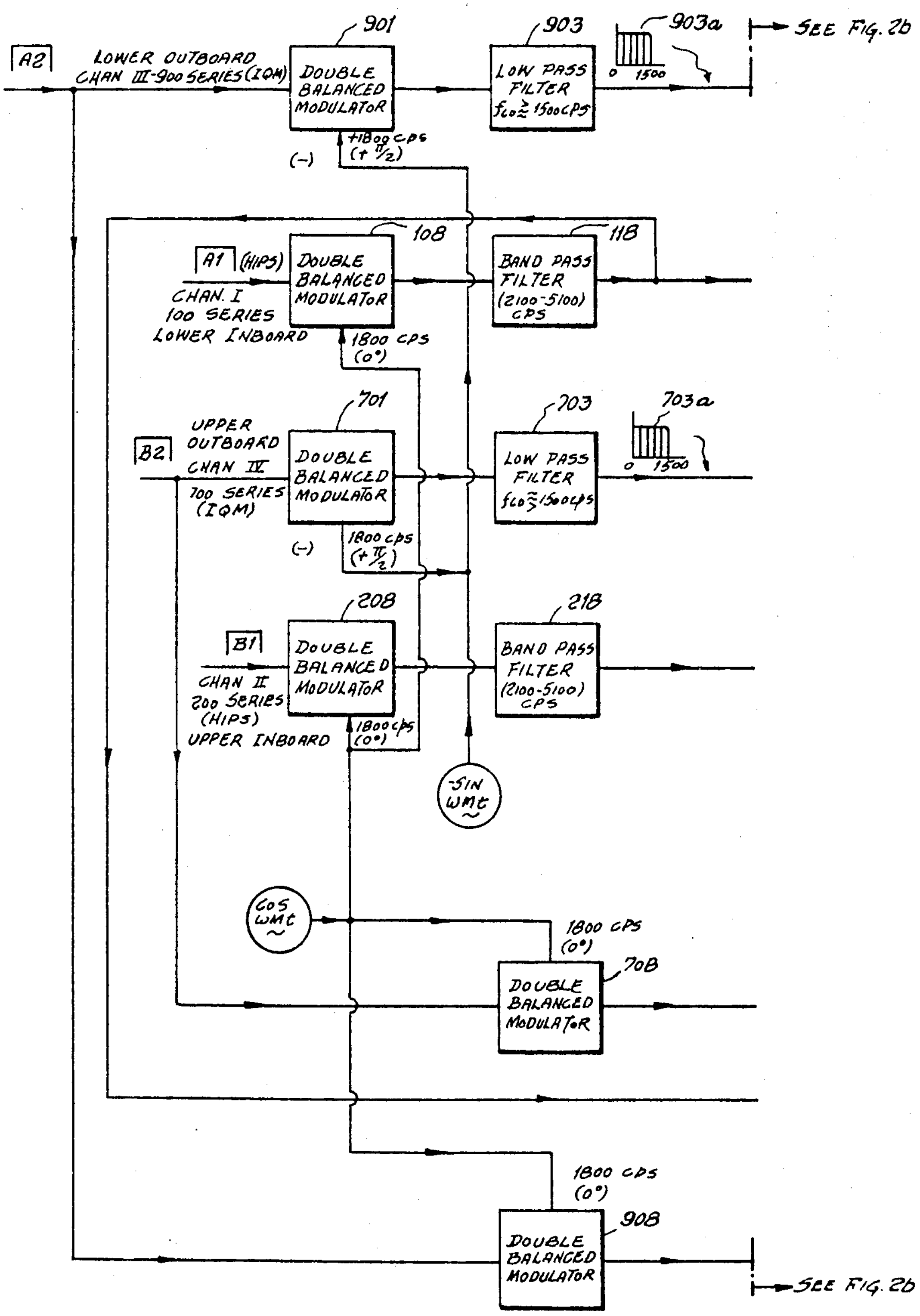
FIGS. 2*a*, *b* and *c* are elementary overall block diagrams of one embodiment of a "Symmetrical Multi-Channel Independent Sideband Communications System" made in accordance with the principles of this invention; wherein a pair of inboard channels are produced by a "hybrid intermediate phase shift" technique and the remaining pair of outboard channels generated by way of "intermediate quadrature modulation."
Figure 2B:
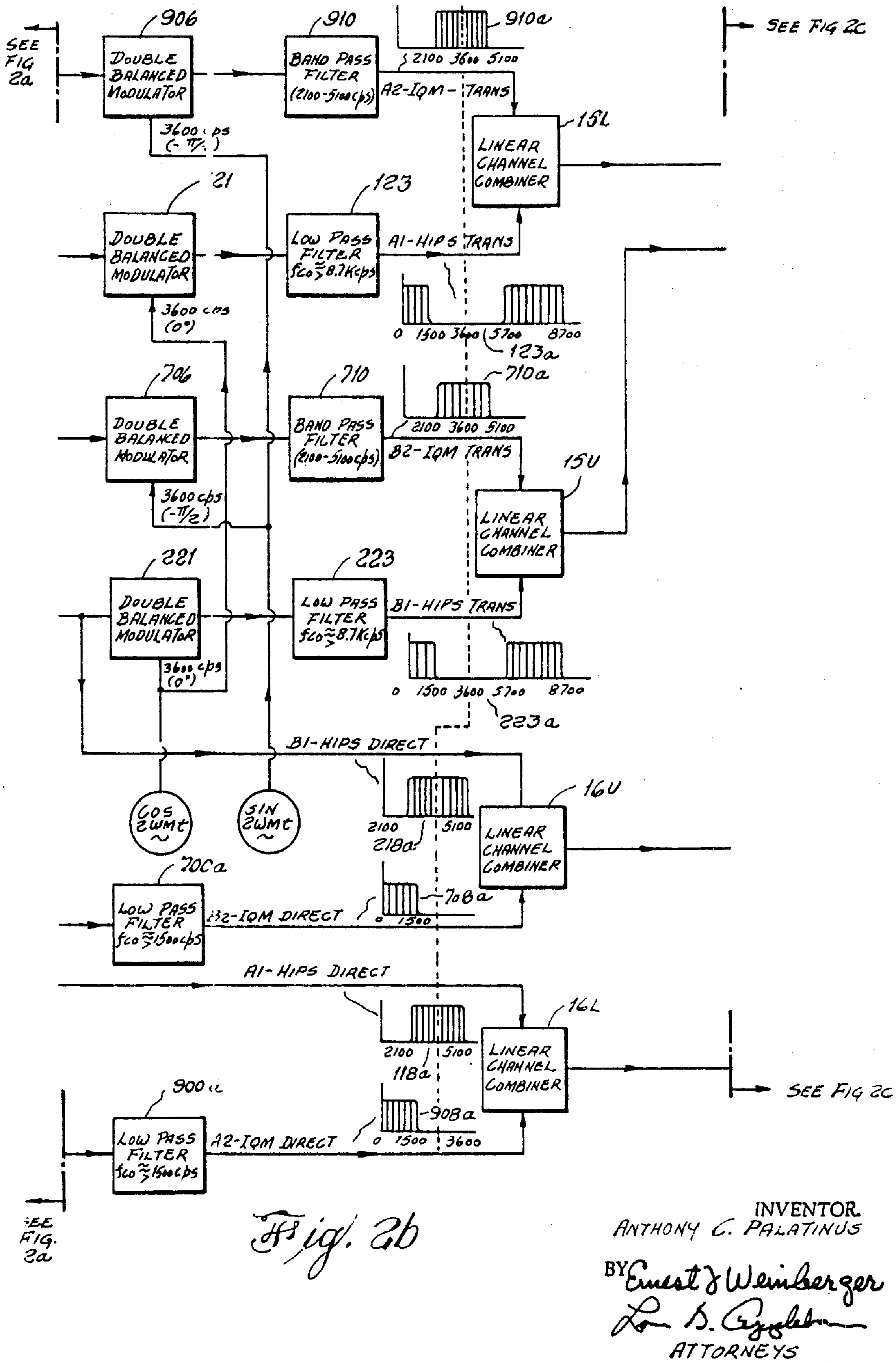
Figure 2C:
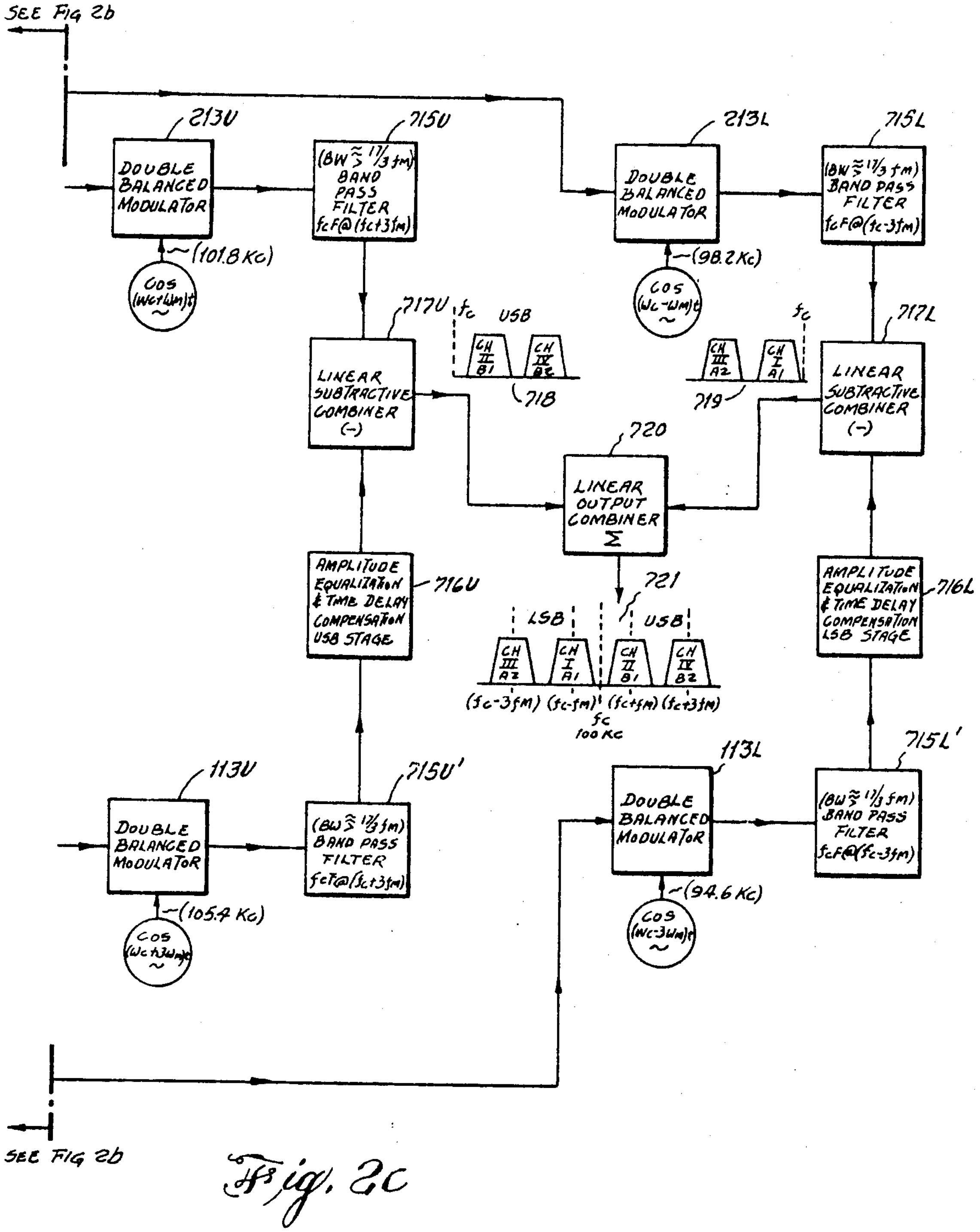

Let the mathematical analysis suffice for the moment since a more detailed examination of the type elements of the FIG. 1 is reserved for the proper understanding of the usable half-bandwidth as given in the immediately ensuing description of FIG. 2 within a unique method of modulation.

Indeed, the new concept of phase cancelling one sideband of the double sideband product that develops from a half-bandwith (0–1500 c.p.s.) folded over modulating signal is retained, but prior natural occurance of this action resulting in sideband inversion is eliminated. Further, the more readily removal of undesired sideband content is obtained along with full "optimum" compatability to composite operation with the typical circuits arrangement implementing the "IQM" method of the related copending patent application.

However, this half-bandwidth technique so far demonstrated can be applied as the replacement of the "IQM" method in the communications system of the aforementioned copending application, and at times, may be integrally coupled therewith in a four channel system as will be pointed out later.

DESCRIPTION OF FOUR CHANNEL ISB SYSTEM "HIPS"—IQM $n=2$; FIG. 2

This specification now mainly concerns a form of "intermediate phase shift" modulation incorporated with the prior disclosed "IQM" method of the aforementioned copending application for the factors case of $n=2$. The multi-channel symmetrical ISB system illustrated by the FIG. 2 embodiment encompasses the pairing of an "IPS" inboard channel modulation technique with the basically featured "IQM" method for outboard channel operations, and constitutes a "hybrid" arrangement which formulates an introductory intermediary communications system transmission approach.

To fully illuminate the multi-channel circuit structure, the prior "IQM" stages and the required additional stages for the "hybrid intermediate phase shift" technique are included within the four channel ISB system of FIG. 2. The circuit arrangement for the "IQM" operation remains essentially the same, in the handling of A2 and B2 channel input information bands for the development of the outboard lower and upper sideband outputs, as shown in the copending application.

The "hybrid" IPS operation here concerns the processing of A1 and B1 channel input information bands for producing inboard lower and upper side-band outputs.

Refer now to FIG. 2 where fram a message supply center, not shown, the designated band signal inputs of A1, B1, A2 and B2 are simultaneously supplied to the modulation inputs of the transmission system output channels I, II, III and IV respectively. For this illustrative example, the audio range of interest is again from 300 c.p.s. to 3300 c.p.s. for a channel bandwidth of 3000 c.p.s. but in general differing bandwidths can be provided in any specific design application As is conventional in a symmetrical four ISB channel system, the pair of independent channels adjacent to the system reference carrier location are termed as "inboard" channels, while the most remotely positioned pair of channels are referred to as "outboard."

The term "symmetrical" as used herein applies in particular to the phase-frequency characteristics of the in-signal path filtering operations, which are linear and therefore representative of a symmetrical pass region over the bandwidth of interest.

In the audio processing stages, the numerically itemized 900 series circuit blocks handle the A2 band input for the lower sideband (LSB) outboard Channel III output and 100 series stage elements process A1 band signal for producing the inboard LSB Channel I output. For USB, the 200 series items concern the generation of the remaining inboard "B1–USB" Channel II output and the remaining outboard USB Channel IV output is obtained by providing the B2 information band processing thru the 700 numbered series elements.

The 900 numbered in-path stages are like the 700 series items in the generation of the LSB–USB outboard channel pair by way of "intermediate quadrature modulation" (IQM) for an $n$ factor of two. The 100 itemized stages are like in the 200 series elements in the generation of the LSB–USB inboard or most adjacent to carrier pair that is herein first disclosed implementing the "HIPS" modulation technique.

Within this four-channel ISB communications system, the manner of generating the two pairs of oppositely offset I.F. local oscillators signals is itself made in an added offset action for each of the pair of carrier signals to establish an USB pair and an LSB pair of symmetrical channel outputs about the transmission system's I.F. carrier reference value, which is again set to be 100K. c.p.s. Likewise, in view of the same bandwidth use, the mid-base band carrier signal frequency remains $f_M=1800$ c.p.s.

In the FIG. 2, the signal generation system for the required audio carrier signals of $W_M$, $2W_M$ and $3W_M$, along with the development of the pairs of I.F. offset carrier signals of $(W_c\pm W_M)$ and $(W_c\pm 3W_M)$, is not shown. For the moment, the symbolic encircled sine wave designations again refer to the carrier signal source and the actual generation and supply thereof is discussed in detail in the description of the FIG. 4, wherein a typical generation system is illustrated.

Consider now the particulars of the 200 series elements, along with the 100 series elements given in parenthesis, for the Hybrid IPS method, where the first translation operation and the subsequent 2100 to 5100 c.p.s. direct in-path bandpass process remains the same as in FIG. 1. For the direct HIPS channel procedure in the case of B1 (A1) band input, the offset carrier signal to the double balanced modulator (DBM) 113U (113L) is of $$\cos(W_c+3W_M)t \text{ (or } [\cos(W_c-3W_M)t])$$

form.

In the translated HIPS channel, the hybrid intermediate sidebanding operation is brought about with the intermediate quadrature carrier signal injection ($\cos 2W_Mt$) of 3600 c.p.s. This frequency is likewise required but of sin form for the "IQM" translation channel operation. Thereafter, the final offset carrier signal supplied to DBM 213U (213L) is of the form $$\cos(W_c+W_M)t \text{ [for } LSB, \cos(W_c-W_M)t]$$

DBM 208 (108) receives band signal input B1 (A1) and carrier signal input $\cos W_Mt$. The resulting double sideband output of DBM 208 (108) is fed to bandpass filter 218 (118) which, having a bandpass region of 3000 c.p.s. between 2100 to 5100 c.p.s. of linear phase-frequency characteristic, passes unattenuated the information in the upper sideband or sum products and readily rejects the lower sideband or difference frequency products. The output of BPF 218 (118) is applied over two paths, one path feeding the modulating signal input of DBM 221 (121) and the other path connecting to one of the two inputs of linear channel combiner 16U (16L). This latter path is designated as B1 (A1) HIPS DIRECT, and spectrum sketch 218*a* (118*a*) illustrates the carrier signal content.

DBM 221 (121) receives the intermediate carrier signal $\cos 2W_M t$.

The sideband output of DBM 221 (121) is like that of DBM 208 where the lower sideband content location again takes place folded about the zero frequency. But here the upper sideband products encompass the region between (2100+3600)=5700 c.p.s. as the lower limit and (5100+3600)=8700 c.p.s. being the upper limit. The DBM 221 (121) output feeds to input of low pass filter 223 (123) which has a cutoff frequency slightly greater than 8700 c.p.s. LPF 223 (123) readily passes both the sum frequency products and difference frequency components of DBM 221 (121) output to linear channel combiner 15U (15L).

Thus, as noted by spectrum sketch 223*a* (123*a*) for designated B1 (A1)-HIPS translation path, the double sideband products that result comprise the folded over difference frequency products of (3600±1500 c.p.s.) −3600 c.p.s.=0±1500 c.p.s.; while the sum terms are located at (3600±1500 c.p.s.)+3600 c.p.s.=7200±1500 c.p.s The other input to linear channel combiner 15U (15L) is provided by the B2 (A2) IQM translation channel, its signal content is shown in spectrum sketch 710*a* (910*a*). The other input to linear channel combiner 16U (16L) is provided by the B2 (A2) IQM direct channel output as shown by spectrum sketch 708*a* (908*a*).

Figure 3:
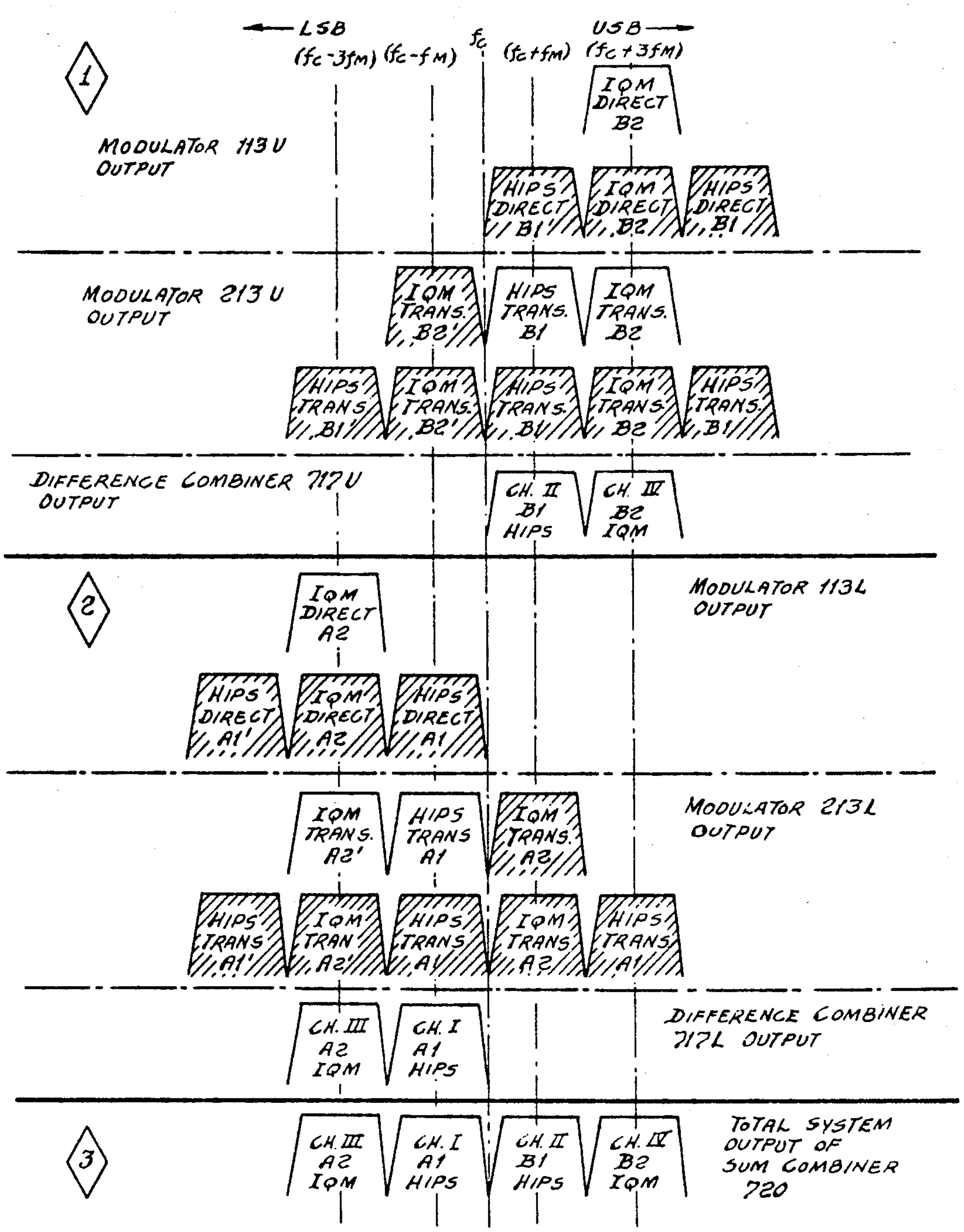
FIG. 3 is a functional spectrum band sketch representation of the Communications System transmission sideband distribution structure illustrating the typical multi-channel symmetrical ISB operation of the embodiment of FIG. 2.

For the moment, the carrying forth of the other inputs generated by the prior disclosed "IQM" method at the combine outputs will be disregarded since the full understanding of the interweaving of the two methods is best obtained from description of FIG. 3.

Accordingly, linear channel combiner 16U (16L) connects to the modulating signal input of DBM 113U (113L), and linear channel combiner 15U (15L) feeds its output to DBM 213U (213L) modulating signal input. Frequencywise, DBM 113U (113L) is supplied carrier frequency value 105.4 kc. (94.6 kc.) and DBM 213U (213L) receives 101.8 kc. (98.2 kc.) frequency carrier signal.

Thereupon, B1 (A1) HIPS DIRECT signal of 2100 to 5100 c.p.s. band develops as a double sideband product at the output of DBM 113U (113L) about the suppressed carrier value of 105.4 kc. (94.6 kc.). An RF bandpass filter of linear phase-frequency characteristic, BPF 715U' (BPF 715L') connects to the output of DBM 113U (DBM 113L), and has a center frequency value of $(f_c+3f_M)$ or 105.4 kc. [$(f_c-3f_M)$ or (94.6 kc.)] with bandwidth approximately greater than $(17/3)f_M$ or 10.2 kc. As such, BPF 715U' (BPF 715L') provides a pass region for three channel sideband products. One sideband product channel is centered about $(f_c+3f_M)$ [or $(f_c-3f_M)$] along with each of its adjacent sideband product channels having 600 c.p.s. channel separation therebetween; and readily reject all other frequency components. Hence, with the channel sideband products all occurring above (below) the system carrier reference $f_c$, all frequency product components at the output of DBM 113U (113L) are passed without attenuation by BPF 715U' (BPF 715L') and are applied to the input of amplitude equalization and time delay compensation USB stage 716U (LSB stage 716L).

Amplitude equalization and time delay compensation is abbreviated at time herein as (AE & TDC). Stage 716 functions again much in a manner similar to the designated stage 716 given in the aforementioned copending patent application. AE & TDC 716U (716L) compensates and equalizes for the time delay and amplitude discrepancy that develops between the translation channel and the direct channel operations due to the added inclusion of the intermediary phasing action of DBM 221 (121) and LPF 223 (123) for the "HPS" process, and DBM 706 (906) and BPF 710 (910) with respect to the "IQM" technique. For DBM 213U (213L) the total double sideband product output consists of sum and difference products above and below the suppressed carrier value 101.8 kc. (98.2 kc.) resulting from the upper sideband terms of B1 (A1) HIPS translation channel signal content and also unfolded center positioned spectrum content of sum and difference products about the suppressed carrier produced by the folded over difference frequency products of the B1 (A1) HIPS translation.

DBM 213U (213L) feeds its output to the input of RF bandpass filter BPF 715U (BPF 715L) which is identical to BPF 715U' (BPF 715L'). Here, BPF 715U (BPF 715L) allows unattenuated passage of only those channel sideband products located above (below) the virtual carrier frequency value $f_c$, readily rejecting all other. It supplies this output to one input of linear subtractive combiner 717U (717L). The other input of linear subtractive combiner 717U (717L) is supplied from the compensated and equalized signal bands output of amplitude equalization and time delay compensation USB (LSB) stage 716U (716L).

Accordingly, the intermediary phasing relationships establish the combined sideband structures in a manner whereby the subtractive operation produces at the output of linear subtractive combiner 717U (717L) an independent pair of upper (lower) sideband channel outputs shown by output sketch 718 (719) as Channel II B1 and Channel IV B2 (Channel I A1 and Channel III A2).

Thereupon, linear output combiner 720, having two inputs and one output, receives as one input the USB pair of channels II and IV output of linear subtractive combiner 717U and the LSB pair of channels I and III outputs of linear subtractive combiner 717L as the other input. The summed output of linear output combiner 720 is the four channel independent sideband result that is shown by spectrum band sketch 721.

Figure 4A:
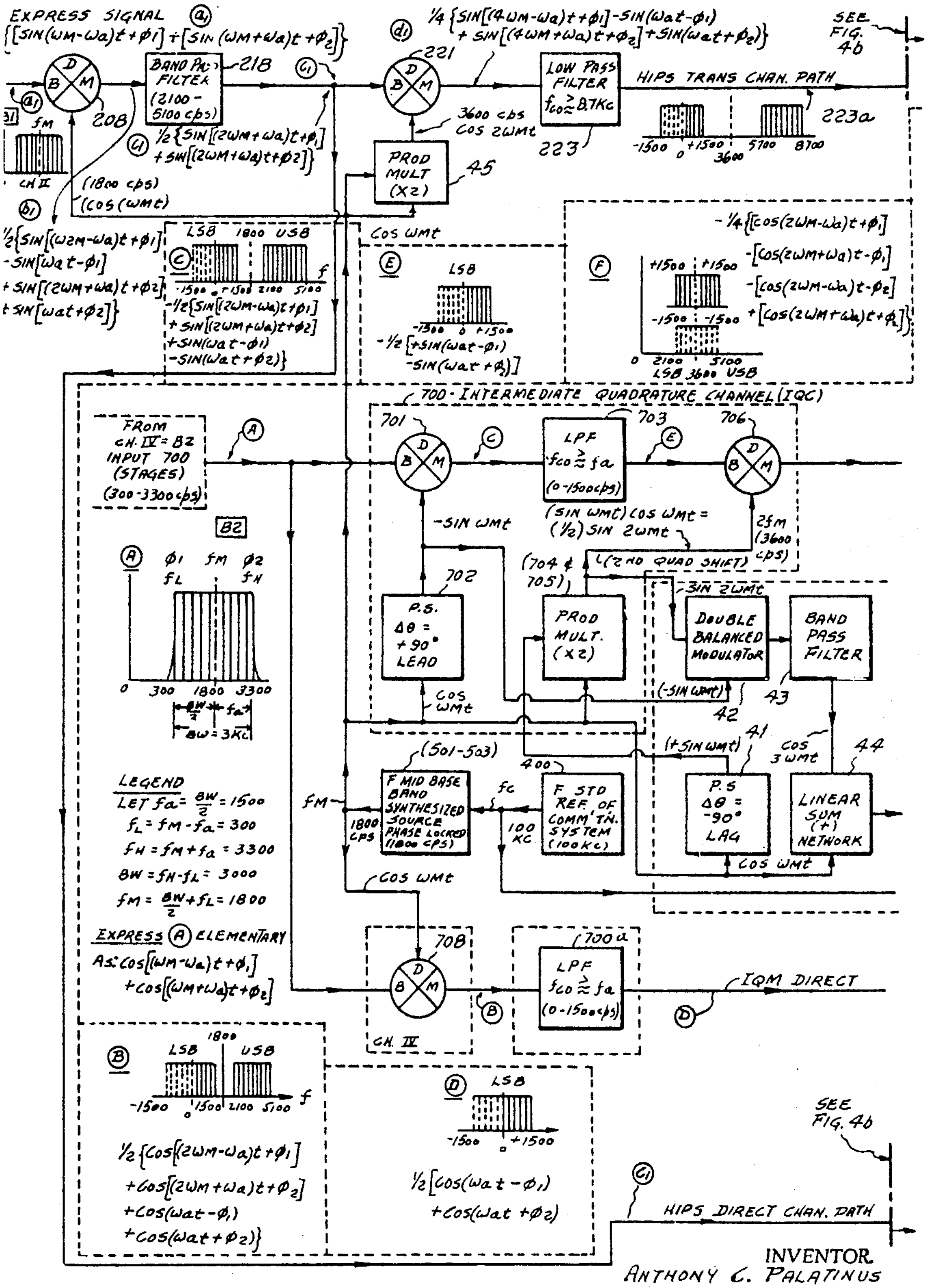
FIGS. 4*a* and *b* are symbolic circuit arrangement representations of the FIG. 2 embodiment generating the pair of upper sideband (USB) channel outputs of the Symmetrical multi-channel ISB communications system and presents the signal processing analysis of the "hybrid intermediate phase shift" (HIPS) operation, along with "intermediated quadrature modulation" (IQM) in accordance with the principles of this invention.
Figure 4B:
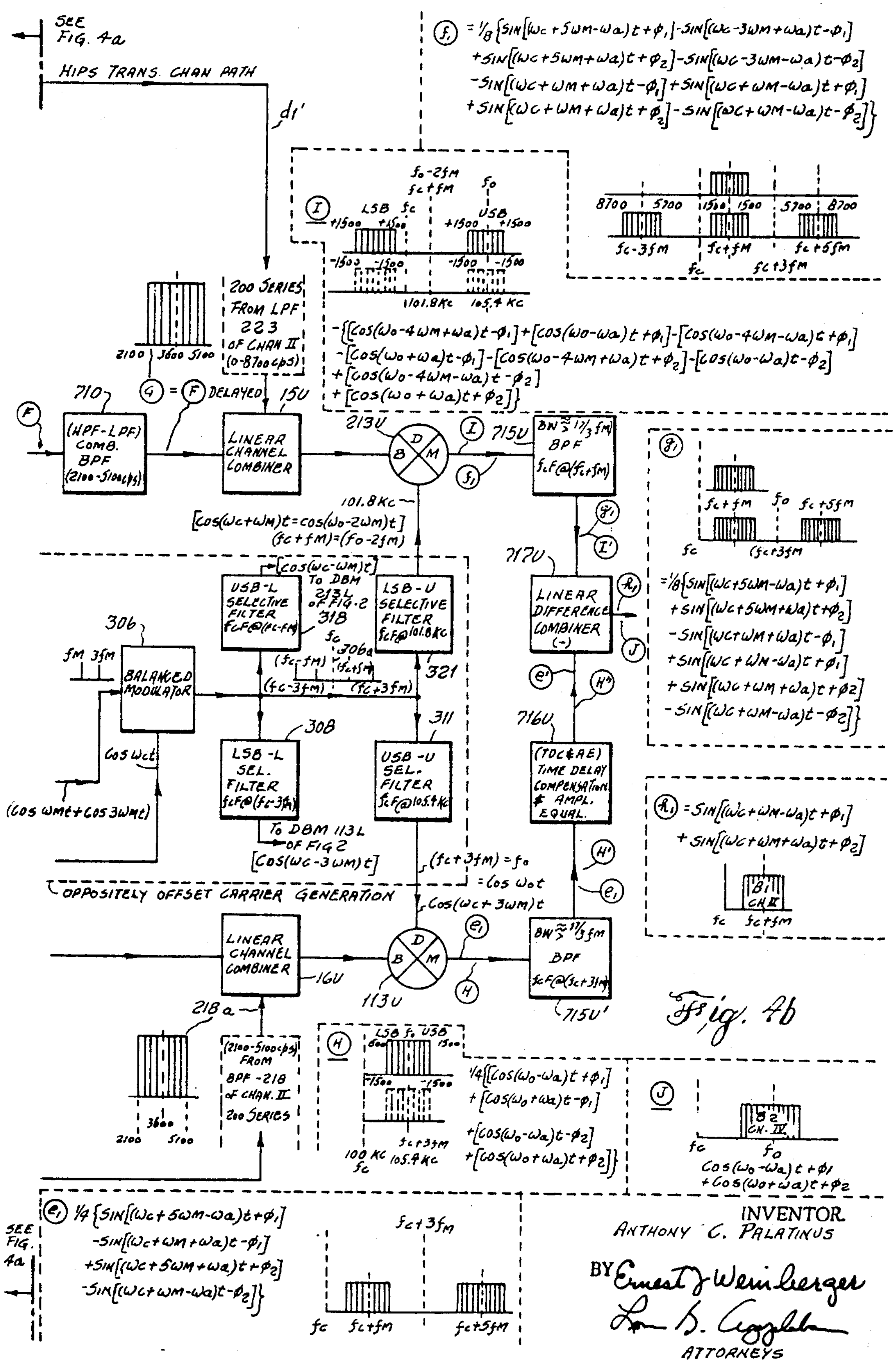
Figure 5A:
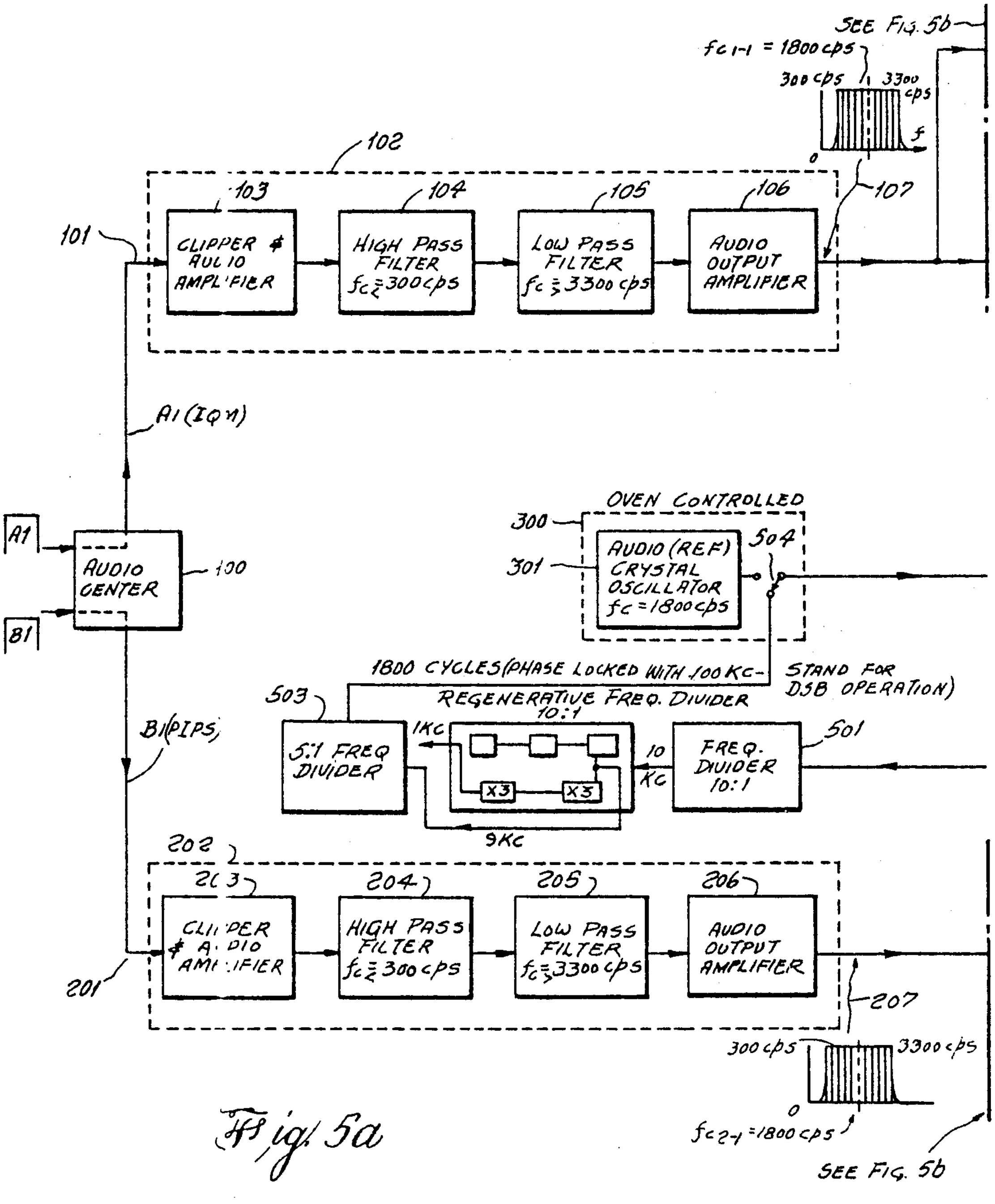
FIGS. 5*a b*, *c* and *d* are elementary overall block diagrams of another embodiment of "Symmetrical ISB Communications System" made in accordance with the principles of this invention; wherein the pair of independent channels are produced by "pure intermediate phase shift" (PIPS) technique for the upper sideband channel and "intermediate quadrature modulation" with *n* factor case of three for the lower sideband output.
Figure 5B:
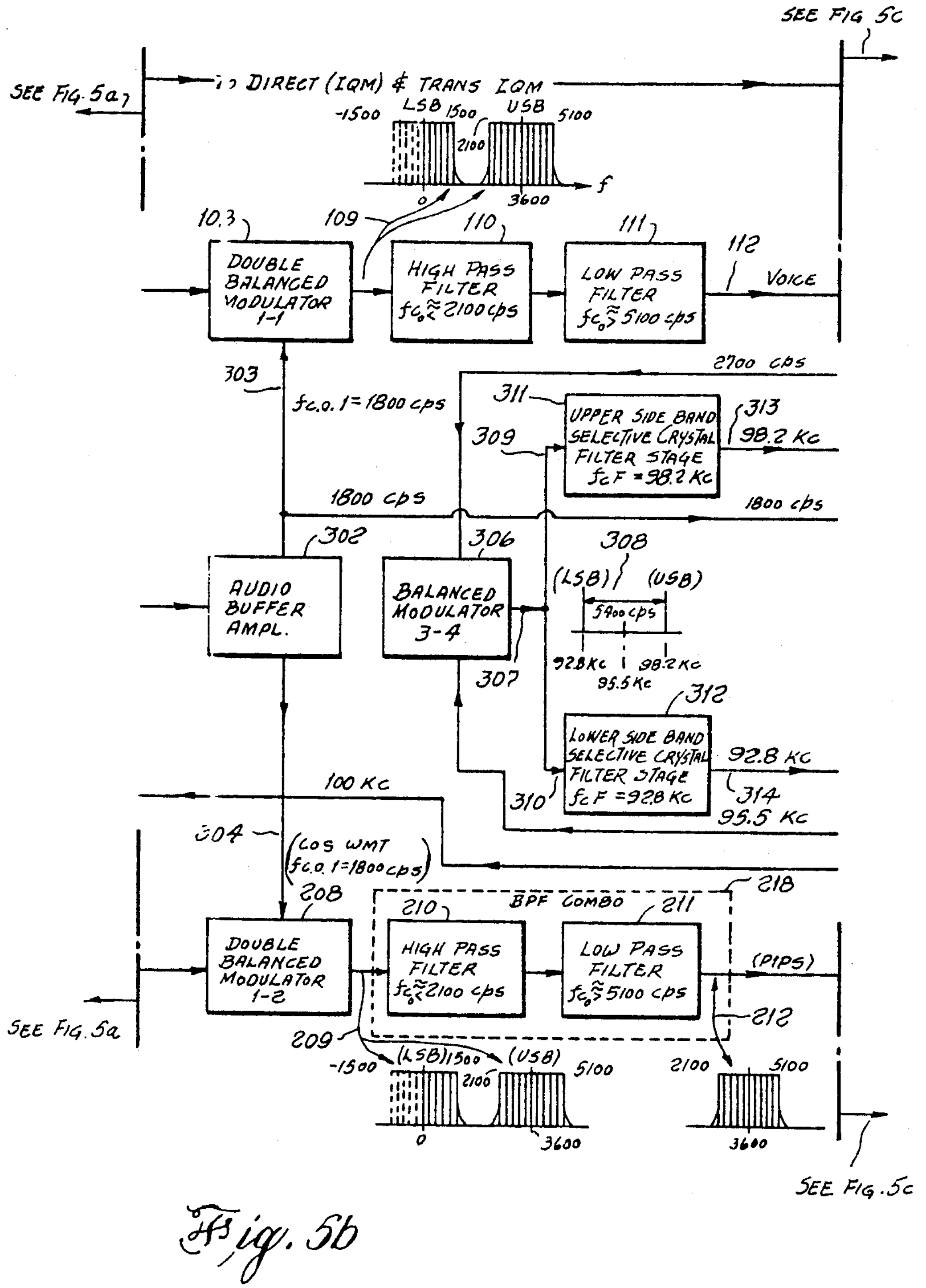
Figure 5C:
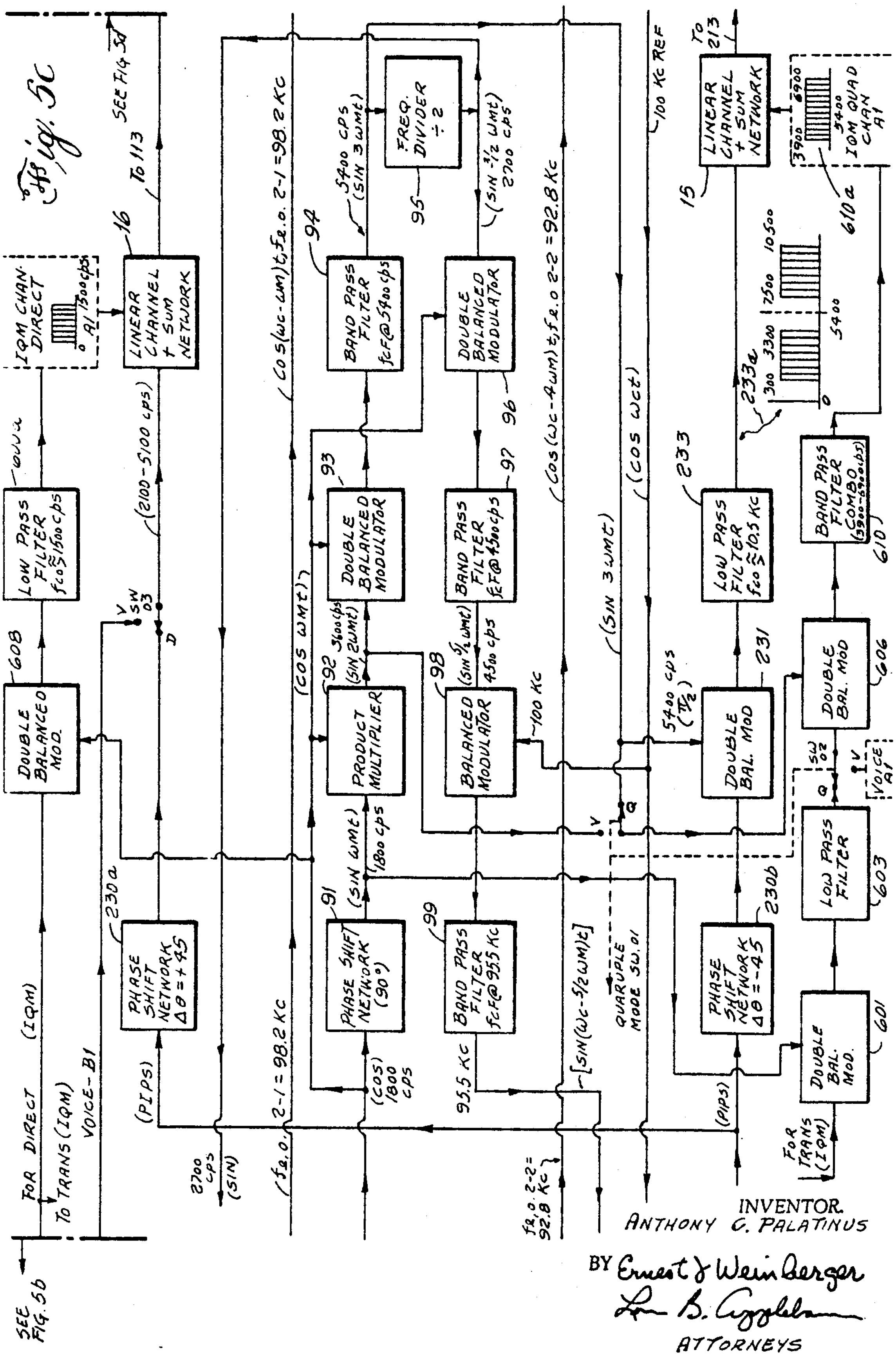
Figure 5D:
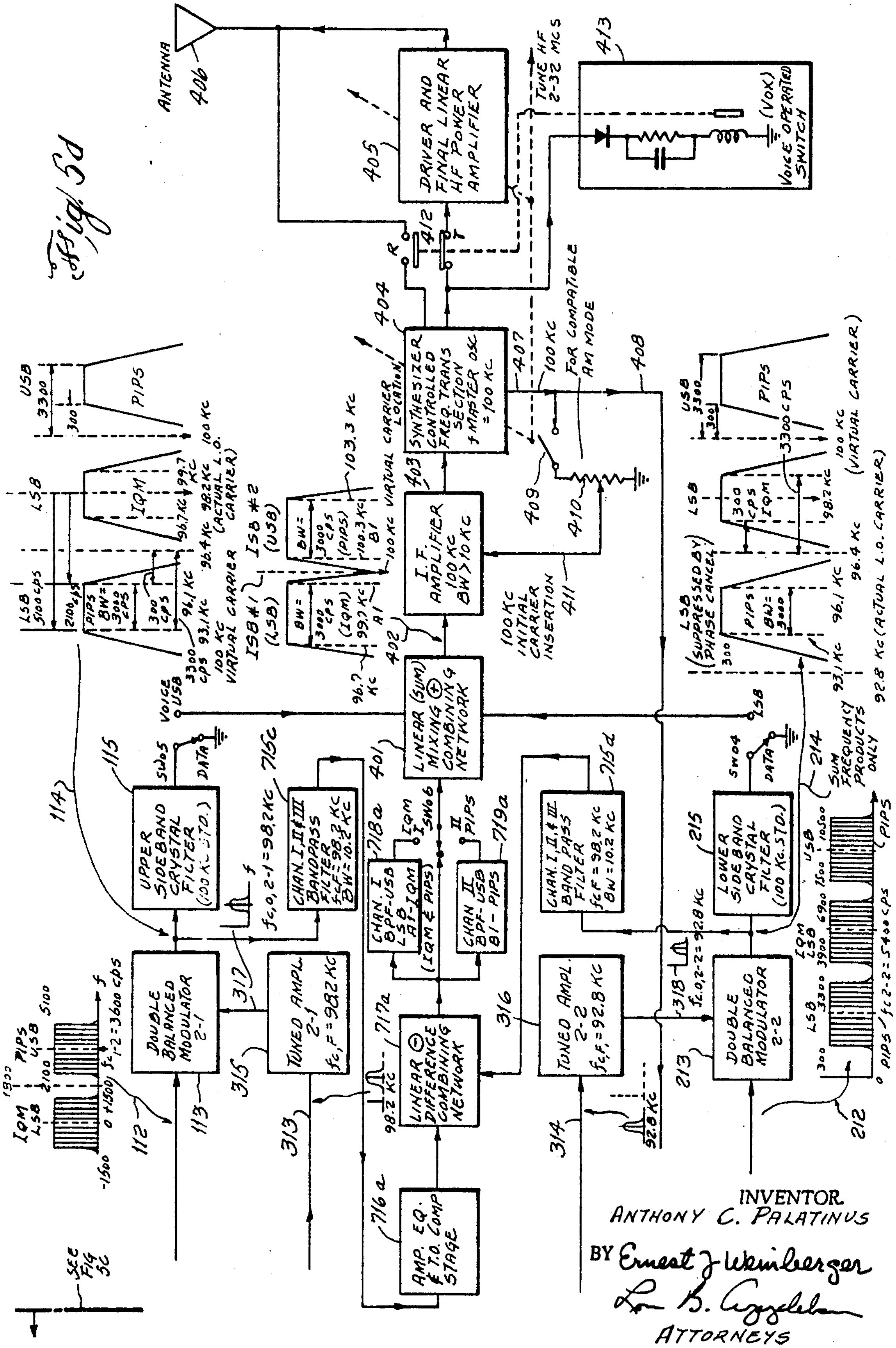

In view of the more comprehensive analysis forth-coming in the sections of this specification concerning the discussion of FIGS. 3 and 4, at this point a description physical understanding of the modulation process will suffice. Of special interest is the noted interrelationship of band spectrum sketches B1 (A1) HIPS DIRECT 218*a* (118*a*) and B2 (A2) IQM DIRECT 708*a* (908*a*), along with the equally comparable association of band spectrum sketches B1 (A1) HIPS Translation 223*a* (123*a*) and B2 (A2) IQM Translation 710*a* (910*a*), that demonstrates the uniquely derived extension of the "band slot filling" characteristics hereinbefore initiated for the "IQM" method in the aforementioned copending patent application.

Recall that the zero phase referenced 0 to 1500 c.p.s. spectrum band passed output of LPF 223 (123) B1 (A1) HIPS Translation path is the modulating signal input to double balanced modulator 213U (or 213L). Note that the local oscillator signal is, in this embodiment, at (100 kc.+1800 c.p.s.)=101.8 kc. [or (100 kc.−1800 c.p.s.) =98.2 kc.].

The direct supplying of the one-halved bandwidth, (0–1500 c.p.s.) modulated signal input to common double balanced modulator 213U (or 213L) promotes itself as most conducive to attaining fulfillment of the band slot at channel II (or I) spectrum space existent in the modulator output with optimized compatibility. By initiating such purposeful action, the singular modulator 213U (or 213L)

capacity supports the simultaneous handling of three differing bandwidths with isolation therebetween. An added value acquired therefrom becomes more apparent as pointed out later on; where, by a channel gain ratio control procedure for the signal processing paths of the two differing mode inboard channels, the development of undesired sideband content is further diminished.

Observe in the foldover operation, that the frequencies greater than the mid-base band frequency are then referenced with respect to the zero frequency axis or D.C. However, the bottom half of the input spectrum, that is, frequency components below the mid-base band frequency value, are inverted with respect to the zero axis. Hence, the upper half of the input spectrum content is down frequency converted, and is located in frequency coincidence with the lower half inversion. Subsequently, in the foldback action about the offset carrier location $[f_c+f_M]$, [or $(f_c-f_M)$], sum and difference products due to the upper portion of the folded over content, and also the lower portion components, develops. For the higher or top half content, the upper sideband thereof remains in effect; while the lower sideband result, being of a like phase and frequency relation with the lower half band portion of the lower sideband product of the direct "HIPS" path output of the modulator 113U (113L), upon amplitude and phase equalization, is thereafter phase cancelled in a subtractive process.

With regard to the other half, the lower half of the unfolding band is preserved in the difference terms or lower sideband content; whereas the upper sideband or sum component content is later removed by destructive phase cancellation in being subtractively combined with the upper higher frequency portion of the modulator 113U (113L) lower sideband content from the direct "HIPS" band input.

Summarizing the aforestated, the lower sideband of the lower half of the folded over band input and the upper sideband of the top higher frequency half of the folded over band results in the B1 modulated output of channel II. The upper sideband of the lower half along with the lower sideband of the upper frequency input band half are suppressed by phase cancellation action with the full lower sideband content of the direct "HIPS" path output of the modulator 113U.

In this hybrid approach, the sum products become the upper sideband terms of the modulator 213U output that serve to phase cancel the USB product output of modulator 113U upon combining. The difference frequencies of 0 to 1500 c.p.s. form a double sideband product about the offset carrier local oscillator signal $(f_c+f_M)$ to modulator 213U. One of the sideband products, which is not inverted, phase cancels the LSB product output of modulator 113U upon combining. The remaining sideband product term $(f_c+f_M)\pm 1500$ c.p.s. formulates the resultant upper (USB) sideband output of B1 channel for the hybrid transmission system. This modulation combination is aptly applied and maintained in a multi-channel ISB transmission system for channels I and II, having respectively designated band inputs A1 and B1, wherein channels III and IV having band inputs A2 and B2 which implement the "IQM" technique for the case of $(n)=2$.

TYPICAL MULTI-CHANNEL ISB OPERATION FOR "HIPS" TECHNIQUE WITH "IQM" $n=2$: FIG. 3

Having described the elements of the "hybrid intermediate phase shift" operation, along with the compatible "intermediate quadrature modulation" mode for the $n$ factor case of 2, it is best at this point to refer to FIG. 3 for example spectrum band sketches that represents the operational performance of the four channel independent sideband transmission process. With 600 c.p.s. channel separations and 3000 c.p.s. bandwidths, the overall transmission system bandwidth covers say 15K c.p.s. Here let $f$ virtual, $f_c$, be the common reference I.F. signal, and upon subsequent frequency up-conversion, represents the transmission system station output frequency, say in the high frequency band of 2–32 mcs.

Observe sketch ⟨1⟩ which illustrates the example modulation output of the B1 inboard "hybrid intermediate phase shift" (HIPS) channel II and outboard "IQM" channel IV generation for the B2 band input, thus formulating the USB pair of channel outputs of the FIG. 2 four channel system. The nature of the modulator products outputs are distinguished by a primed notation, which designates the lower sideband or difference frequencies.

Accordingly, modulator 113U output consists of sum products "HIPS" direct B1 band and difference product "HIPS" direct B1' band located adjacent to the unfolded double sideband products of "IQM" direct B2 signal developed within the band about the center carrier frequency value of $(f_c+3f_M)$. Modulator 213U produces one translated modulation output of unfolded double sideband product for "HIPS" translated B1 located within the band about $(f_c+f_M)$ frequency.

Modulator 213U output also constitutes the translated within band double sideband sum and difference frequency products of "IQM" translated B2 content and "IQM" translated B2' components adjacent to the within band "HIPS" translated B1 output; and therebetween the full band sum and difference products of "HIPS" translated B1 and "HIPS" translated B1'. Upon substractive combining, the band of "HIPS" direct B1 of modulator 113U output cancels the full band "HIPS" translated B1 output of modulator 213U.

The outboard USB channel IV of B2 information output, is produced by way of an "intermediate quadrature modulation" (IQM) method in accord with the principles disclosed in the aforementioned copending patent application. A subtle deviation therefrom is noted since for this present symmetrical multi-channel ISB transmission operation, a common linear difference combining network 717U of the subtractive type is in use at the common modulator 113U and 213U outputs for both the "HIPS" and "IQM" signal band formulation. Since in the copending patent application, a sum network produced the USB result, then for USB via a subtract network, a quadrature relationship change is effected for FIG. 2 to avoid the appearance of an inverted sideband. One manner to accommodate this need, the 90 degree phase shift network of the lead or positive advance type is employed such that $(\cos W_Mt+90°)=-\sin W_Mt$, and the sign reversal is developed for the mid-base band carrier signal. The channel II output of B1 content results from the "HIPS" direct B1' output of modulator 113U subtractively cancelling differing half bandwidth portions of the unfolded double sideband product of "HIPS" translated B1 output of modulator 213U, and leaves remaining the equivalent of only a single sideband product of "HIPS" B1 content.

The other remaining sideband structures generated in the output of modulator 213U are kept from appearing in the difference combiner 717U output by the bandpass characteristics of the RF bandpass filter 715U that only allows passage of the sideband modulation outputs developing above the virtual carrier frequency, $f_c$.

Accordingly, concerning the respective functioning of the 200 and 700 series itemized elements of FIG. 2, the sideband structure description thus far delineates the generation of the two pair USB II and IV channel outputs of B1 and B2, and a detailed mathematical signal analysis is given later on with respect to FIG. 4. Similarly, the generation of the two pair LSB I and III channel outputs of A1 and A2 respectively is accomplished by the similar circuit arrangement of stages numbered 100 series for the hybrid (HIPS) method of inboard A1 LSB output and the 900 series numbered stages developing the outboard A2 LSB transmission channel as shown in FIG. 2. However, for the LSB pair generation, the pair of oppositely offset carrier signals are now expressed as cos $(W_c - W_M)t$ being applied to the common double balanced modulator 213L with the carrier signal feeding to the common double balanced modulator 113L being of the form cos $(W_c - 3W_M)t$.

The sideband distribution sketches ◇2 relate to the FIG. 2 modulator 113L, modulator 213L, and difference combiner 717L outputs for the "IQM" method generation of A2 input content into channel III output, and the "HIPS" technique production of A1 input as channel I output. The specific band product outputs of modulators 113L and 213L are similar in form to that resulting from modulators 113U and 213U of spectrum sketch ◇1 except for developing with respect to the $f_c$ carrier in the lower sideband region.

Thus, at the output of difference combiner 717L, channel I is centered on carrier frequency $(f_c - f_M)$ and channel III appears positioned about the carrier value $(f_c - 3f_M)$.

The total system output of sum combiner 720, shown by spectrum sketch ◇3, constitutes the USB region channel outputs of II–B1 and IV–B2 from difference combiner 717U joined with the LSB region output channels III–A2 and I–A1 from difference combiner 717L.

Here it is clear that only the adjacent undesired sideband content of concern exists for the undesired translated IQM band at B2' about $(f_c - f_M)$ for modulator 213U output; and likewise for A2 about $(f_c + f_M)$ for modulator 213L.

The presence of this neighboring sideband content may be more properly minimized by gearing the "IQM" channel generation to the sideband level of the "HIPS" channel output, which as noted is not reinforced. Hence the reinforced sideband result of the desired IQM band output is equated to the reinforced sideband level of the "HIPS" channel. This being the case, the undesired translated IQM band is at one half level of HIPS. Recall that such gain manipulation for the elementary exploratory example of FIG. 1 would be of no avail since for that embodiment the adjacent undesired content does not comprise the "IQM" band content alone.

In general, for independent sideband (ISB) operation without carrier insertion, the proper output levels of the RF components may be expressed as $USB + LSB = 100\%$ out; wherein USB & LSB need not be of equal amplitude. Once the USB and the LSB percentages have been set, the RF power output is usually varied and set for rated power input into the antenna by providing the proper common drive level without altering the sideband proportions in any way.

Now as is well known in the transmission art, it is possible to set the sideband levels in many ways, independently of each other, depending upon type and form of operation. One may suppose that the maximum total voltage of SSB–ISB systems for SSB only operation may then be at 100% and consist of either LSB or USB content alone. In the case of ISB operation, both sidebands may be operable at the same time and one may suppose that one-half the available power shall be in each sideband, for a unity gain channel ratio condition. However, it is also possible to apportion the system drive voltages so that one sideband carries more power than the other sideband. For example, the transmission system's channel gain ratio may be factored whereby the USB channel gain may be adjusted so that the audio peaks drive the system say 20%; while the LSB channel is being adjusted for the remaining 80% with the total being 100%. Such division operation is experienced in practice as separate intelligence occurs, where voice modulation is maintained in one channel, while teletype type modulation is simultaneously present in the other channel.

Observe in HF radio systems with a small number of channels, the information signal input is controlled, that is, maintained on the several channel sat predetermined levels, to closely operate the transmission system output at near the overload point. In a multi-channel (MC) system, the channels are usually all kept at equal power levels. Hence, the linear quadrature channel summations result in an amplitude doubling of the desired quadrature sideband, while the "HIPS" folded over channel II (or channel I) content is unchanged. The reinforced quadrature sideband, along with the undesired content, may then be further reduced with in path signal attenuation by a factor of two prior to final modulation and filter separation. Thus, the desired "IQM" content is further reduced, and upon combining, its channel output level is thus set equal to the unchanged "HIPS" channel output.

The next three sections covering FIG. 4 constructively support this hybrid form "ISM" process with a description analysis of the carrier generation technique and the "HIPS–IQM" band signal flow operation.

HYBRID INTERMEDIATE PHASE SHIFT MODULATION SIGNAL ANALYSIS AND SPECTRUM PROCESSING

Carrier signal generation system: FIG. 4

FIG. 4 illustrates the signal analysis of the "HIPS" modulation technique in conjunction with the "IQM" method for the *n* factor case of two.

Here in FIG. 4, the numerically itemized audio stages 41 to 45, along with the I.F. operating stages 306, 308, 311, 318 and 321, demonstrate a typical circuits arrangement that generates and supplies the newly required audio and I.F. offset carrier signals which in FIG. 2 were symbolically designated by circled enclosure of their sinusoidal form.

The overall system I.F. carrier reference output of $F_{STD}$ reference of Communications System 400, standard crystal oscillator source, is say $f_c = 100$K c.p.s. The system I.F. carrier signal of $f_c$ is fed over one path to the carrier signal input of balanced modulator 306, and by another path is supplied to the input of $F_{MID\text{-}BASE\ BAND\ Synthesizer\ Source\ (501-503)}$.

The common mid-frequency carrier signal, cos $W_Mt$ (1800 c.p.s.) is thus synthesized from $F_{STD}$ reference of Communications System 400, which also represents cos $W_ct$. $F_{mid\text{-}base\ synthesizer\ source}$, having frequency processing stage items (501–503) includes known usable synthesis techniques such as dividing by 5 to give 20 kc., which heterodynes with a 2 kc. signal divided by 10 therefrom, resulting in a 18 kc. difference product that divided by 10 generates 1800 c.p.s.

The cos $W_Mt$ carrier signal simultaneously feeds the carrier signal inputs of DBM 208 of the "HIPS" process and DBM 708 for the "IQM" method.

In the carrier signal generation system, the cos $W_Mt$ signal is likewise applied to 90° lead phase shifter, $$\Delta\theta = +90°$$

702 producing a $(-\sin W_Mt)$ signal output that is supplied to the carrier signal input of DBM 707. Also 90° lag phase shifter, $\Delta\theta = -90°$, 41 receives the cos $W_Mt$ signal input resulting in a $(+\sin W_Mt)$ signal output therefrom.

The cos $W_Mt$ mid-frequency carrier signal is also supplied to one of the two inputs of both product multiplier (704 and 705) and linear sum network 44, and to both inputs of product multiplier 45.

The output of product multiplier 45 is $(\cos W_Mt \times \cos W_Mt)$, and the filtered cos $2W_Mt$ result is applied as the intermediate carrier signal to the carrier input of DBM 221. The other input of product multiplier (704 and 705) receives the $+\sin W_Mt$ signal from phase shifter $$\Delta\theta = -90°$$

stage 41, and its output of $(\sin W_Mt \cos W_Mt) = (\frac{1}{2}) \sin 2W_Mt$ is supplied as the intermediate carrier signal to the carrier input of DBM 706.

The product multipliers (704 and 705) and 45 preferably represent Hall Generator effect product devices with simple output filtering, though as an alternate example, the multiplier (704 and 705) may consist of a frequency doubler in cascade with a 90° phase shifter.

The multiplier outputs, which are of a frequency twice the mid-band frequency of $2f_M$, and of halved amplitude level may be compensated in various manners. To obtain carrier unity amplitude, amplification may be introduced between the multiplier and the double balanced modulators to which it connects.

As a matter of convenience in accord with the convention of the art in the signal analysis process, the intermediate carrier signals are assumed to be set at unity level.

The functioning of the carrier signal applications to the band signal processing stages is covered later in this analysis. For I.F. offset signal development, the DBM 42 receives as one input the $-\sin W_M t$ signal from phase shifter $\Delta\theta=+90°$ stage 702, and the other input is obtained from the output of product multiplier (704 and 705) as $\sin 2W_M t$. This product output of $(\sin 2W_M t)(-\sin W_M t)$ is expressed as $[-\tfrac{1}{2}\cos (W_M t)+\tfrac{1}{2}\cos (3W_M t)]$, and fed to bandpass filter 43 which has a center frequency value $3f_M$. BPF 43 passes only the sum product term of $\cos 3W_M t$, and supplies this signal to the other input of linear sum network 44. A combined two frequency equal amplitude signal output from linear sum network 44, expressed as $[\cos W_M t+\cos 3W_M t]$, is applied to the modulating signal input of balanced modulator 306. The double sideband product output of modulator 306 is thus $$[\cos W_M t+\cos 3W_M t](\cos W_c t)=\tfrac{1}{2}\{\cos (W_M+W_c)t+\cos (W_c-W_M)t+\cos (W_c+3W_M)t+\cos (W_c-3W_M)t\}$$

which represents the four frequency component spectrum structure shown by sketch **306*a*. The balanced modulator 306 output is simultaneously applied to the input of four, sideband selective filters. Accommodating the four channel system of FIG. 2, LSB–U selective filter 321 of center frequency 101.8 kc. passes only output signal $\cos (W_c+W_M)t$ to the carrier signal input of DBM 213U; USB–U selective filter 311 of center frequency 105.4 kc. passes only output signal $\cos (W_c+3W_M)t$ to the carrier signal input of DBM 113U; USB–L selective filter 318 of center frequency 98.2 kc. passes only output signal $\cos (W_c-W_M)t$ to the carrier signal input of DBM 213L (FIG. 2), and LSB–L selective filter 308 of center frequency 94.6 kc. passes only output signal $\cos (W_c-3W_M)t$ to the carrier signal input of DBM 113L** (FIG. 2). The generation and application of the required carrier signals is thus accomplished.

"HIPS" MODULATION SIGNAL ANALYSIS: FIG. 4

With the generation and supplying of the required carrier signal, attention is now to be given to the in-path signal analysis operations of the "hybrid intermediate phase shift" process implemented by the added stages of two modulators DMB 208, and 221, and two filters, BPF 218 and LPF 223, to the prior disclosed "IQM" system of 700 itemized stages as shown in FIG. 4. The two frequency method of analysis is again applied, and the inboard upper sideband channel II output for B1 information input is examined. Thus, the modulating band signal input B1, designated as signal ($a_1$) supplied to double balanced modulator 208 is say of the form $$\{[\sin (W_M-W_a)t+\phi_1]+[\sin (W_M+W_a)t+\phi_2]\}$$

(and similar results occur for a cosine input), while the carrier signal supplied thereto is expressed as $(\cos W_M t)$. The double sideband produce output of DBM 208 consists of sum and difference terms at ($b_1$) of $$\tfrac{1}{2}\{\sin [2W_M-W_a)t+\phi_1]-\sin (W_a t-\phi_1)+\sin [(2W_M+W_a)t+\phi_2]+\sin (W_a t+\phi_2)\}$$

The double sideband (dsb) output of DBM 208 is applied to band pass filter 218, which is of linear phase-frequency characteristic, and may be a HPF–LPF combination having a 3000 c.p.s. bandwidth from 2100 to 5100 c.p.s. Accordingly, bandpass filter (BPF) 218 passes only the sum frequency products without attenuation and readily rejects the difference terms. The passed result at ($c_1$) of $$\tfrac{1}{2}\{\sin [(2W_M-W_a)t+\phi_1]+[\sin (2W_M+W_a)t+\phi_2]\}$$

as shown by spectrum sketch **218*a* is the output of BPF 218 and is fed over two paths. One path connects to one input of the linear channel combiner 160, and is designated as "HIPS" Direct Channel path. The other path connects the output of BPF 218 to the modulation input of DBM 221**, which is receiving the intermediate carrier signal of $\cos 2W_M t$; this being of twice frequency and like phased with the carrier signal of $\cos W_M t$ supplied to the first and in-common product operation.

The resulting double sideband product output of DBM 221 becomes signal ($d_1$) expressed as $$\tfrac{1}{4}\{\sin [(4W_M-W_a)t+\phi_1]-\sin (W_a t-\phi_1)+\sin [(4W_M+W_a)t+\phi_2]+\sin (W_a t+\phi_2)\}$$

and is applied to low pass filter 223. LPF 223 is designed to have a cutoff frequency slightly greater than 8700 c.p.s. and is of linear phase-frequency characteristic type. LPF 223 passes the entire dsb product output shown by spectrum sketch **223*a* without attenuation and induces a constant time delay to the signals passing therethrough. The output of LPF 223 as delayed signal ($d_1'$) connects to one input of linear channel combiner 15U, and this latter path is referred to as the "HIPS" translation Channel path. For this "HIPS" process analysis, only the "HIPS" channel path outputs of channel combiners 15U and 16U are considered. The "IQM" channel path contributions are examined later in the signal analysis of "IQM." The channel combiners 15U and 16U outputs are respectively fed to the modulating signal inputs of DBM 213U and DBM 113U**.

Double balanced modulator 113U produces in its output the product operation between one of its input channel signals from channel combiner 16U output, the direct HIPS path signal of $$\tfrac{1}{2}\{\sin [(2W_M-W_a)t+\phi_1]+\sin [(2W_M+W_a)t+\phi_2]\}$$

and its offset carrier signal input of $$[\cos (W_c+3W_M)t]$$

The result thereof, mathematically expressed, is thus signal ($e_1$) in the form:

$$\tfrac{1}{4}\{\sin [(W_c+5W_M-W_a)t+\phi_1]-\sin [(W_c+W_M+W_a)t-\phi_1]+\sin [(W_c+5W_M+W_a)t+\phi_2]-\sin [(W_c+W_M-W_a)t-\phi_2]\}$$

with a frequency distribution as shown in the spectrum sketch associated therewith.

Double balanced modulator 213U produces in its output the product operation between one of its input channel signals from channel combiner 15U output, the translated HIPS path signal of ($d_1'$) or delayed ($d_1$) as:

$$\tfrac{1}{4}\{\sin [(4W_M-W_a)t+\phi_1]-\sin [(W_a t-\phi_1)]+\sin [(4W_M+W_a)t+\phi_2]+\sin [W_a t+\phi_2]\}$$

and its offset carrier signal input of $$[\cos (W_c+W_M)t]$$

Resulting therefrom in mathematical form is signal ($f_1$)

or $$\tfrac{1}{8}\{\sin[(W_c+5W_M-W_a)t+\phi_1]-\sin[(W_c-3W_M+W_a)t-\phi_1]+\sin[(W_c+5W_M+W_a)t+\phi_2]-\sin[W_c-3W_M-W_a)t-\phi_2]-\sin[(W_c+W_M+W_a)t-\phi_1]+\sin[(W_c+W_M-W_a)t+\phi_1]+\sin[(W_c+W_M+W_a)t+\phi_2]-\sin[(W_c+W_M-W_a)t-\phi_2]\}$$

Associated spectrum sketch with $(f_1)$ illustrates the sideband product locations that develop.

As the signal output $(f_1)$ of DBM 213U is applied to input of BPF 715U, only the product terms higher than system reference carrier frequency $f_c$ pass therethrough resulting in signal $(g_1)$ as shown by the spectrum sketch and expressed as:

$$\tfrac{1}{8}\{\sin[(W_c+5W_M-W_a)t+\phi_1]+\sin[(W_c+5W_M+W_a)t+\phi_2]-\sin[(W_c+W_M+W_a)t-\phi_1]+\sin[(W_c+W_M-W_a)t+\phi_1]+\sin[(W_c+W_M+W_a)t+\phi_2]-\sin[(W_c+W_M-W_a)t-\phi_2]\}$$

Likewise, for the signal output $(e_1)$ applied to BPF 715U' input, both product output terms, being above reference carrier $f_c$, pass unattenuated therethrough resulting in signal $(e_1)$ at the output thereof.

Thus, the signal $(e_1)$ feeds to Time Delay Compensation and Amplitude Equalization stage 716U, whereupon the delay and amplitude differences between the HIPS Direct Channel path and HIPS Translation Channel path are negated to produce the signal output designated as signal $(e_1)$ .

Accordingly, linear difference combiner 717U receives signal $(g_1)$ as one input and signal $(e_1')$ as its other input, to produce the resultant SSB signal output $(h_1)$ , which spectrum sketch shows to be the inboard USB channel II of B1 content expressed as:

$$\{\sin[(W_c+W_M-W_a)t+\phi_1]+\sin[(W_c+W_M+W_a)t+\phi_2]\}$$

The generation of the inboard LSB channel I of Al content can be analyzed in a similar manner.

First consider a cos signal input to the first and in-common product operation of $$\{[\cos[(W_M-W_a)t+\phi_1]]+[\cos[(W_M+W_a)t+\phi_2]]\}$$

Thereupon, at the output of BPF218, the passed sum product term of the cos×cos operation is directly applied to DBM 113U input and expressed as:

$$\{\cos[(2W_M-W_a)t+\phi_1]+\cos[(2W_M+W_a)t+\phi_2]$$

For the intermediate double balanced modulator operation:

$$\{\cos[(2W_M-W_a)t+\phi_1]+\cos[2W_M+W_a)t+\phi_2]\}[\cos 2W_Mt]$$

results in $$\{\cos[(4W_M-W_a)t+\phi_1]+\cos(-W_at+\phi_1)+\cos[(4W_M+W_a)t+\phi_2]+\cos(W_at+\phi_2)\}$$

which, upon low pass filtering, becomes the input signal to DBM 213U.

As stated, Cosine terms provide a like result since at modulator 113U, $$\{\cos[(2W_M-W_a)t+\phi_1]+\cos[2W_M+W_a)t+\phi_2]\}[\cos(W_c+3W_M)t]$$

produces $$\{\cos[(W_c+5W_M-W_a)t+\phi_1]+\cos[(W_c+W_M+W_a)t-\phi_1]+\cos[(W_c+5W_M+W_a)t+\phi_2]+\cos[(W_c+W_M-W_a)t-\phi_2]\}$$

For modulator 213U output, $$\{\cos[(4W_M-W_a)t+\phi_1]+[\cos(-W_at+\phi_1)]+\cos(W_at+\phi_2)+\cos[(4W_M+W_a)t+\phi_2]\}[\cos(W_c+W_M)t]$$

results in $$\{\cos[(W_c+5W_M-W_a)t+\phi_1]+\cos[(W_c-3W_M+W_a)t-\phi_1]+\cos[(W_c+5W_M+W_a)t+\phi_2]+\cos[(W_c-3W_M-W_a)t-\phi_2]+\cos[(W_c+W_M-W_a)t+\phi_1]+\cos[(W_c+W_M+Wa)t-\phi_1]+\cos[(W_c+W_M+W_a)t+\phi_2]+\cos[(W_c+W_M-W_a)t-\phi_2]\}$$

As can be seen, the equivalent result of the subtractive difference therebetween is $$\{\cos[(W_c+W_M-W_a)t+\phi_1]+\cos[(W_c+W_M+W_a)t+\phi_2]\}$$

Thus, in the case of the inboard lower sideband operation, again using cosine terms, the product of $$\{\cos[(2W_M-W_a)t+\phi_1]+\cos[(2W_M+W_a)t+\phi_2]\}[\cos(W_c-3W_M)t]$$

becomes at modulator 113L output, $$\{\cos[(W_c-W_M-W_a)t+\phi_1]+\cos[(W_c-5W_M+W_a)t-\phi_1]+\cos[(W_c-W_M+W_a)t+\phi_2]+\cos[(W_c-5W_M-W_a)t-\phi_2]\}$$

Then for modulator 213L output, $$\{\cos[(4W_M-W_a)t+\phi_1]+\cos[-W_at+\phi_1]+\cos[W_at+\phi_2]+\cos[(4W_M+W_a)t+\phi_2]\}[\cos(W_c-W_M)t]$$

which gives $$\{\cos[(W_c+3W_M-W_a)t+\phi_1]+\cos[(W_c-5W_M+W_a)t-\phi_1]+\cos[(W_c+3W_M+W_a)t+\phi_2]+\cos[(W_c-5W_M-W_a)t-\phi_2]+\cos[(W_c-W_M-W_a)t+\phi_1]+\cos[(W_c-W_M+W_a)t-\phi_1]+\cos[(W_c-W_M+W_a)t+\phi_2]+\cos[(W_c-W_M-W_a)t-\phi_2]\}$$

By subtraction, $$\{\cos[(W_c-W_M+W_a)t-\phi_1]+\cos[(W_c-W_M-W_a)t-\phi_2]\}$$

results.

In a two channel ISB system alone, the audio sinusoidal function, sign, and combiner polarity particulars, in reference with the offset frequency direction of the newly valued pair of I. F. carriers about $c$, follow the analysis from outlined above. A later section concerning FIG. 8 and 8*a* discuss this operation.

"IQM" SIGNAL ANALYSIS FOR $n$ FACTOR CASE=2 WITH "HIPS" CHANNEL II IN EFFECT

With the given "HIPS" signal of FIG. 4 covering the inboard channel outputs of A1–Channel I and B1–Channel II, the outboard channel generations of A2–Channel III and B2–Channel IV is analyzed as follows:

Consider Channel IV selection with "IQM" of B2 content for the $n$ factor condition of two.

The signal processing as shown by FIG. 4 conforms closely to the "IQM" technique of the aforementioned copending patent application with but the following specified exceptions. The final pair of oppositely offset carrier frequency signals are of differing values, as are the center frequency values and bandwidths of BPF's 715; and with a difference combiner 717U (717L) in effect, the mid-baseband frequency quadrature signal in use is of the form ($-\sin W_Mt$). In view of these variations, the analysis of the two frequency signal "IQM" method of FIG. 4 is given in full.

Note here that the audio input spectrum is being modulated with two in-band carrier signals of a frequency equal to the arithmetic center of the audio band and the carriers differ by 90 degrees in phase. Hence, as a result, like audio components at the outputs of double balanced modulator 708 and 701 are also shifted in phase by 90°. With first quadrature operation, the sequencing property of the input band of signals becomes important, that is, the phase of the signal response is dependent upon whether the frequency is numerically above or below the carrier frequency it modulates. In order for each component of the folded over band output of one LPF to be in quadrature with its corresponding component from the intermediate quadrature channel LPF output, the frequency-phase characteristic of the paths need to be the same; and LPF 700a and LPF 703 made identical. Since the separation between the carrier frequency and the highest modulating frequency is small, low pass filter construction for equal frequency-phase characteristic presents no particular design problem in present filter art where a smooth delay characteristic of phase change as a function of frequency is obtainable in the audio region.

In the output of double balanced modulator (DBM) 708, a product operation of signal Ⓐ multiplied by common mid-frequency carrier signal (cos $W_Mt$) takes place resulting in signal Ⓑ. This is expressed as $$\tfrac{1}{2}\{\cos[(2W_M-W_a)t+\phi_1]+\cos(W_at-\phi_1)+\cos[(2W_M+W_a)t+\phi_2]+\cos(W_at+\phi_2)\}$$

The mid-band frequency signal, cos $W_Mt$, feeding 90° leading phase shifter 702 produces at the output, $$[\cos W_Mt+90°]=-\sin W_Mt$$

which thereupon serves as the common input to DBM 701 and the product multiplier (704 and 705) of the Intermediate Quadrature channel 700.

At the DBM 701 output, signal Ⓒ results from $$-\{[\cos(W_M-W_a)t+\phi_1]+[\cos(W_M+W_a)t+\phi_2]\}\sin W_Mt=-\tfrac{1}{2}\{\sin[(2W_M-W_a)t+\phi_1]+\sin[(2W_M+W_a)t+\phi_2]+\sin(W_at-\phi_1)-\sin(W_at+\phi_2)\}$$

With LPF 700a having its $f_{co}\approx>f_a$, the filter operation in the output of DBM 708 passes only the lower sideband products of signal Ⓑ. The output signal Ⓓ of LPF 700a is thus $-\tfrac{1}{2}[\cos(W_at-\phi_1)+\cos(W_at+\phi_2)]$. Likewise, the output signal Ⓔ of LPF 703 consists of lower sidebank terms only, or $$-\tfrac{1}{2}[\sin(W_at-\phi_1)-\sin(W_at+\phi_2)]$$

and is applied to input of DBM 706.

Accordingly, the product operation that occurs at DBM 706 results in quadrature sideband signal Ⓕ which is expressed as $$-\tfrac{1}{2}[\sin(W_at-\phi_1)-\sin(W_at+\phi_2)]\times[\sin 2W_Mt]=-\tfrac{1}{4}\{\cos[(2W_M-W_a)t+\phi_1]-\cos[(2W_M+W_a)t-\phi_1]-\cos[(2W_M-W_a)t-\phi_2]+\cos[(2W_M+W_a)t+\phi_2]\}$$

With the bandpass filter 710 combination of a HPF $f_co\approx<(2f-f_a)$ and a LPF of $f_{co}\approx>(2f_M+f_a)$, the filter operation passes the sole quadrature sideband signal Ⓕ with linear time delay to become signal Ⓖ as indicated.

In this oppositely-offset modulation process, $$(f_c+3f_M)=f_o$$

and therefore $(f_c+f_M)=(f_o-2f_M)$. Hence, $$[\cos(W_c+W_M)t]=[\cos(W_o-2W_M)t]$$

$$[\cos(W_c+3W_M)t]=\cos W_ot$$

Numerically expressed, this becomes 105.4 kc.$=f_o$ and 101.8 kc.$=(f_o-2f_M)$. The cos $(W_o-2W_M)t$ output of LSB-U Selective Filter 321 is applied as the carrier signal to double balanced modulator DBM 213U. The cos $W_ot$ output of USB-U Selective Filter 311 feeds to DBM 113U as its carrier input.

Returning to the signal processing path, linear channel combiners 15U and 16U are shown in use for the "HIPS-IQM" multi-channel ISB operation, and such combiner application is a standard procedure. The 16U combiner in the path between LPF 700a and DBM 113U allows for simultaneous application of the modulation band of "HIPS" Direct channel II content, while combiner 15U provides for the modulation injection of "HIPS" Translation channel II. Such operation had been described earlier with respect to FIG. 2 and is mentioned at this point for reference. Further analysis will only concern itself with the quadratured signal operation since the prior explanations adequately cover the processing of channels I and II.

Consider then only the band signal Ⓓ output of channel combiner 16U as the modulating signal input to DBM 113U, and the band signal output Ⓖ output of channel combiner 15U as DBM 213U modulation input. For the direct quadrature process, a product operation of signal Ⓓ multiplied by carrier signal cos $W_ot$ takes place resulting in signal Ⓗ. Here the product is further expressed as a sideband output of DBM 113U represented by $$\tfrac{1}{4}\{[\cos(W_o-W_a)t+\phi_1]+[\cos(W_o+W_a)t-\phi_1]+[\cos(W_o-W_a)t-\phi_2]+[\cos(W_o+W_a)t+\phi_2]\}$$

Observe these frequency components unfold as a full quadrature sideband contained within the band limits of one channel. The accompanying band modulation inputs of "HIPS" Direct channel II to DBM 113U develop product components in the output that locate about the quadratured sideband channel in the manner shown by the Channel Operation sketch ◇1 of FIG. 3. The passage of the desired channel I sideband output is accomplished by applying DBM 113U output, the sole quadrature sideband signal Ⓗ, to, and passed through unattenuated by the symmetrical bandpass filter 715U′ and is designated as band signal (H′).

For the intermediate quadrature channel process, the product operation that occurs in the output of double balanced modulator 213U is signal band Ⓖ multiplied by carrier signal cos $(W_o-2W_M)t$, which is cos $(W_c+W_M)t$, resulting in signal Ⓘ. Analytically, the output is expressed as $$-\tfrac{1}{8}\{\cos[(W_o-4W_M+W_at-\phi_1]+\cos[(W_o-W_a)t+\phi_1]-\cos[(W_o-4W_M-W_a)t+\phi_1]-\cos[(W_o+W_a)t-\phi_1]-\cos[(W_o-4W_M+W_a)t+\phi_2]-\cos[(W_o-W_a)t-\phi_2]+\cos[(W_o-4W_M-W_a)t-\phi_2]+\cos[W_o+W_a)t+\phi_2]\}$$

The signal band input of HIPS Translation channel II as combined and applied to DBM 213U input develops modulation products in the modulated output that position about the double sideband quadrature output as illustrated by the Channel Operation sketch ◇1 of FIG. 3. The passage of the desired channel IV sideband output of DBM 213U is made by feeding the double sideband output signal Ⓘ to symmetrical bandpass filter BPF 715U, which by design is similar to BPF 715U′, having its center frequency value at $(f_c+3f_M)$ and being of flat bandpass region encompassing channels II and IV, and one of the adjacent channels thereto. BPF 715U passes unattenuated only the USB component content of double SB signal Ⓘ and readily rejects the LSB terms. The passed signal indicated as I′ output of BPF 715U is thus the upper sideband product $$\tfrac{1}{8}\{\cos[(W_0+W_a)t+\phi_2]+\cos[(W_0-W_a)t+\phi_1]-\cos[(W_0-W_a)t-\phi_2]-\cos[(W_0+W_a)t-\phi_1]\}$$

The (H′) band signal output of BPF 715U feeds to Time Delay Compensation and Amplitude Equalization Stage 716U. TDC and AE stage 716U functions to negate the time delay occurring to band signal Ⓕ, thereby compensates for the delay introduced by the HPF-LPF combination, with Ⓕ delay representing band signal Ⓖ; and to equate amplitude in compensation for losses in the second quadrature of the IQC translation operation. Equalization between the Intermediate Quadrature Channel IQC 700 and the other direct channel used in the quadrature system transmission may be brought about by various design techniques familiar to those skilled in the art.

With proper channel equalization made, the band output signal (H′) of TDC and AE stage 716U is applied to one of the inputs of linear difference combiner 717U. The other input to the linear difference combiner 717U is being supplied from the output of BPF 715U as band signal (I′).

The difference combined output of band signal (J) results from the difference (I′) taken from (H′), and can be expressed as $$\{\cos [(W_0-W_a)t+\phi_1]+\cos [(W_0+W_a)t+\phi_2]\}$$

Hence, the foregoing analysis demonstrates that the audio modulating band B2 input signal of (A) represented by the expression $$\{\cos [(W_M-W_a)t+\phi_1]+\cos [(W_M+W_a)t+\phi_2]\}$$

is modulated as a SSB output at Channel IV with respect to the virtual common carrier frequency value of $f_c$ (as $W_c$); and becomes $$\{\cos [(W_0-W_a)t+\phi_1]+\cos [(W_0+W_a)t+\phi_2]\}$$

at $W_0=(W_c+3W_M)$ for channel IV. A like operation can be demonstrated in the quadrature analysis for the case of A2 content channel III signal processing; and it is clear that for the reverse process, demodulation occurs.

The "IQM–HIPS" paired excitation operation, as described beforehand, is related to the role of a data transmission link; however, bidirectional action of a particular channel may be brought about in transceiver form. Though having the disclosed modulation techniques specifically suited to accept near constant amplitude data information input signals, in addition, the aforedescribed "ISM" systems encompass a performance capability quite adequate for voice radio communications.

DESCRIPTION OF ISB SYSTEM FOR "PIPS" AND "IQM" N FACTOR CASE OF 3: FIG. 5

In further contemplation of the "hybrid IPS" process described in the preceding paragraphs, key ingredients pointing to the novel way of hereinafter accommodating full bandwith handling throughout a phased modulation process is revealed. It should be observed that the first product operation with the mid-band carrier frequency signal of sin $W_Mt$ is equivalent in form to a product operation, where the carrier cos $W_Mt$ is used and thereupon passes the USB product terms through a 90° phase shift network to acquire the required $$[\sin (2W_M+W_n)t+\phi_n]$$

result. This alternate feature for half-bandwith operation relies upon an in-path quadrature operation for the audio frequency band of (2100 to 5100 c.p.s.) and is later implemented in FIGS. 8*a* and 8. Noting this, one recalls the earlier stated wide band phase shift deficiency that applies to the conventional phase shift method of SSB generation. The removal of this obstacle is thus undertaken by way of an equally unique second method of "oppositely offset phase shift intermediate sideband modulation" with audio range quadrature only and in having full signal band content always in effect. In view of the foregoing, the nature of this technique is aptly termed "pure intermediate phase shift" abbreviated as "PIPS"; and, constitutes the compatible counterpart to the advanced *n* factor case of three for the "intermediate quadrature modulation" (IQM) operation.

While the most obvious disadvantage of the conventional phase shift technique concerns the requirement of a wide band phase shift to balance out the undesired sideband, it is clear that the carrier suppression of this prior art method is solely the responsibility of accurate balance of both RF (or IF) modulators. This is not the case for "symmetrical intermediate sideband modulation," where signals in use that can similarly represent the output carrier reference experience both balanced modulator and filter suppression effects while the remaining carrier signals do not develop at the output as the carrier reference of the system.

Not to be overlooked is the fact that one now obtains desired sideband reinforcing and the benefits that accrue therefrom; this capability is directly lacking in the aforedescribed "HIPS" technique.

While it is the featured intent of this invention to bring forth the characteristic operational compatibility of the ("IPS") "intermediate phase shift" modulation techniques with the prior "IQM" method, it is also demonstrated that the band slot made available by the general intermediate sideband modulation (ISM) operations may be filled with voice or inverted speech information. The versatility that such structured system embodiment as FIG. 5 allows becomes clear from the following description thereof along with the operation discussion with respect to the FIG. 5 representations; symbolically illustrated and analyzed in FIGS. 6*a*, 6*b* and 7.

OPPOSITELY OFFSET LOCAL OSCILLATOR—CARRIER SIGNAL GENERATION: FIG. 5

Consider first the operation that concerns the development of the oppositely-offset local oscillator signals of the system for the multi-channel and the quadrature mode. The modulating input signal that is applied to double balanced modulator 113 is as shown in sketch 112. The local oscillator signal, 317, which is the carrier input to the double balanced modulator and the signal to which the modulator is balanced in order to attain proper suppression, lies below the reference carrier frequency $f_c$=100K c.p.s. of the modulator section by $f_M$=1.8K c.p.s.

Now the 1800 c.p.s. carrier signal can directly be derived from audio reference oscillator 301, which may be temperature-controlled or compensated as by an enclosure with the conventional oven 300, and may well be of the crystal controlled type. Obviously insuring the required signal frequency (value of 1800 c.p.s.) use is to also be derived and continuously supplied from the frequency synthesizer proper, through established phase lock technique. For example, the reference 100 kc. standard frequency can be divided down 10:1 to 10 kc. by divider 501, and then the 10 kc. signal divided down 10:1 to 1 kc. using regenerative frequency divider 502. The 9 kc. signal internally generated within the regenerative feedback loop of frequency divider 502 is fed by separate path to a 5:1 divider 503 for the 1800 c.p.s. carrier signal, and by way of switch 504 applied to amplifier 302 to the balanced modulators. The 1800 c.p.s. oscillator signal is applied to tuned audio amplifier stages 302, which also serves as a buffer, amplifies the carrier signal up to the proper level for application to the double balanced modulators 108 and 208 over paths 303 and 304, respectively to serve as the described carrier frequency input to these modulators. Portions of amplifier 302's output are also applied to a series of product modulators via signal path 305 as an input modulating signal, and fed also to a phase shifter.

The manner by which the reference audio carrier signal, $f_m$=1800 c.p.s. frequency is synthesized from the 100K c.p.s. I.F. carrier reference standard source of the transmission system has also been described with respect to FIG. 4. Now in accord with standard signal analysis convention, arbitrary cosine designations are given to the pair of frequency signals in order to understand the further frequency synthesis that occurs in the generation of the remaining carrier signals required.

Refer now to the carrier generation system diagram of FIG. 5, wherein the 1800 c.p.s. signal of cos $W_mt$ form is further applied to the inputs of 90° phase shift network 91, product multiplier 92, and a pair of double balanced modulators 93 and 96. The shifted 1800 c.p.s. signal output of phase shift network 91 is of the form sin $W_mt$ and is supplied over two paths. One path connects to double balanced modulator 601 of the "IQM" quadrature channel, and this inpath operation is described in the later FIG. 7 section.

The other path connects sin $W_mt$ as the other input to product multiplier 92. The output of product multiplier 92 is of the form $$(\sin W_Mt)(\cos W_Mt) = (\tfrac{1}{2}) \sin 2W_Mt$$

that is, of a double frequency value=3600 c.p.s. and in quadrature with reference cos $W_mt$ audio carrier signal of 1800 c.p.s. value. The sin $2W_mt$ signal output of product multiplier 92 is fed over two paths. One path leads via selector switch SW 01 to provide a carrier signal to double balanced modulator 606 of the "IQM" quadrature channel, and this operation is given later in the multiple moding discussion relating to FIG. 6*a*. The other path connects sin $2W_Mt$ as the other input to double balanced modulator 93. The double sideband product output of double balanced modulator 93 may be expressed as (assuming unity amplitudes);

$$[(\cos W_Mt)(\sin 2W_Mt)] = [\tfrac{1}{2} \sin (2W_M + W_Mt + \tfrac{1}{2} \sin (2W_M - W_Mt] = \tfrac{1}{2}(\sin W_Mt + \sin 3W_Mt)$$

The sum and difference frequency output of 1800 c.p.s. and 3(1800)=5400 c.p.s. is fed to the input of bandpass filter 94. Bandpass filter 94 has its center frequency value at $f_{CF}$=5400 c.p.s. and passes only the sum product component while readily rejecting the difference frequency term. The BPF 94 sin $3W_mt$ output is applied over three paths. One path leads via selector switch SW 01 to the carrier input of double balanced modulator 606 of the "IQM" quadrature channel and this in path operation will also be considered in the later paragraphs on "IQM," $n=3$, signal analysis described in relation to FIG. 7.

Over the second path, sin $3W_{mt}$ signal connects directly to the carrier signal input of double balanced modulator 231 and functions within the operations that are concerned with the second quadrature process of the "pure intermediate phase shift" (PIPS) technique of this present invention.

The third path supplies the 5400 c.p.s. signal to the input of factor of two frequency divider 95, which is of the synchronized pulse type. Accordingly, the divider 95 frequency output of 5400/2=2700 c.p.s. is also of the sin $3/2W_mt$ form and is applied over two paths. One path feeds to the modulating signal input of balanced modulator 306.

The second path connects to the other input of double balanced modulator 96. The double sideband product output of double balanced modulator 96 is of the form;

$$[(\sin 3/2W_Mt)(\cos W_Mt)] = \tfrac{1}{2}\{\sin (3/2W_M + W_Mt + \sin (3/2W_M - W_M)t\} = \tfrac{1}{2}\{(\sin 5/2W_Mt) + (\sin \tfrac{1}{2}W_Mt)\}$$

comprising thereby the sum component of 4500 c.p.s. and the difference frequency term of 900 c.p.s. The two frequency component output feeds to bandpass filter 97 input. Bandpass filter 97 has its center frequency value at $f_{CF}$=4500 c.p.s. and passes only the sum term while readily rejecting the 900 c.p.s. difference frequency term. Thereupon BPF 97 sin $5/2W_Mt$ output is supplied to the modulating signal input of balanced modulator 98, which is receiving its carrier signal (cos $W_ct$) as 100 kc. supplied over path 408 from the synthesizer 404.

The double sideband product output of balanced modulator 98 expresses itself in the form:

$$[(\cos W_ct)(\sin 5/2W_Mt)] = \tfrac{1}{2}\{\sin (W_c + 5/2W_M)t + \sin (W_c - 5/2W_M)t\}$$

Numerically, the sum term is $$(100\text{K c.p.s.} + 4500 \text{ c.p.s.}) = 104.5\text{K c.p.s.})$$

and the difference result is $$(100\text{K c.p.s.} - 4500 \text{ c.p.s.}) = 95.5\text{K c.p.s.}$$

Bandpass filter 99 connects to balanced modulator 98 output and, being of high selectivity about its center frequency value of 95.5K c.p.s., passes only the difference frequency term of sin $(W_c - 5/2W_m)t$ while readily rejecting the sum product component. The BPF 99 signal output feeds to the carrier signal input of balanced modulator 306. Product modulation is then of the form $$[\sin (W_c - 5/2W_M)t][\sin (3/2W_M)t] = \tfrac{1}{2}\{\cos [(W_c - 4W_M)t] - \cos [(W_c - W_M)t]\}$$

The balanced modulator 306 output at 307 is as shown at 308 and frequency-wise consists of the suppressed carrier signal of 95.5 kc. and the sum and difference frequency products of the 2700 cycle input and 95.5 kc. carrier signal. Thus upper and lower sideband frequency components are developed where the upper sideband term is (95.5 kc.+2.7 kc.)=98.2 kc. and the lower sideband term (95.5 kc.−2.7 kc.)=92.8 kc. This double sideband output is simultaneously applied to circuit two paths 309 and 310. Signal path 309 leads to selective bandpass crystal filter 311 which has a center frequency value equal to the USB component frequency value of 98.2 kc.; while signal path 310 leads to selective bandpass crystal filter 312 which has a center frequency value equal to the LSB component frequency value of 92.8 kc.

The 95.5 kc. carrier signal suppressed by the action of modulator 306 is further reduced or eliminated in the direct modulation process by the selectivity characteristics of the narrow-bandpass crystal filters 311 and 312 along with the respective undesired sideband and component being applied.

Hence the output of filter 311 is the upper sideband component of 98.2 kc. (see 313), while the output of filter 312 is essentially the lower sideband component of 92.8 kc. (see 314). These signals are then applied to tuned local oscillator amplifiers 315 and 316, respectively, which are tuned to the frequency inputs of 98.2 kc. and 92.8 kc. respectively. These amplifiers are set to apply the proper carrier signal levels to the double balanced modulators 113 and 213. It is recognized that double sideband generation results in the development of sideband signals of equal amplitude and coherent phase.

Since sin form inputs are applied to balanced modulator 306, the multiplied product therebetween results in cos terms, as per trigonometric identity. The sum product is observed to be of opposite polarity (sign). However, tuned amplifier stage 315 by design may comprise a pair of gain stages, with the other tuned amplifier 315 being of a single stage or odd number of stages but having an overall amplification of gain equal to the pair. Thereby the amplifier 180 degree phase reversal characteristic gives the desired inversion of sum product term.

The synthesis of the applied carrier signals in the manner described above results from a phase coherent generation system. Other signal generation techniques bringing about the required phase interrelations are equally known in the art, and the illustrated method is but one preferred embodiment thereof, with a second being given in FIG. 7.

Of particular interest is the in-common usage of the sin $3W_mt$ signal as the intermediate carrier signal by both the "pure intermediate phase shift" (PIPS) modulation method and the "intermediate quadrature modulation" (IQM) technique for the specific design case of $n$ factor equal to three; in addition to the commonality of the mid-base band frequency signal of cos $W_mt$ or 1800 c.p.s. A further benefit develops, as will be pointed out in a later section since but a singular pair of symmetrical bandpass filters now handle the signal processing for the resulting ISB outputs of both the "PIPS" and the "IQM" exciter operations. The above stated compatible features, in being coupled with the in-common final pair of IF double balanced modulators, fully demonstrate the natural integration of the two intermediate sideband modulation approaches into a family of independent sideband communications systems basically structured upon an intermediate and oppositely offset in-common carrier signal technique.

OVERALL AUDIO INPUT BAND PROCESSING: FIG. 5

In FIG. 5, the audio input band processing section of the "quadruple moding," "symmetrical independent sideband modulation" (SISM) system primarily concerns the initial mid-base band frequency translation operations. At this point, only the stage functions that mainly relate to the particulars of the newly described "pure intermediate phase shift" (PIPS) modulation process will be delineated, since much of the "intermediate quadrature modulation" (IQM) operation is like that described for the $n=2$ case given earlier with the exception that the intermediate carrier is now 5400 c.p.s. for for the $n$ factor of 3.

For convenience, the data information signal B1 (PIPS) input from the audio center 100 is generally shown following the voice band input channel path of stages in section 202. However, the "PIPS" data link technique is in proper use where a separate data input path of linear phase versus frequency characteristic is supplied, or the channel section 202 is designed to exhibit constant time delay.

A second band A1 (IQM) input is obtained from audio center 100 and supplied via signal processing stages of section 102. The functions of stages 203 through 206 (and 103 through 108) are generally known to the art, and spectrum sketch 208 (and 107) shows the band output.

The circuit arrangement for the audio region "IQM" processing of A1 content includes a pair of channel paths. The "IQM" direct channel path consists of double balanced modulator 608 and low pass filter **600*a*; the output of which connects to one input of linear channel sum network 16. The "IQM" translation channel path includes double balanced modulator 601, low pass filter 603, double balanced modulator 606 and bandpass filter combination 610 connected in tandem. The output is applied to one input of linear channel sum network 15**. The particulars of the "IQM" technique are given in the signal analysis of FIG. 7.

A voice mode path for A1 is provided by the intandem stage connection of double balanced modulator 108, high pass filter 110 and low pass filter 111, feeding (2100–5100) c.p.s. spectrum content via position V of mode switch SW 03 to one input of linear channel sum network 16. This specific voice mode operation is in like accord with the channel I generation technique established in my transmission system of U.S. Pat. No. 3,217,-256.

Likewise, a second voice mode is produced by applying a voice band input to position V of mode switch SW 02 over a signal path comprising double balanced modulator 606 connecting in cascade to bandpass filter combination 610. The output feeds one input of linear channel sum network 15. The carrier signals supplied to the above mentioned double balanced modulator have already been described and the resulting operations are familiar to the art.

"PIPS" TECHNIQUE: FIG. 5

In proceeding to detail the "PIPS" modulation process, the signal path of the B1 content of spectrum sketch 207 is functionally examined in the course of its compatible operation with the "IQM" channel of A1 content in the immediately following paragraph section designated common input translation, in-path quadrature, intermediate phase shift operation, and in-common I.F. symmetrical filtering operation.

COMMON INPUT TRANSLATION

Information band B1 content 207 is fed to the modulating signal input of double balanced modulator 208, which as earlier mentioned is receiving cos $W_mt$ signal at its carrier input. The product output is the double sideband spectrum distribution about the mid-base band frequency $F_m=1800$ c.p.s. shown in spectrum sketch 209, and is applied to the input of bandpass filter combination (BPF combo.) 218. BPF 218 is shown to comprise high pass filter 210 in cascade with low pass filter 211 which establishes a flat bandpass region of linear phase-frequency characteristic over the bandwidth of 2100 to 5100 c.p.s.

Accordingly, only the sum product terms of 2100 to 5100 c.p.s. pass unattenuated and appear at BPF 218 output, as shown in sketch 212, while the difference frequency components are readily suppressed. BPF 218 output is supplied over two paths, one path is designated as "PIPS direct channel," and the other path is termed "PIPS translation channel."

To this extent, the initial input band transposition of the "PIPS" technique is like that of the aforedescribed "HIPS" operation and hereafter the distinctive differences therebetween become apparent.

IN-PATH QUADRATURE

In the general development of audio phase (quadrature) shift networks, it is observed that, with increasingly complex network design, an increased amount of phase error necessarily accompanies the process. With the single frequency design being the extreme example thereto, for smaller frequency ratio, the phase error is smaller. Here then the "pure intermediate phase shift" (PIPS) technique serves to additional advantage.

Note well, the 3000 c.p.s. bandwidth (300 to 3300) is an eleven to one frequency ratio that is now translated 2100 to 5100 c.p.s. thereby giving but a frequency ratio of under 2.5 to 1. With this new design requirement, the 90 degree phase shift may be made directly in one lumped stage operation; with some attendent benefits acquired thereby in the case of interchanging with a voice band operation of the subject ISB transmission system. This performance feature is further discussed with respect to FIG. 6.

However, in the embodiment of FIG. 5, a pair of 45 degree phase shift networks are used. The +45 degree phase shift stage **230*a* is connected into the signal path designated as the PIPS direct channel, while the −45 phase shift network 230*b*** connects into the PIPS translated path. This design as made accomplishes a sum total amount of 90 degree phase shift of the spectrum content between (2100–5100) c.p.s. This phase shift procedure represents the first quadrature operation between the two signal paths, and the second $\pi/2$ phase shifting action is brought about by an intermediate modulation phase shift carrier technique.

INTERMEDIATE PHASE SHIFT OPERATION

For the pure intermediate phase shift (PIPS) operation, the translated input band of 2100 to 5100 c.p.s. from the output of phase shift network **230*b* becomes the modulating signal input applied to the double balanced modulator 231. The carrier signal fed to the double balanced modulator 231 is the phase coherent and tripled $W_m$ frequency signal (sin $3W_mt$) obtained from the output of band pass filter 94. This sin $3W_mt$ carrier signal is in phase quadrature to the oppositely offset I.F. carrier signal of 98.2K c.p.s. applied to the double balanced modulator 113. The phasing relationships in the generation of the required carrier signals are described elsewhere. With the tripled frequency term $3W_m$, being 3 (1800)=5400 c.p.s. carrier signal, the value of double balanced modulator 231 becomes clear as it functions to suppress the 2100 to 5100 c.p.s. input band signal from appearing in this modulator's output. In this manner, the double balanced modulator 231 accomplishes a second purpose as the resulting band vacancy in the modulator output is subsequently occupied by the (3900 to 6900 c.p.s.) band signal generation made in the "IQM" translated channel for the duo-modulation system capability. This band slot develops between the sum and the difference sideband products of DBM 231 operation. Accordingly, the lower (LSB) sideband locates in an inverted manner in a bandwidth between 300 to 3300 c.p.s.; while the upper (USB) sum terms comprise components between 7500 to 10,500 c.p.s. The desired and generally required 600 c.p.s. between band signal separation is thus secured and maintained throughout. Spectrum sketch 223***a* illustrates the band distribution.

The pairs of channels associated with the two distinct methods of modulation find their common joining point at the linearly summed outputs of the particular channel combining network to which they are applied. As such, linear channel sum network 15 receives the "PIPS" direct input of (2100–5100 c.p.s.) and the other input is the (0–1500 c.p.s.) "IQM" direct A1 band signal; and supplies the combination as the modulation signal input to the double balanced modulator 113. The modulation signal input to the double balanced modulator 213 is obtained from the band combined output of linear channel sum network 16. Low pass filter 233, connected in the output of DBM 231 and of slightly greater than 10,500 c.p.s. cutoff frequency, passes the double sideband product without attenuation as the input to combiner network 16. The other input being combined is obtained from the "IQM" translation A1 channel generation. Since the above designated band slot vacated spectrum spacing exists, no like signal interaction is noted to occur. Low pass filter 233 possesses a linear phase to frequency characteristic over the frequency region of 300 to 10,500 c.p.s.; and thus the double sideband product signal passing therethrough experiences a constant time delay. The delay factor is taken into account in the subsequent recombining process that occurs in the in-common I.F. symmetrical filtering operation which is described in the following section. The spectrum distribution of the composite signal applied to the modulating signal input of double balanced modulator 213 is shown in spectrum sketch 213*a*.

IN-COMMON I.F. SYMMETRICAL FILTERING OPERATION: FOR "PIPS" USB AND "IQM" LSB

Refer now to FIG. *5d*, which illustrates the in-common I.F.–R.F. sideband filtering and transmission output response process that takes place. The sideband outputs of double balanced modulator 113 are commonly applied to the inputs of a pair of differing type filter structures. One path connects to Upper Sideband (USB) crystal filter stage 115, which is designed to pass the sideband 300 to 3300 c.p.s. above the virtual carrier frequency 100K c.p.s., and readily rejects all other frequencies. The other path connects to the input of Bandpass filter 715*c*, which is of symmetrical design having a center frequency value of 98.2K c.p.s. and a pass band region of 10,200 c.p.s. Accordingly, this symmetrical filter is designed to encompass information bandwidths of channels I and II along with the undesired lower sideband content of the "intermediate phase shift" modulated input band "B1 located in the unused channel III position."

The sideband outputs of the double balanced modulator 213 are also supplied and fed as a common input to a filter pair. One path connects modulator 213 to the bandpass filter 715*d*, which is identical to bandpass filter 715*c*. The other path leading from modulator 213 connects to lower sideband crystal filter 215, which like USB crystal filter 115 is of asymmetrical characteristic, and passes frequency components located between 300 to 3300 c.p.s. below the 100K c.p.s. virtual carrier value, and readily attenuates all others. The outputs of the crystal sideband filters 115 and 215 connect to wipers of mode switches SW 05 and 04, which are shown placed in a grounded contact position labelled data.

With respect to "PIPS" and "IQM" band input modulations to modulator 113, all three sideband structure products that develop in modulator 113 output are passed without attenuation at the output of bandpass filter 715*c*. This output is represented by way of spectrum structure sketch 114. The modulator 213 output contains a total of six (6) sideband structures, of which the three having frequency components above the 92.8K c.p.s. actual carrier local oscillator signal and are passed without attenuation by bandpass filter 715*d*; while the other three sideband structures below 92.8K c.p.s. are thereby heavily suppressed. For convenience only the passed sideband structures are shown by spectrum structure sketch 214, which represents the output of bandpass filter 715*d*.

The passed output of bandpass filter 715*c* is applied to amplitude equalization and time delay compensation stage 716*a*, which again is briefly designated as AE & TDC 716*a*. Since one pair of the two pairs of channel operations under examination experiences additional intermediate phasing processing; the phase and amplitude relationships between the modulated channel outputs to be combined is thereby compensated in phase linarization and equalized in amplitude in order to thus accomplish the destructive cancellation of the undesired sidebands and reinforcing of the desired sidebands under consideration.

The double sideband "PIPS" products along with "IQM" unfolded translated information about the location ($f_c$—1800 c.p.s.) or 98.2 kc. is passed through AE & TDC network 716*a*, which may comprise conventional filter sections that duplicate the amount of the envelope group delay introduced for the modulating signals passage through the intermediate carrier operations by the LPF 233 and BPF 610 bandpass combination; and also equals the signal energy loss encountered thereby.

This network 716*a* delay factor, when coupled with the group delay of the bandpass filter 610 for "IQM" and LPF 233 for the "PIPS" combination in the intermediate translation paths equalizes the time delay for the linearized phase shape characteristics of the two pairs of channels, and waveforms are preserved thereby.

At the 100K c.p.s. region, a microsecond delay amounts to a 36 degree phase shift compensation. The "IQM–PIPS" direct channel paths and the intermediate translated channel paths have travelled through like stages except for the second intermediate operations of the "IQM–PIPS" process. Since the BPF combination 610 and LPF 233 are at audio range and of linear phase design, the time delays are a fixed amount that is balanced by a like delay time insertion for the other channels.

The handling of the "IQM" channel content has been aptly described in the specification material of the aforementioned copending patent application. Stage AE & TDC 716*a* design procedure is quite similar for "PIPS" modulation; and the time and amplitude loss encountered in the "PIPS" translated path signal processing is thus negated.

The passed output of bandpass filter 715*d* directly feeds to one input of the linear difference combining network 717*a*; while the loss equated and delay compensated output of AE & TDC stage 716*a* connects to the other input of the subtractive difference combiner 717*a*.

The quadrature and amplitude relationship between the two differenced sidebands are then such that the undesired sideband content is phase cancelled while the wanted sideband information is additively reinforced. Thereby, only the B1 content desired channel II (PIPS) SSB sideband results at the linear difference network 717*a* output, along with the desired channel I (or A1–"IQM") content which remains unaffected. The subtractive result is then applied to channel II bandpass filter 719a (or channel I bandpass filter 718a) by way of position II (or I) of mode select SW 06. Further suppression of undesired channel I (or channel II) can be here accomplished as will be later pointed out. The resultant output of the linear difference combining network 717a is represented as shown by the spectrum structure sketch 402. The lowest frequency sideband of the "PIPS" operation is fully suppressed by the phase cancelling action brought about through the described signal processing that has been experienced. Thus, the sum product sideband of the "PIPS" operation remains and is reinforced as the USB CHAN. II B1 transmission output of the two channel ISB Communication System. The "IQM" operation being herein combined in a subtractive manner, results in the development of the LSB CHAN.Ⓘ A1 output generation with respect to the I.F. carrier reference of the overall system.

The subsequent functioning of the in-common I.F.–R.F. stage operations that follows from this point on are the essential transmission stages given for the overall system, which comprises channel I BPF 718a channel II BPF 719a, linear combiner 401, I.F. amplifier 403, synthesizer controlled frequency translation section 404, driver and final HF linear power amplifier 405 and antenna 406. With USB asymmetric filter 115 and LSB asymmetric filter 215 not in use, the descriptive material given in the above paragraph sections of this specification demonstrates that a pair of symmetrical data link channels are established within the ISB excitation system.

Accordingly, the channel II (or I) passed output of bandpass filters 719a (or 718a) connects to position II (or I) contact of mode switch select SW 06 and also the center position contact of mode select switch SW 06 receives directly, the channel I and II passed output of linear difference combining network 717a.

The pole of mode select-switch SW 06 connects II (or I) of the center position to one input of the three way linear sum mixing combining network 401; the output of which connects to I.F. amplifier 403.

The two channel output of sum combining network 401 with mode switch SW 06 in center position is illustrated in spectrum band sketch 402.

TRANSMISSION SYSTEM OUTPUT

The method of carrier insertion is quite conventional and similar to the present technique of carrier reinsertion. The 100 kc. carrier injection signal is supplied from the 100 kc. master oscillator frequency standard of the transmission systems frequency synthesizer contained within the synthesizer controlled frequency translation section 404. Besides being internally supplied in the conventional and well-known manner of synthesis operation for the generation of the range of selectable equally stable frequencies required in the frequency translation, being converted I.F. to R.F. in transmission and in reception as a R.F. to I.F. conversion process accomplished by section 404, the 100 kc. standard frequency signal output 407 is also applied over two paths.

The 100 kc. I.F. amplifier stages 403, the synthesizer controlled frequency translation section 404, the intermediate power amplifier and final linear power amplifier and antenna coupling stages 405 and associated antenna 406, are all in a common path to the pair of sideband signals with bandpass regions greater than 10 kc. and complete the transmission or reception path of a receiver transmitter system in the 2–32 mcs. range.

The communications system thus described achieves the ISB transmission standards for spectrum conservation and full channel utilization. With the allotted sideband channel spacing of 600 c.p.s. that is, 300 c.p.s. above and below the final transmitter carrier frequency, the system produces proper independent sideband data type channel transmission of upper and lower 3 kcs. bandwidth channel, comprising differing signal information content bands in a simultaneous manner.

For Asynchronous Single Sideband (ASSB) transmission, the described system requires merely the addition of a carrier component to its emission. The necessary carrier level amplitude is adjusted as shown by potentiometer 410 after the closure of switch 409. For independent sideband operation switch 409 remains open.

The other separate path of the 100 kc. standard frequency signal, which may be isolated, leads by way of 408 to carrier input of single balanced modulator 98.

As noted from the operational description given in the earlier paragraphs, the manner of the actual carrier signal frequencies generated and applied in the sideband modulation process of the modulator section is attained with phase coherence.

The connecting path between frequency translation section 404 and the drive and final linear HF power amplifier 405 is, as shown, made by way of T position closed contacts of the receiver transit switch 412. In T position, antenna 406 connects directly to the R.F.–I.F. translation section 404 by contact of R–T switch 412. The relay actuation between the receive-transmit position of switch 412 is made for normal transceiver operation control in the conventional manner by typical voice operated switch 413 commonly designated VOX.

Transceiver operation at the same frequency may also be accomplished by making "VOX" switchable use of common tuned circuits and heterodyne injection signals in receive and transmit modes. For example, referenced to the desired I.F. value, say 100K c.p.s., equivalent use may be made of the R.F. translator in the manner illustrated by FIG. 19–3, page 312, and described on page 313 in the 1964 publication, "Single Sideband Principles and Circuits," authored by E. W. Pappenfus, W. R. Bruene, and E. O. Schoenike, McGraw-Hill Book Co. In a like switchable manner, with suitable design as known in the art, to the illustrated circuit arrangement of FIG. 5, the common asymmetrical channel filters may be used in both the transmitting and receiving paths associated with the remaining channels in handling voice information.

The illustration of VOX 413 of FIG. 5 connected at the R.F. output is not herein intended to relate to multichannel operation but merely representative of one mode transceiver control for single channel operation, and other variations of this action are known to the art. More particularly, transceiver action is then primarily concerned with channel II bi-directional transmit-receive operation in the novel "intermediate phase shift" modulation mode; or as a selectable alternative, transmission is made on channel I and reception is obtained via "SISM" demodulation of channel II.

As is well known, communications often concern other than analogue voice, examples being, printed messages over long distance, along with frequency shift keyed radioteletype (FSK), and like digital techniques. For high frequency communications, recognized frequency diversity or other diversity techniques may be used to minimize short term or long term effects of multi-path experienced in the transmission medium. A more recent technique of greater message reliability is based on a method termed Quantized Frequency Modulation (QFM) and designated by the Military Services as the "Long Arm" system. The general application of a digital frequency converter is described in "New System Defeats Multipath Effect" by George A. Scheer, Wright Air Development Div., ARDC, Dayton, Ohio, a technical paper published in Electronic Industries, May 1960, pages 150–153, 156. Clearly, the side stepping R.F. translator described in the implementation of this technique may be readily added to the terminal exciter equipment associated with basically new modulation method of this invention; without any change but the replacing of conventional I.F.–R.F. frequency translator section 404 and with the application of the LONG ARM converter made prior to the linear power amplifier 405.

SYMBOLIC SIGNAL PROCESSING: MULTI-MODEING FIG. 6a

Figure 6A:
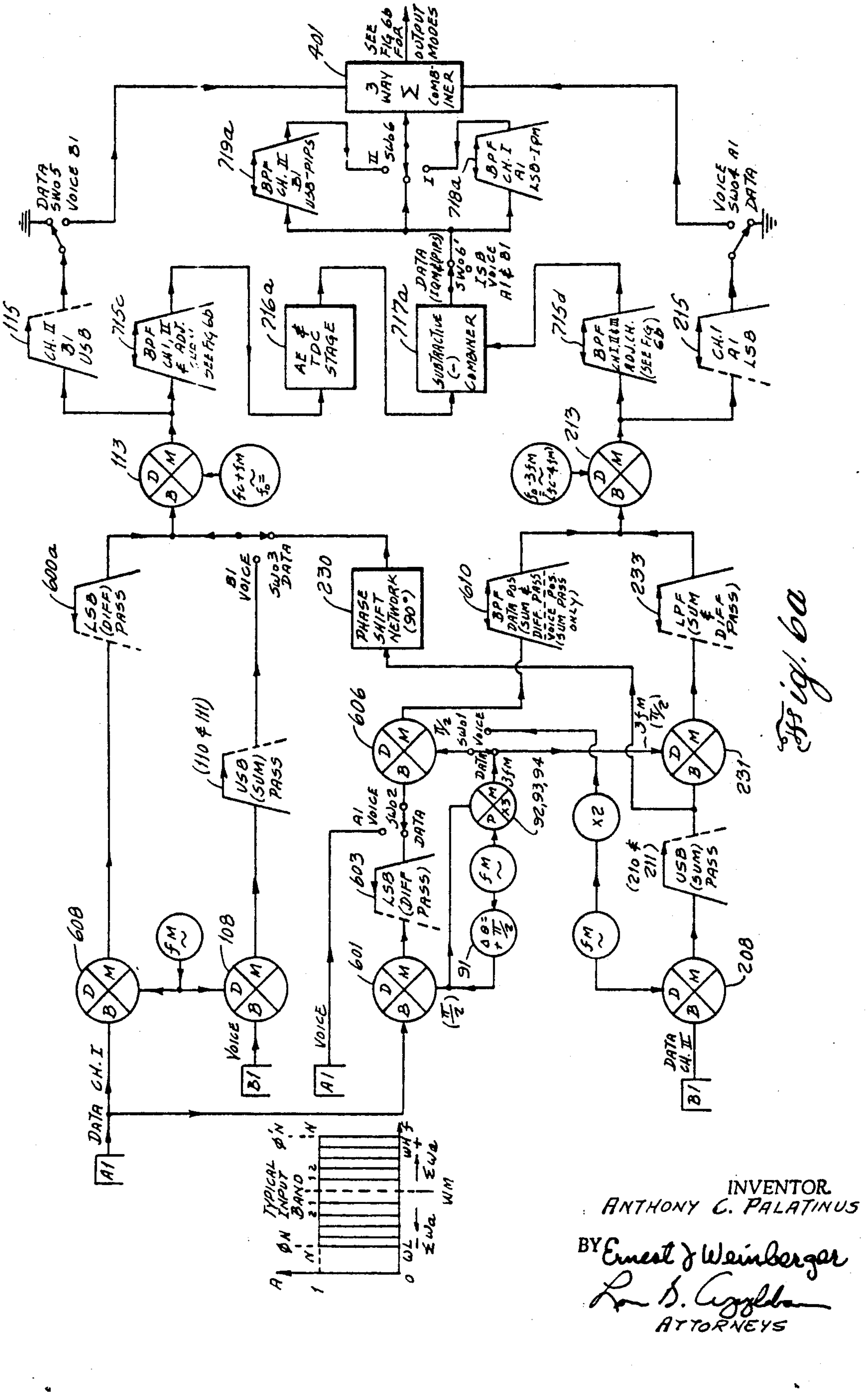
FIG. 6*a* represents a symbolic functional schematic illustrating the essential elements of the multiple mode ISB excitation system of FIG. 5.

Observe now in FIG. 6*a*, wherein for clarification of the signal process in the multi-moding ISB excitation, the modulation system is presented, in a symbolic functional schematic arrangement from which the operational purposes are best understood. The simplifications are made in accord with the designated conventions of the symbolic FIG. 3 given in my aforementioned copending application. In view of the detailed description of FIG. 5, the symbolic system representation of FIG. 6*a* becomes self-explanatory.

Figure 7A:
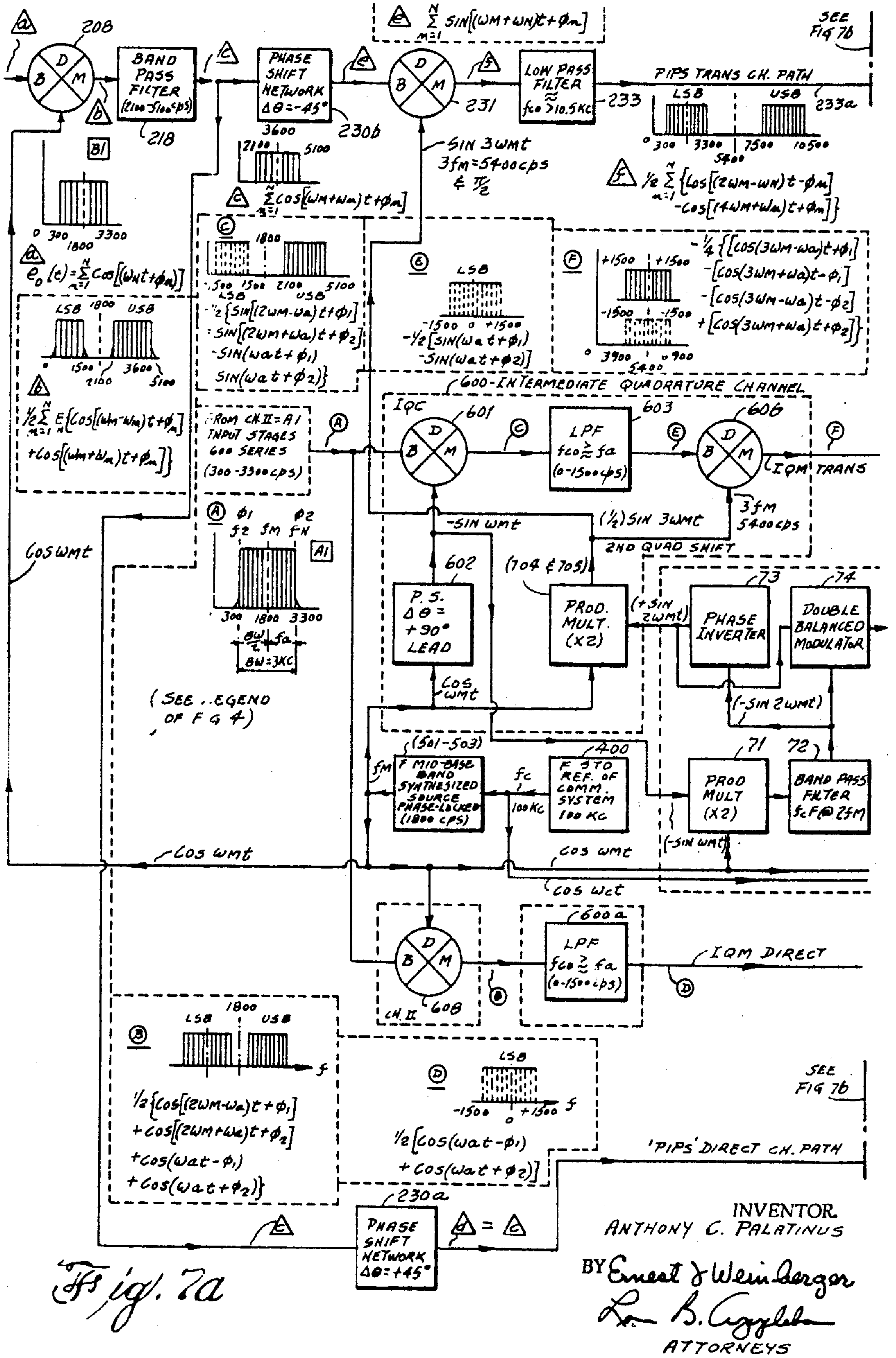
FIGS. 7*a* and *b* are symbolic circuit arrangement representations of the FIG. 5 embodiment of the "Symmetrical Intermediate Sideband Modulation Communications System" and presents the signal processing analysis of the "PIPS" operation along with an advanced case of "IQM" made in accordance with the principles of this invention.
Figure 7B:
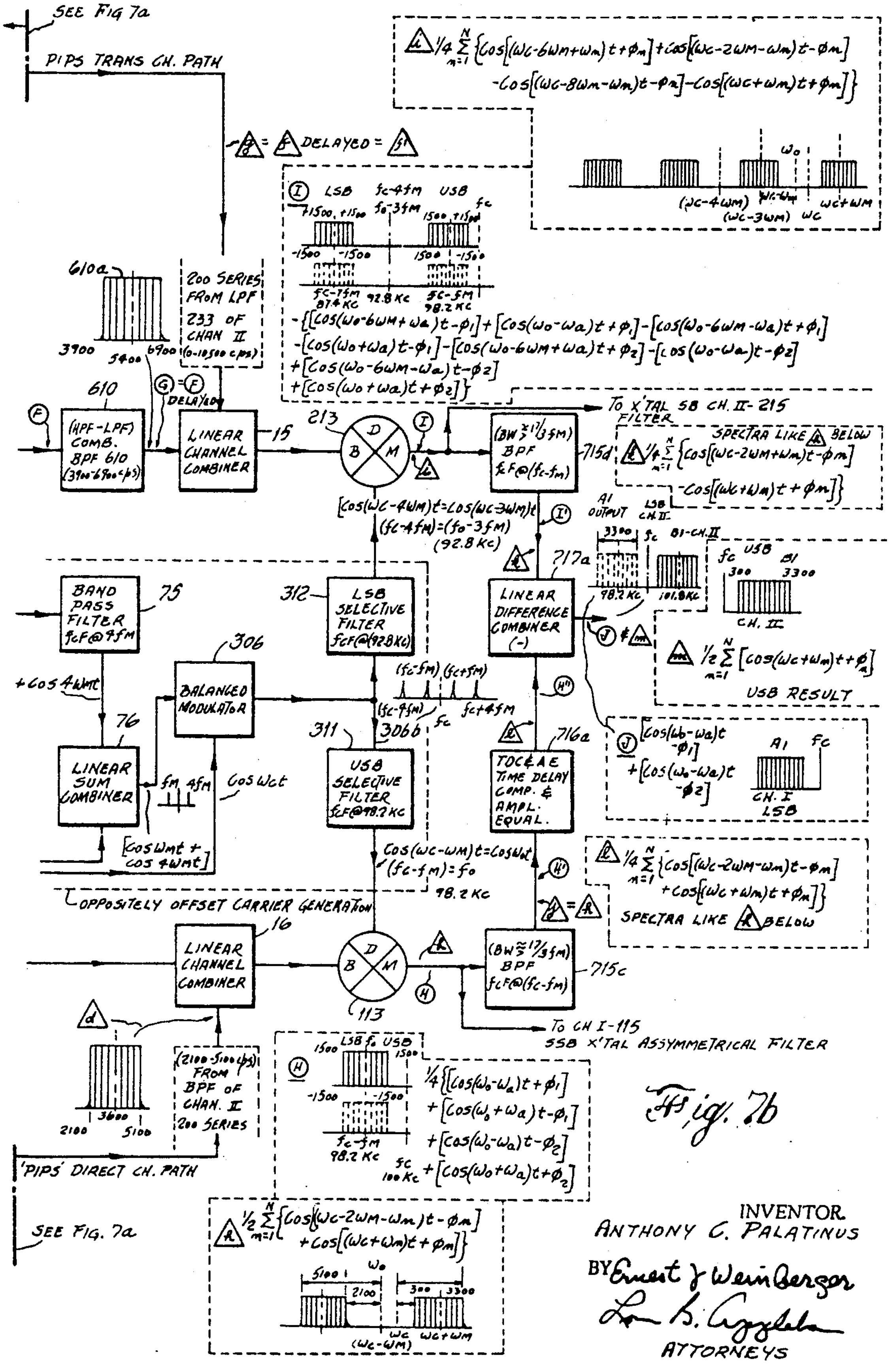

The product multiplication operation by way of PMX3 stage (92, 93, and 94) is further discussed in the signal analysis made for the circuits arrangement of FIG. 7.

Utilizing methods of alternating voice and data at the audio center (not shown), channel input bands A1 and B1 may be applied in the manner shown. Observe then B1 data type content feeds to DBM 208, whereas when in voice information from the B1 input is switched to DBM 108 signal path. For the A1 band input, data modulation is made by feeding the DBM's 601 and 608 inputs simultaneously, whereas inverted voice channel output is acquired by switchability applying A1 speech content to the input of DBM 606 when SW 02 wiper is in voice position. The manner of ganging the mode switches SW 01 through SW 06 with proper association may be readily determined from the prior FIG. 5 description in conjunction with the understanding of typical operational sequenses given in FIG. 6*b*.

The useful performance of multiple-modeing of voice and non-voice is clear since voice peaks are known to extend beyond data peaks, and thereby set the operating level thereat. Thus, the value of a prior mentioned amplitude ratio boost operation via now providing separated amplification within the pair of quadrature modulation paths becomes equally evident. Hence, even with intermediate phasing the non-voice channels may be kept at a like level though combinational use is made of the common R.F. modulators. It can be further seen that with such a duality of signal processing, the application for automatically controlling the channel gains of the system for the total independent sideband operation is more readily effected than would normally be the case; for herein the data channel paths are kept separate.

For the oppositely offset virtually carrierless method of sideband generation exampled herein, the low level voice modulation is deemed suitable since carrier suppression by the SSB type asymmetrical filters is not relied upon. The signals in the voice channel bands may be amplified by suitable USB and LSB amplifier stages following their crystal sideband filters. Hence, in a further extension of this approach, the voice modulation may be made at a lower level and thereafter sideband channel amplifiers employed following each of the crystal sideband filter stages prior to the combining operation. In a similar vein that also contributes to the establishment of the equal amplitude relationship between the channels, suitable attenuation may be inserted in the signal path between the bandpass filter outputs of BPF's 715 and linear subtractive network **717*a* inputs. Remaining always effective is the suppression obtained from the following single 718*a* channel I or 719*a* II bandpass filters in the common signal path as selected by mode switch SW 06**.

Figure 6B:
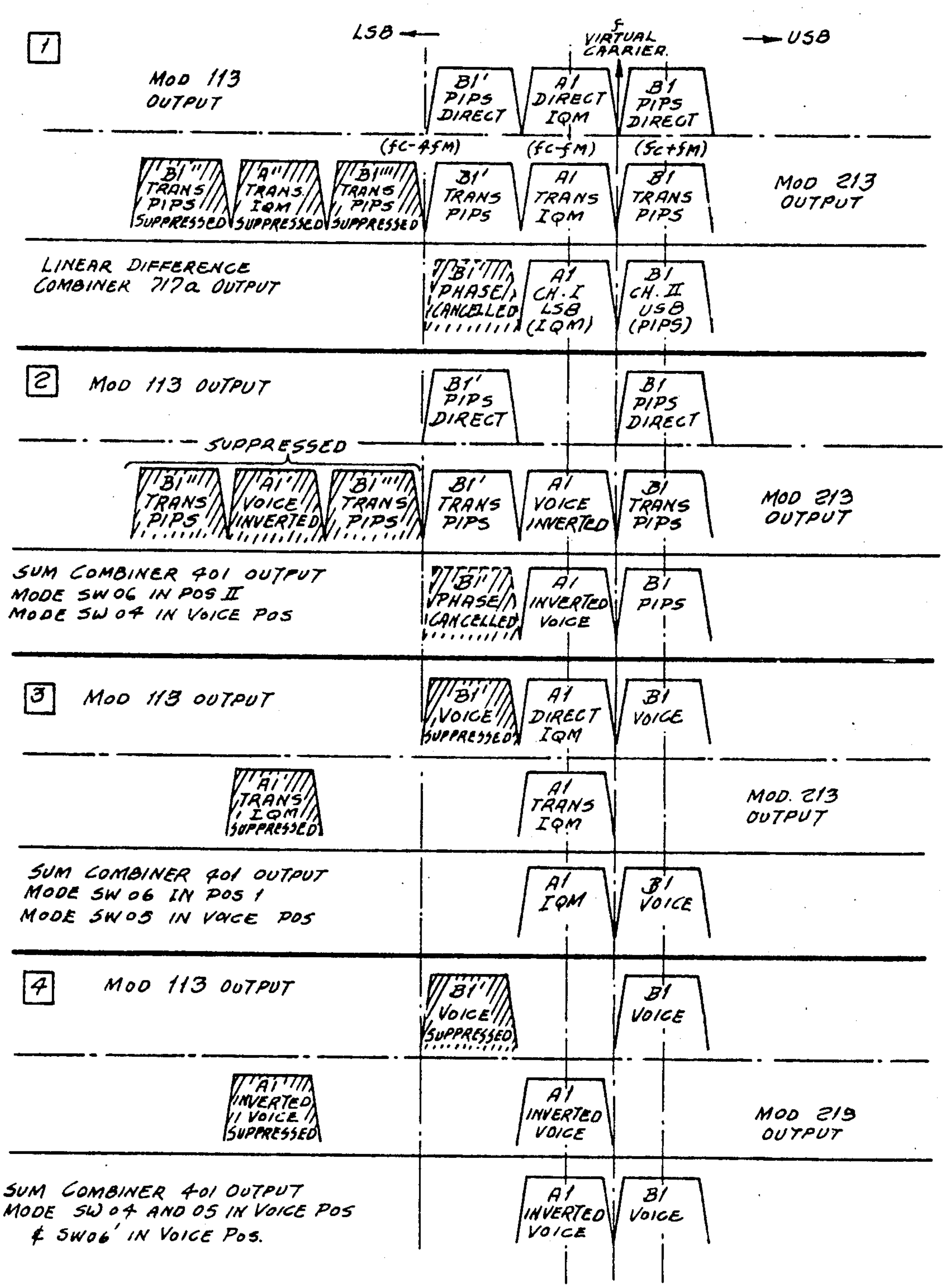
FIG. 6*b* presents functional sideband spectrum structures illustrating typical "quadruple modeing" accomplished by way of "pure intermediate phase shift" and/or "intermediate quadrature modulation" for the embodiment of FIG. 5.

TYPICAL QUADRUPLE MODEING IN SYMMETRICAL ISB OPERATION FOR OPPOSITELY OFFSET INTERMEDIATE PHASING "PIPS–IQM" SYSTEMS; FIG. 6b

Having described the elements of a "pure intermediate phase shift" operation, along with its compatible "intermediate quadrature modulation" mode for the design case factor of $n=3$, it is best at this point to refer to FIG. 6*b* for example spectrum band sketches that represent the sequence of sideband-structure locations to explain such typical "quadruple modeing" capability that is shown in FIG. 6*a*. The total two channel system bandwidth encompasses two 300 c.p.s. channels with 600 c.p.s. separation therebetween; or two times 3000+600=6600 c.p.s. Again, let $f$ virtual carrier be the common I.F. reference and thereafter further translated to be the transmission system station output frequency.

Observe sketch [1] which is the example "Symmetric ISB Two Data Channel Transmission System" operation that exhibits the newly advanced "pure intermediate phase shift" (PIPS) modulation of upper sideband (USB) for B1 channel II input and the compatible factor $n=3$ case of "intermediate quadrature modulation" produced as lower sideband (LSB) for A1 channel I input. As done in FIG. 3, the primed notation, where single, designates the lower sideband or difference frequency products; with multiple priming being made where more than one pair of sideband products result. This is indeed the case for the modulated output of balanced modulator 213. As shown, six (6) 3000 c.p.s. BW sidebands result, with only the B1 translated pure intermediate phase shift ("PIPS" Trans.) sideband content locating above the virtual carrier frequency. The frequency disposition of B1 Trans. PIPS coincides with the B1 PIPS direct sideband output from the balanced modulator 113. The nature of the A1 direct and translated sideband channel outputs for intermediate quadrature modulation (IQM) has been described in the copending patent application. For the factor case of $n=3$, herein, the "IQM" operation occurs only for the lower sideband (LSB) Channel I transmission system output. Here the band slot that the "IQM" mode occupies, is brought into existence by way of the "pure intermediate phase shift" (PIPS) modulation technique detailed in the prior paragraphs of this specification with respect to the FIG. 5. B1′ translated PIPS sideband output of modulator 213 frequency locates similarly as the B1′ PIPS direct difference product output of modulator 113; but its frequency components, though of equal amplitude, are of the opposite phase.

Accordingly, in the linear combination process, a difference or subtractive combiner **717*a*** operation is brought about that results in the phase cancellation of the undesired "PIPS" B1′ band content. Subsequently, the additively reinforced sideband outputs of the system transmission are composed of the LSB Channel I "IQM" band A1, and the USB Channel II "PIPS" band B1.

Sketch [2] illustrates the sideband structure for the mode operation wherein mode switch SW 04 in voice position supplies LSB crystal filter 215 output to sum combiner 401 and channel I is made asymmetric with A1 input being inverted speech type information. While channel II remains the "PIPS" process of sketch [1] as obtained from mode switch SW 06 position II, the voice type channel is acquired from the output of modulator 213 by the translation of the 300–3300 c.p.s. band to 2100–5100 c.p.s. via mode switch SW 02, voice positioned, in substitution of the prior A1 translated IQM band input. This constitutes the second operational mode of inverted voice-data input.

It is to be noted that the availability of inverted voice sideband channels is a natural condition of the modulation described herein. However, prior art processes are available for inverting the 300–3300 c.p.s. voice band signal itself. Hence, where such voice pre-inversion is already directly made at the modulation input, then the inverted speech operation thereafter functions as a normal voice transmission.

The third performance mode of data-normal voice comprises the maintaining of the A1 IQM channel I LSB process as obtained from mode switch SW 06, position I, and producing a B1 asymmetric channel II by supplying USB crystal filter 115 output to sum combiner 401 when mode switch SW 05 is in voice position. This is done in the similar manner as for sketch [2], except now the translated 2100–5100 c.p.s. voice band is applied to balanced modulator 113 via mode switch SW 03, voice positioned, in substitution for the prior "PIPS" direct input of sketch [1]. Sketch [3] represents the sideband structure for this operational mode. Sketch [4] illustrates the fourth manner of application, where now two asymmetric channels are provided for A1-inverted speech and B1 normal voice inputs. This procedure can be seen as a combination of channel I of sketch [2] and channel II of sketch [3].

The frequency displaced undesired sidebands indicated by sketch [1] gives perspective to an alternate "ISM" structure for the "IQM–PIPS" process. Let all the equalized and compensated modulated outputs first combine and then have two channel bandwidth bandpass filtering occur. This approach is detailed with respect to FIG. 8 and 8*a*.

"PIPS" MODULATION SIGNAL ANALYSIS AND SPECTRUM PROCESSING: FIG. 7 CARRIER SIGNAL GENERATION

In FIG. 5, one type carrier signal generation system is given; and here in FIG. 7, an alternative two frequency modulation approach for the generation of the required in-common intermediate carrier signal and the offset I.F. carrier signals is shown accomplished through the use of audio stages numbered 71 through 76.

Accordingly, product multiplier 71 receives signal cos $W_m t$ as one input and ($-\sin W_m t$) signal from +90° phase shift stage 602 as its other input. Product multiplier 71 as a double balanced modulator produces the output:

$$(-\sin W_M t)(\cos W_M t)=(\tfrac{1}{2})\ \sin 3W_M t$$

Carrying forth, for convenience, unity amplitude signals, product multiplier 71 output feeds to band pass filter 72, which has its center frequency at $2f_M$. The passed ($-\sin 2W_m t$) signal output of band pass filter 72 is supplied over two paths. One path supplies $\sin 2W_m t$ to one input of double balanced modulator (DBM) 74. The other path feeds phase inverter 73, which produces the output ($+\sin 2W_m t$). The signal ($+\sin 2W_m t$) is applied over one path to one input of product multiplier (604 and 605); and over another path, feeds to the other input of DBM 74. The double sideband product $$[(-\sin 2W_M t)(\sin 3W_M t)]$$

is expressed as $[(\tfrac{1}{2})(\cos 4W_M t-1)]$; and is fed to bandpass filter 75 which has center frequency value $4f_m$. BPF 75 passes only sum product term of ($\cos 4W_m t$) and supplies this signal to one input of linear sum combiner 76. The other input of sum combiner 76 is $\cos W_m t$ signal obtained from F mid-base band synthesized source (501–503). The combined two frequency equal amplitude signal output of sum combiner 76, expressed as ($\cos W_m t+\cos 4W_m t$), is applied to the modulating signal input of balanced modulator 306, which receives the carrier signal input $\cos W_c t$. The double sideband product output of modulator 306 is thus $$[(\cos W_M t+\cos 4W_M t)](\cos W_c t)=(\tfrac{1}{2})\{\cos (W_c+W_M)t+\cos (W_c-W_M)t+\cos (W_c-4W_M)t+\cos (W_c+4W_M)t$$

which represents the four frequency component spectrum structure shown in sketch 306*b*. Modulator 306 output feeds to the input of a pair of sideband selective filters, where USB selective filter 311 of center frequency 98.2 kc. passes only output signal $\cos (W_c-W_m)t$ and to the carrier signal input of DBM 113. LSB selective filter 312 of center frequency 92.8K c.p.s. passes only the output signal of $\cos (W_c-4W_m)t$ to the carrier signal input of DBM 213.

The commonly used intermediate carrier is derived from product multiplier (604 and 605) *dsb* operation:

$$[\cos W_M t(\sin 2W_M t)]=(\tfrac{1}{2})(\sin W_M t+\sin 3W_M t)$$

With assumed unity amplitude, the sum term $\sin 3W_m t$ is selectively filtered and supplied to double balanced modulator 606 for "IQM" and to DBM 231 for "PIPS" operation.

"PIPS" MODULATION SIGNAL ANALYSIS: FIG. 7

Refer now to FIG. 7, where the operational steps therein are located by the triangle enclosed small letter designations. At input application point △a, mathematically, the modulation operation can best be described in the following manner and terms as conventionally used: let the audio band B1 signal input for channel II be expressed as a complex waveform consisting of a summation of sinusoidal terms, such that:

$$e_{i1}(t)=\sum_{n=1}^{N} E_n \cos (W_n t+\phi_n)$$

where $E_n$ is the peak amplitude of the *n*th term, $W_n$ is the angular frequency associated with $E_n$ and $\phi_n$ is an arbitrary phase angle associated with $E_n$. It is to be noted that a similar input given as A1 is applicable simultaneously to channel I input and that the "IQM" analysis of channel I applies as for channel II *in* the first copending patent application modulation action. The 3000 c.p.s. bandpass region of bandwidth, W, where the input audio frequencies are limited to $$f_{low}\leqq f_n\leqq f_{low}+W$$

is set to be 300 to 3300 c.p.s. as they appear at the modulating signal input △a of the double balanced modulator 208.

Now consider the application of a carrier input to the modulation of fixed (reference) frequency value and having, for convenience, a unit amplitude. Let the carrier frequency be chosen as equal to the sum of the lowest input modulating frequency $f_n$ low plus the frequency amount that is equal to one-half the bandwidth W to which modulation frequency $W_n$ is limited. Thus, $$f_M=f_{n\ low}+\tfrac{1}{2}W$$

where this frequency herein constitutes the mid-base band frequency value, or $f_M$, which also represents the center frequency value of the bandpass region that is allowed to the modulating spectrum input, and may be expressed as $$f_M=\tfrac{1}{2}(f_{m\ low}+f_{m\ high})$$

In effect, the carrier frequency is positioned at the center of the band limited information spectrum.

The modulating input signal bandwidth as shown in spectrum sketch of △a is confined by band filtering between the limits of lower frequency value 300 c.p.s. ($f_{low}$) and upper frequency value 3300 c.p.s. ($f_{high}$), for for a total spectrum bandwidth of 3000 c.p.s. The ($f_M$) center frequency location of this spectrum portion of interest thus locates at $$f_M=f_{low}+\tfrac{1}{2}BW=300+\tfrac{1}{2}(3000)$$

or at 1800 c.p.s. This value then determines the carrier signal frequency value that is to be applied to the double balanced modulator 208. The generation of this 1800 c.p.s. carrier signal is described elsewhere, it being sufficient for present purposes to state that it is an exceedingly stable frequency, of high accuracy, with the proper carrier signal level being applied. The double balanced modulator 208 is of the product modulator type having its double balanced arrangement set to suppress the appearance of the carrier input in its output, this being the first or single balance; and further suppressing the appearance of the modulating signal input frequencies in its output, this being the second or double balanced condition. It is known that a product modulator secures a resultant output signal that is proportional to the amplitude product of the two input signals, that is, the product of the carrier and the modulating signals. The multiplication process in which two time-functions are multiplied together is expressed in the following manner:

$$e_{ol-1}=e_{i1}(t)I\cos W_M t$$

where I is the unity peak amplitude of the carrier frequency signal, $W_m$ is the angular frequency of the carrier wave and $e_{ol-1}$ is the time relationship of the modulator's output wave. By substitution, $$e_{0i-1}=\tfrac{1}{2}\sum_{n=1}^{N}E_n\cos(W_n t+\phi_n)\cos W_M t$$

which by trigonometric expansion becomes the product output:

$$\tfrac{1}{2}\sum_{n=1}^{N}\{E_n\cos[(W_M-W_n)t+\phi_n]+E_n\cos[(W_M+W_n)t+\phi_n]\}$$

Double balanced modulator 208 delivers a double side sideband output structure such as shown sketched for △b signals. The lower sidebands' content, which constitute the difference frequency product terms $$(W_m-W_n)$$

centers itself about the zero frequency axis (i.e., D.C.) such that it has folded over with frequency limits of (±1500 c.p.s.) for its 3000 c.p.s. bandwidth. The upper sideband of the double sideband output has its frequency component content consisting of sum frequency product terms $(W_m+W_n)$, and accordingly centers itself about the sum term of the input band center frequency value and the carrier frequency value to the modulator which has been set to be equal, thus giving a spectrum band center in the output of 1800 c.p.s. and 1800 c.p.s.=3600 c.p.s. Here the frequency limits for the 3000 c.p.s. bandwidth become 3600 c.p.s.±1500 c.p.s. or $$(3600-1500)=2100\text{ c.p.s.}$$

as the lower frequency limit and (3600+1500)=5100 c.p.s. for the upper frequency limit.

The minimum frequency separation between the two sidebands being equal to twice the lowest input modulating frequency or $2\times f_{low}=2\times 300=600$ c.p.s.

In cascade, the combination of linear phase-frequency characteristic high pass-low-pass filters are used to function as bandpass filter 218 connected to output of DBM 208. BPF 218 selects the upper (sum terms) sideband and attenuate the lower (difference terms) sideband. The cut-off frequency of the highpass filter is set at $$f_{c.o.HP}=(\tfrac{1}{2}W+2f_{low})$$

which is the lowest frequency value existing in the upper sideband output. The cut-off frequency for the low pass section then becomes $$f_{c.o.LP}=W+f_{c.o.HP}=3/2W+2f_{low}$$

A new band of modulating frequencies is thereby provided which exists between the limits of $$(\tfrac{1}{2}W\times 2f_{low})\leqq f_{new}\leqq(3/2W+2f_{low})$$

as indicated, and expressed as $$\sum_{n=1}^{N}\cos[(W_M+W_n)t+\phi_n]$$

This selected spectrum band output of the bandpass filter 218 is the signal △c located between the frequency limits of 2100 c.p.s. and 5100 c.p.s. with the 3000 c.p.s. channel bandwidth being maintained and the lower sideband output of the double balanced modulator greatly attenuated. At this point, the passed sideband structure being as shown has a new spectrum band center frequency value of $$f_{cb_{new}}=f_{low_{Upper}}+\tfrac{1}{2}BW=(2100\text{ c.p.s.}+1500\text{ c.p.s.})$$

or 3600 c.p.s. This new spectrum band of interest, now being signal △c is applied over two paths. One path passes △c through lead phase shifter 230a of $\Delta\phi=+45°$, which produces signal △d for the PIPS direct channel path. The other path leads to lag phase shifter 230b $\Delta\phi=-45°$, whereby the signal △e develops at the phase shifter 230b output as the quadrature of the signal △d. With a constant 90° phase difference being maintained between the direct PIPS and the PIPS translated lines, it is convenient to reference signal *d* as the cos signal △c and let the signal △e be the quadrature thereof, or $$\sum_{n=1}^{N}\sin[(W_M+W_n)t+\phi_n]$$

which thereupon feeds to double modulator 231 as the modulation signal input, DBM 231 receives the audio (second) carrier signal ($\sin 3W_m t$) or 5400 c.p.s. frequency. The DSB signal output signal △f is expressed as $$\tfrac{1}{2}\sum_{n=1}^{N}\{\cos[(2W_M-W_n)t-\phi_n]-\cos[(4W_M+W_n)t+\phi_n]\}$$

As may be observed from the spectrum sketch for signal △f, the LSB product results in difference frequencies between 300 to 3300 c.p.s., while the USB components are located in the 3000 c.p.s. bandwidth between 7500 to 10,500 c.p.s. The PIPS translation section further comprises the low pass filter 233 connected in the output of DBM 231 and having a cutoff frequency of slightly greater than 10.5K c.p.s. Accordingly, LPF passes the double sideband product without attenuation, which becomes the signal △g. In this intermediate step, the PIPS translation path experiences greater time delay and some signal loss as compared to the more direct processing path of the other channel to double balanced modulator 113. For convenience, the signal △g is denoted as signal △f′ being in essence the like spectrum structure as that of signal △f, but shown primed to differentiate for the added delay factor and amplitude change. LPF is of the linear phase-frequency characteristic, and therefore the time delay is a constant factor. Also the signal loss is a constant as the LPF 233 possesses a flat amplitude-frequency characteristics.

Signal △f′ feeds as one input to the linear channel combiner 16, which is receiving its other input as a modulation information band input of 3000 c.p.s. bandwidth between the band edge frequencies of 3900 to 6900 c.p.s. This input band of (±1500 c.p.s.) about the mid-band frequency of 5400 c.p.s. is supplied by the translation "IQM" channel I output for an A1–LSB transmission generation In the PIPS direct path, the signal △c is applied as one input to the linear channel combiner 15. The second input to the sum combiner 15 is obtained from the (0 to 1500 c.p.s.) output of the "IQM" direct channel I output for the AI–LSB production. Herein the "IQM" operation uses the same intermediate carrier signal of ($\sin 3W_m t$) as the PIPS translation process; and the manner by which this is accomplished for the factor case of $n=3$ is described in a section next of this specification.

For the moment, the channel combining operations will be overlooked, and consideration given to the singular application of the band signals △c and △f=△g to double balanced modulators 113 and 213 respectively. Recall from the earlier description for generation of the pair of oppositely offset I.F. carrier local oscillator signals, DBM 113 receives the carrier signal input of $\cos (W_c-W_m)t$; while the carrier input to DBM 213 is $\cos (W_c-4W_m)t$. Frequency-wise, these signals are the higher difference frequency output of USB filter 311 and the lower difference frequency output of LSB filter 312 respectively; as obtained from the double sideband product of balanced modulator 306 that is receiving inputs $\cos W_mt$ and $\cos 4W_mt$.

Consider then only the band signal △c output of channel combiner 16 as the modulating signal input to DBM 113, and the band signal △f′ output of channel combiner 15 as DBM 213 modulation input. For the direct PIPS process, a product operation of signal △c multiplied by carrier signal $\cos (W_c-W_m)t$ takes place resulting in signal △h. The double sideband product of DBM 113 is represented by:

$$\frac{1}{2}\sum_{n=1}^{N}\{\cos[(W_o-2W_M-W_n)t-\phi_n]+\cos[(W_o+W_n)t+\phi_n]\}$$

It is observed from the spectrum sketch of △h that the double sideband about the suppressed carrier $(W_c-W_M)$ or $(f_c-f_m)$ results in the development of the 300 to 3300 c.p.s. bandwidth in the upper sideband with respect to the reference I.F. of $f_c=100$ kc. Note that the accompanying band modulation input of A1–LSB IQM direct to DBM 113 unfold as (±0–1500 c.p.s.) frequency components about the suppressed carrier $(f_c-f_M)$ or $(W_c-W_m)$ location, and thereby functions as the full quadrature lower sideband contained within the band limits of the spectrum band slot or vacancy that exists between the double sideband product of the PIPS direct operation. This development is further shown in the prior channel operation sideband structure of [1] in the FIG. 6b drawing of this specification.

The passage of Channel I and the above described double sideband product is accomplished by applying the DBM 113 output over one path to the input of symmetrical bandpass filter 715c. BPF 715c is of center frequency value $(f_c-f_m)$ and of flat bandwidth slightly greater than (17/3 $f_m$) or 10.2K c.p.s. Thus, the entire output of DBM 113 is passed without attenuation by the symmetrical bandpass filter 715c; and the DSB product is termed as signal △i, which is like signal △h.

As noted beforehand, the band slot shown is filled with "IQM" mode content.

For the translated PIPS processing, the product operation that occurs in the output of double balanced modulator 213 is the signal $f'$ multiplied by the carrier signal $\cos (W_c-4W_m)t$, resulting in the signal △i. Analytically, the dsb-sc output result is expressed as:

$$\frac{1}{4}\sum_{n=1}^{N}\{\cos[(W_o-6W_M+W_n)t-\phi_n]+\cos[(W_o-2W_M-W_n)t-\phi_n]-\cos[(W_o-8W_M-W_n)t-\phi_n]-\cos[(W_o+W_n)t+\phi_n]\}$$

It is observed from the spectrum sketch of △i that the pair of double sidebands about the suppressed carrier $(f_c-4f_m)$ results in the development of a double sideband structure about the frequency location of $(f_c-f_m)$ that is similar frequency-wise to the double sideband result of DBM 113. It is further to be observed that the accompanying band modulation input of A1–LSB translation IQM to DBM 213, being (±1500 c.p.s.) about the mid-frequency of $3f_m$, because similar to the aforementioned full quadrature lower sideband channel output of DBM 113 (see sketch [1] of FIG. 6b).

The passage of the product frequency components that locate above the suppressed carrier $(f_c-4f_m)$ is accomplished by applying the DBM 213 output over one path to the input of symmetrical bandpass filter 715d; this filter is identical to bandpass filter 715c. Thus, the two sidebands developing below the $(f_c-4f_m)$ value are readily suppressed and the sum frequency product sidebands are passed without attenuation by the symmetrical bandpass filter 715d. For PIPS operation, the output of BPF 715d is represented as signal △k and expressed as:

$$\frac{1}{4}\sum_{n=1}^{N}\{\cos[(W_o-2W_M+W_n(t-\phi_n]-\cos[(W_o+W_n)t+\phi_n]\{$$

with its spectra like △h above. The signal △k becomes one input to linear difference combining network 717a.

It is to be noted that the outputs of DBM 113 and 213 are shown being fed over other paths; DBM 113 connecting to USB Crystal Filter 115 and DBM 213 connected to the LSB Crystal Filter 215. The processing over these two paths is as described earlier with respect to FIG. 6b "quadruple modeing" operations.

Returning now to the signal △i output of BPF 715c, which is recognized as like the time delayed and amplitude reduced signal △k and further expressed as the signal △h. The signal △i=△h is applied to amplitude equalization and time delay compensation stage 716a. (AE & TDC). The AE & TDC 716a stage mainly functions to properly retard the signal △i, thereby negating the time delay occurring to band signal △f′, in compensating for the delay introduced by the low pass filter 233 in the PIPS translation path. Stage 716a further equates the amplitude of signal △i in compensation for the losses experienced in the quadrature operation of the PIPS translation path. The action of the AE & TDC stage 716a is much like that given and designed for the stage 716 of the aforementioned copending patent application. However, the "IQM" functioning is herein limited to the lower sideband (LSB) A1-Channel I bandwidth; but the equalization and compensation is now further directed to the handling of the pair of double sideband products that result from the newly devised "pure intermediate phase shift" (PIPS) modulation process.

With proper amplitude equalization and time delay compensation of the PIPS direct channel path, the ensuing adjusted signal △i output of AE & TDC stage 716a is designated as signal △l; and in accord with the convenient mathematical purpose taken herein, the signal △l is analytically expressed as the like of signal △h. This double sideband output, along with the sole full quadrature sideband developed by the "IQM" procedure, becomes the other input to linear difference combining network 717a.

In the subtractive combining process, as may be noted from the analytical expressions for the applied signal inputs, the phasing relations are such that the higher frequency upper sideband terms add and reinforce themselves; whereas the lesser frequency valued lower sideband product components phase cancel. The resulting signal △m output of the difference combiner 717a for the hereby described PIPS modulation process is thus a SSB channel of 300 to 3300 c.p.s. above the system reference, $f_m+f_o=f_c$, or the 3000 c.p.s. BW of B1 located in the upper sideband (USB) as channel II; expressed as $$\frac{1}{2}\sum_{n=1}^{N}\cos\,[(W_o+W_n)t+\phi_n]$$

The recombination of the associative "IQM" sideband generation, being herein made in the subtractive manner, results in the sideband inversion such as described for the initial "IQM" method invention; and therefore positions itself as the lower sideband (LSB), A1–Channel I output of the transmission system. Thus, the two symmetrical data link ISB channels are demonstratably established; as given above.

"IQM" SIGNAL ANALYSIS FOR *n* FACTOR CASE =3 WITH "PIPS" CHANNEL II IN EFFECT FIG. 7 (CONT'd.)

The signal processing as shown in FIG. 7 for the band input modulation into LSB Channel II output is the advancement of the "IQM" technique of the aforementioned copending patent application as further extended with respect to the prior $n$=two case given in FIG. 4 of this specification. Here, the modification concerns use of a differing intermediate carrier signal, sin $3W_mt$; and the newly located oppositely offset final carrier signal and R.F. bandpass filter frequency values.

The analysis therefore proceeds in similar vein whereby reference is now made to the 600 series stages of FIG. 7, with the operational steps again located by the encircled capital letter designations. At applied point Ⓐ, let the audio band A1 signal input be generally expressed simply as:

$$\{\cos\,[(W_M-W_a)t+\phi_1]+\cos\,[(W_M+W_a)t+\phi_2]\}$$

In the output of double balanced modulator (DBM) 608, a product operation of signal Ⓐ multiplied by common mid-frequency carrier signal (cos $W_mt$) takes place resulting in signal Ⓑ. This is expressed as $$\frac{1}{2}\{\cos\,[(2W_M-W_a)t+\phi_1]+\cos\,(W_at-\phi_1)+\cos\,[(2W_M+W_a)t+\phi_2]+\cos\,(W_at+\phi_2)\}$$

The mid-band frequency signal, cos $W_mt$, feeding to 90° leading phase shifter 602 produces at the output, $$[\cos\,(W_mt+90°)]=-\sin\,W_mt$$

which thereupon serves as the common input DBM 601 and the product multiplier 71.

At DBM 601 output, signal Ⓒ results from $$-\{[\cos\,(W_M-W_a)t+\phi_1]+[\cos\,(W_M+W_a)t+\phi_2]\}(\sin\,W_Mt)$$

which becomes $$-\frac{1}{2}\{\sin\,[(2W_M-W_a)t+\phi_1]+\sin\,[(2W_M+W_a)t+\phi_2]+\sin\,(W_at-\phi_1)-\sin\,(W_at+\phi_2)\}$$

With LPF 600a having its $f_{co}\approx>f_a$, the filter operation in the output of DBM 608 passes only the lower sideband products of signal Ⓑ. The output signal D of LPF 600a is thus $$\frac{1}{2}[\cos\,(W_at-\phi_1)+\cos\,(W_at+\phi_2)]$$

Likewise, the output signal E of LPF 603 are lower terms only, or $$-\frac{1}{2}[\sin\,(W_at-\phi_1)-\sin\,(W_at+\phi_2)]$$

and apples to input of DBM 606. The generation of the in-common intermediate carrier signal of sin $3W_mt$ has been detailed earlier.

For convenience, the second and intermediate quadrature carrier signal, $3f_m$, or 5400 c.p.s. is assumed to set at unity level. Accordingly, the product operation that occurs at DBM 606 output results in quadrature sideband signal Ⓕ expresesd as:

$$-\frac{1}{2}[\sin\,(W_at-\phi_1)-\sin\,(W_at+\phi_2)][\sin\,3W_Mt]=-\frac{1}{4}\{[\cos\,(3W_M-W_a)t+\phi_1]-[\cos\,(3W_M+W_a)t-[\cos\,(3W_M-W_a)t-\phi_2]+[\cos\,(3W_M+W_a)t+\phi_2]\}$$

With the band pass filter combination HPF 210 at $f_{co}\approx<(3f_m-f_a)$ and LPF 211 of $f_{co}\approx>(3f_m+f_a)$, then the filter operation passes the sole quadrature signal G as signal Ⓕ with linear time delay to become signal G as indicated.

The band limits, numerically expressed, are (3900 to 6900 c.p.s.) with a 5400 c.p.s. mid-band frequency value, as spectrum sketch 610a shows. In this oppositely-offset carrier modulation process, $(f_c-f_m)=f_o$, and therefore $(f_c-4f_m)=(f_o-3f_m)$. Hence, $$[\cos\,(W_c-4W_M)t]=[\cos\,(W_o-3W_M)t];\quad \cos\,(W_c-W_M)t=\cos\,W_ot$$

Numerically expressed, this becomes 98.2 kc.$=f_o$, and 92.8 kc.$=(f_o-3f_m)$.

Recall that the cos $(W_o-3W_m)t$ output of LSB selected filter 312 is applied as the carrier signal to double balanced modulator DBM 213 and the cos $W_ot$ output of USB selective filter 311 feeds to DBM 113 its carrier input.

Returning to the signal processing path, linear channel combiners 15 and 16 are shown in use for the multichannel ISB operation, and such combining application is a standard procedure. The combiner 16 in the path between LPF 700a and DBM 113 allows for simultaneous application of the modulation band "PIPS" of direct channel II, while combiner 15 provides for the modulation injection of "PIPS" translation channel II. Such operation has been earlier described with respect to FIG. 7, and is mentioned at this point for reference. The further analysis will only concern itself with the quadratured signal operation since the prior explanation, adequately cover the "PIPS" processing of channel II for B1 contents.

Consider then, only the band signal Ⓓ output of channel combiner 16 as the modulating signal input to DBM 113, and the band signal output Ⓖ output of channel combiner 15 as DBM 213 modulation input. For the direct quadrature process, a product operation of signal Ⓓ multiplied by carrier signal cos $W_ot$ takes place resulting in signal Ⓗ. Here the product is further expressed as a sideband output of DBM 113 represented by $$\frac{1}{4}\{[\cos\,(W_o-W_a)t+\phi_1]+[\cos\,(W_o+W_a)t-\phi_1]+[\cos\,(W_o-W_a)t+\phi_2]+[\cos\,(W_o+W_a)t+\phi_2]\}$$

Observe these frequency components unfold as a full quadrature sideband contained within the band limits of one channel. The accompanying band modulation inputs of channel II direct PIPS to DBM 113 develop product components in the output that locate about the quadratured sideband channel in the manner shown by the Channel Operation sketch [1] of FIG. 6*b*. The passage of the desired channel I and II sideband outputs is accomplished by applying DBM 113 output over one path to the input of the SSB crystal asymmetrical filter, channel I–115. Subsequent operation over this signal path direction occurs in accordance with the earlier description given for FIG. 5. Over a second path, the sole quadrature sideband signal Ⓗ is applied to, and passed unattenuated by the symmetrical bandpass filter 715C and is designated as band signal (H').

For the intermediate quadrature channel process, the product operation that occurs in the output of double balanced modulator 213 is signal band Ⓖ multiplied by carrier signal cos $(W_o-3W_m)t$, resulting in signal Ⓘ. Analytically, the output result is expressed as $$-\frac{1}{4}\{[\cos\,(W_o-4W_M+W_a)t-\phi_1]+[\cos\,(W_o\;W_a)t+\phi_1]-[\cos\,(W_o-W_M-W_a)t+\phi_1]-[\cos\,(W_o+W_a)t-\phi_1]-[\cos\,(W_o-4W_M+W_a)t+\phi_2]\;[\cos\,(W_o-W_a)t-\phi_2]+[\cos\,(W_o-4W_M-W_a)t-\phi_1]+[\cos\,(W_o+W_a)t+\phi_2]\}$$

The double sideband input of PIPS translation channel II as combined and applied to DBM 213 input develops modulation products in the modulated output that position about the double sideband quadrature output as illustrated by the channel operation sketch [1] of FIG. 6*b*. In voice mode, the passage of the desired voice channel I sideband output of DBM 213 is made by feeding over one path to the input of lower sideband crystal filter 215, where the filtering action follows as described for FIG. 5.

Over a second path, the double sideband output signal (I) is applied to symmetrical bandpass filter **715*d*, which by design is like BPF 715C having a center frequency value ($f_c - f_m$), and being of flat bandpass encompassing channel I and II and the band III adjacent thereto. BPF 715*d* passes unattenuated only the USB component content of DSB signal (I) and readily rejects the LSB terms. The passed signal indicated as (I′) output of BPF 715*d*** is thus the upper sideband product of $$\tfrac{1}{4}\{[\cos(W_o+W_a)t+\phi_2]+[\cos(W_o-W_a)t+\phi_1]-[\cos(W_o-W_a)t-\phi_2]-[\cos(W_o+W_a)t-\phi_1]\}$$

The (H′) band signal output of BPF **715*c* feeds to Time Delay Compensation and Amplitude Equilization Stage 716*a*. TDC & AE stage 716*a* mainly functions to negate the time delay occurring to band signal (F), which compensates for the delay introduced by the HPF-LPF combination with (F) delayed representing band signal (G); and to equate amplitude in compensation for losses in the intermediate quadrature modulation of the IQC operation. Equalization between the Intermediate Quadrature or translation channel IQC 700** and the other direct channel used in the quadrature system transmission as earlier stated may be brought about by various known techniques.

With proper channel equalization in effect, the band signal (H′) of TDC & AE stage **716*a* is applied to one of the inputs of linear difference combiner 717*a*. The other input to the linear difference combiner 717*a* is being supplied from the output of BPF 715*d*** as band signal (I′). The subtractively combined output of band signal (J) results from (I′) subtracted from (H′), and becomes $$\{[\cos(W_o-W_a)t+\phi_1]+[\cos(W_o+W_a)t+\phi_2]\}$$

Hence, the foregoing analysis demonstrates that the audio modulating band A1 input signal of (A) represented by the expression:

$$\{[\cos(W_M-W_a)t+\phi_1]+[\cos(W_M+W_a)t+\phi_2]\}$$

is modulated as a SSB output at channel I with respect to the virtual common system carrier frequency value of $f_c$ (as $W_c$); and becomes $$\{[\cos(W_o-W_a)t+\phi_1]+[\cos(W_o+W_a)t+\phi_2]\}$$

where $$W_o=(W_c-W_M)$$

Notable from the beforehand description of the "HIPS–IQM" and "PIPS–IQM" excitation systems of FIGS. 2 and 5 respectively, the multiple sideband filter processing at the final pair of modulators (113 and 213) bear a functional equivalency of stage operation.

From the deficiency discussions of the prior art as indicated earlier, the asymmetrical sideband filter design allows no emphasis to be made on its phase linearity, where phase non-linearity is most severe at near the band edges. To secure the proper sideband recombination and undesired sideband rejection on a phase related basis, the general 715 bandpass filter for the translation channel output, like the identical 715 bandpass filter at direct channel output, is symmetrically used having a center frequency value equal to the mid-frequency of the "IQM" channel and set to be of flat bandwidth that allows encompassing triple that of the band signal to be combined, that is, conjunctively band passing three channels, one each adjacent to the "IQM" channel for a two channel output result. This passage minimizes the distortion because the phase non-linearity of a bandpass filter, such as a two-pole, 6–60 db attenuation bandwidth ratio of three or less Butterworth filter, is at the band edge; and is proportional to both the time delay variation in the filter and the modulation frequency. In either case, the envelope delay is found a more restrictive factor towards waveform distortion development since the non-uniform phase characteristic of a network materially increases before the relative attenuation slope does. The present art has available various synthesis techniques allowing for the ready design of passive low, high, and/or band pass constant delay filters in the audio range.

In typical applications, the low pass filter of maximally flat magnitude and equal ripple type response may be cascaded with an all pass network; with such combination producing linear phase response and thus constant time delay.

The bandpass region of BPF **718*a* for channel I and BPF 719*a*** for channel II, along with the succeeding common bandpassing of the 400 series I.F.–R.F. output stages of FIGS. 2 and 5 are noted to be symmetrical; and of sufficiently wide bandwidth such that the used band portion about the central frequency exhibits a linear phase-frequency characteristic.

Such bandpass filter design approaches can be found summarized in the technical publication, "Linear-Slope Delay Filters for Compression," by T. H. O'Meara, on pages 1916–1918, in vol. 48, November 1960, Proceeding of the IRE.

As an interesting result, it is recognized in the practice of prior art asymmetrical crystal filter method of sideband generation that the selective phase delay and distortion for the USB content does not correlate with that developed in the LSB channel. Observe hereat that use of a like pair of symmetrical bandpass filters with three channel bandwidth along with having amplitude response equilization and time delay compensation accounting for the presence of either one of the intermediate sideband modulation channels insures a high degree of linear phase correlation regardless of which type channel is put into use.

Figure 8:
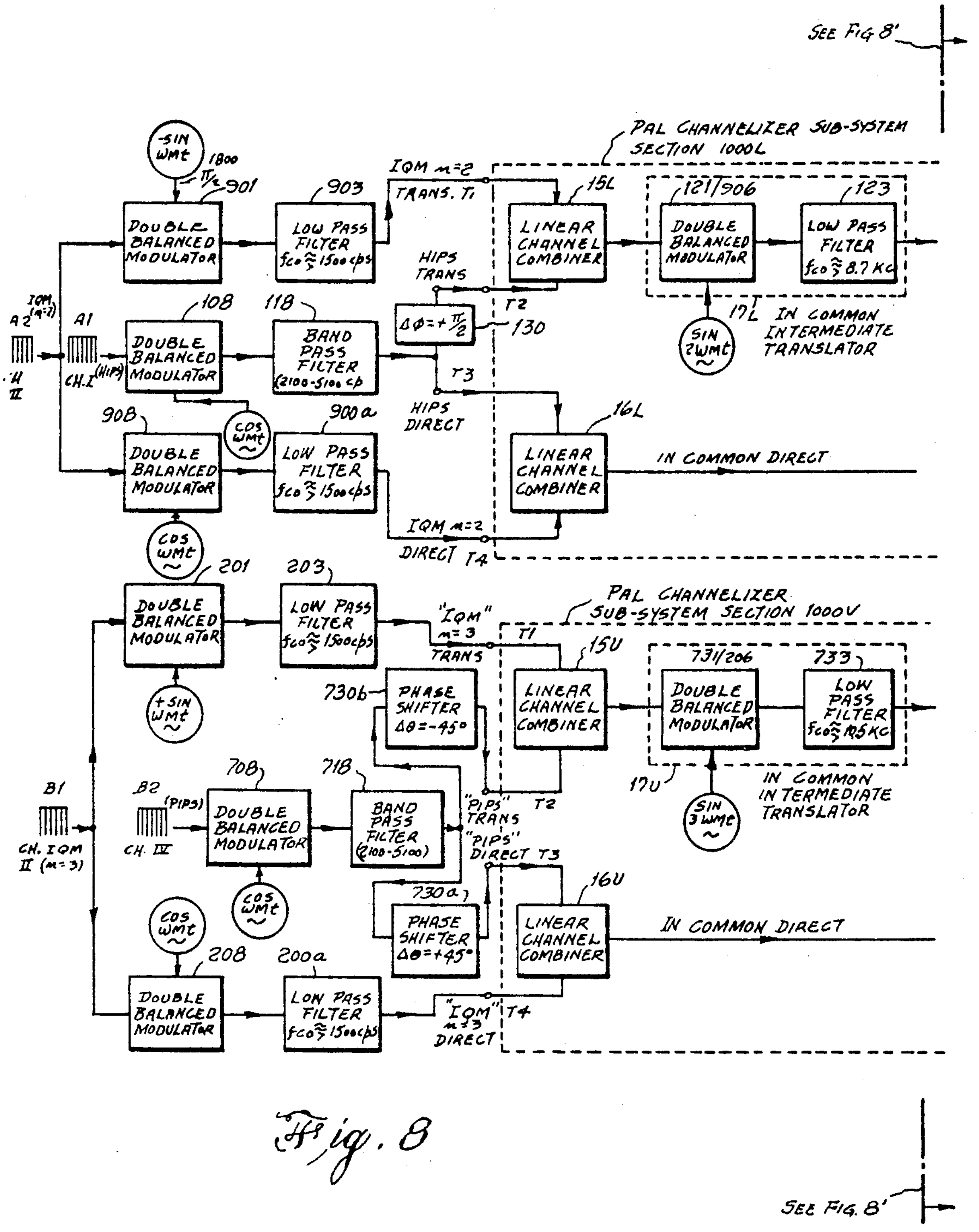
FIGS. 8, 8′, 8*a* and 8*a*′ are elementary block diagrams illustrating group compositions for MC–ISB Communications made in accordance with the principles of this invention that function to demonstrate a plural access line for pairing of intermediate sideband modulation methods through the use of a singularly structured and interchangeable sub-system channelizer operation.
Figure 8:
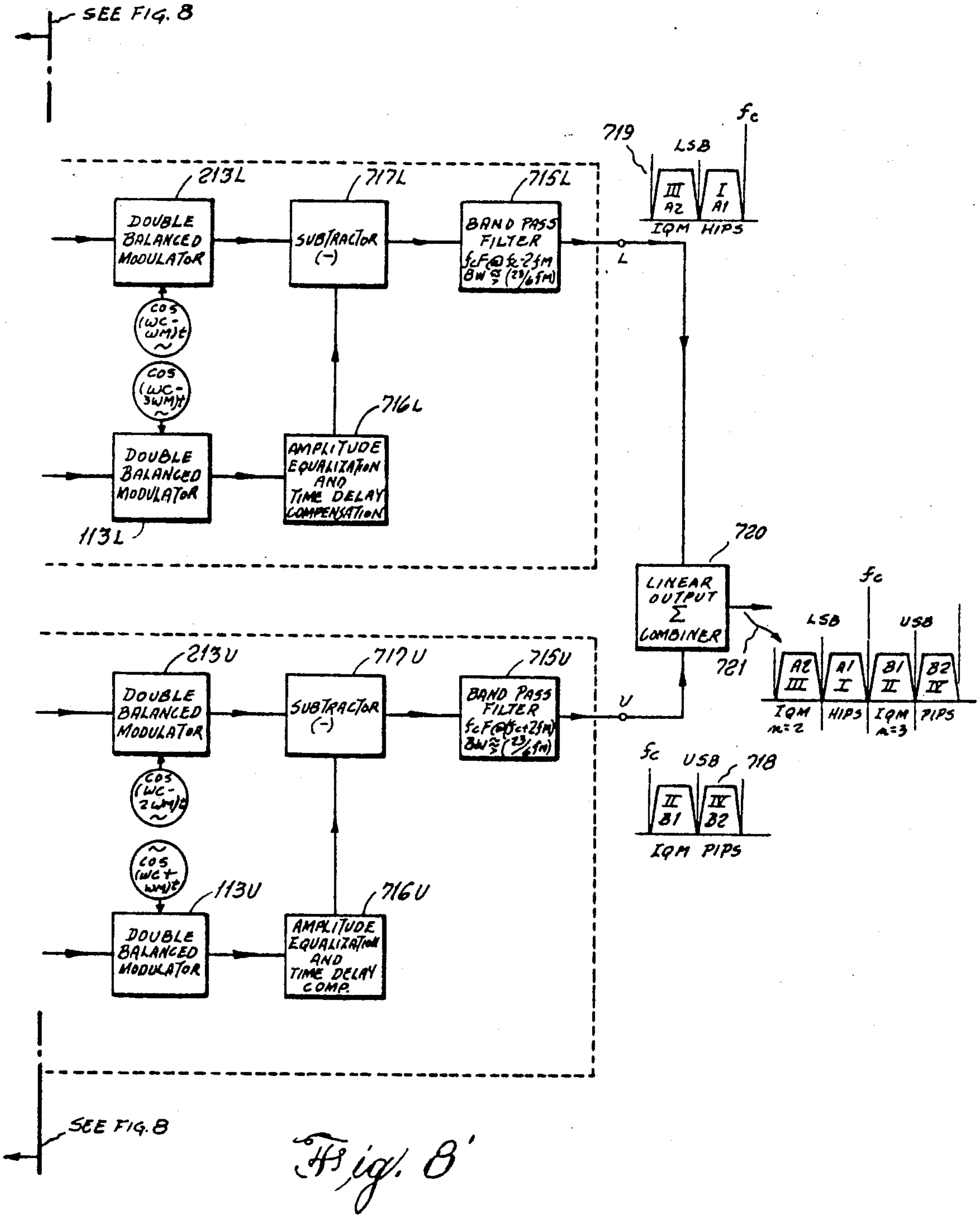
Figure 8A:
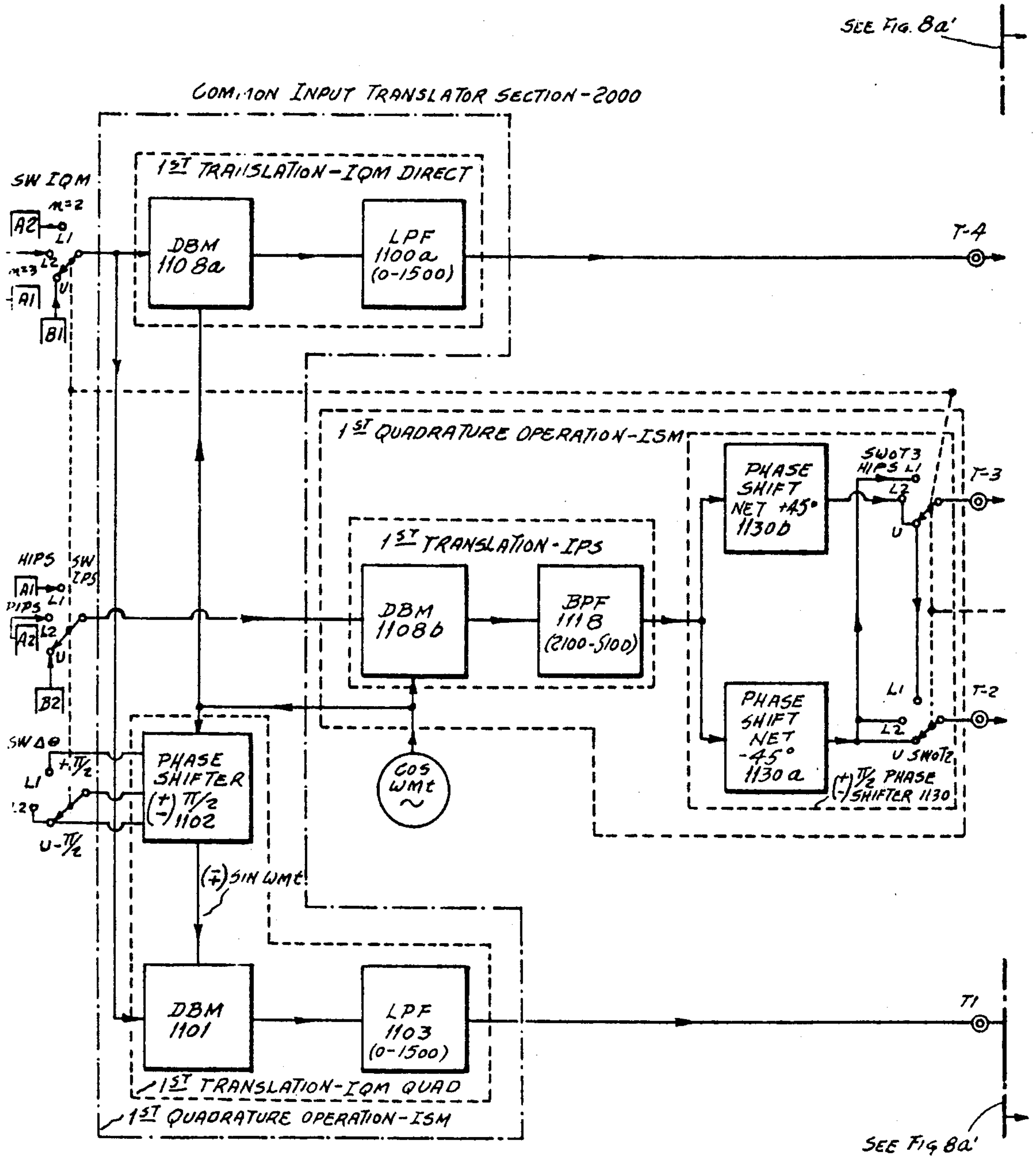
Figure 8A:
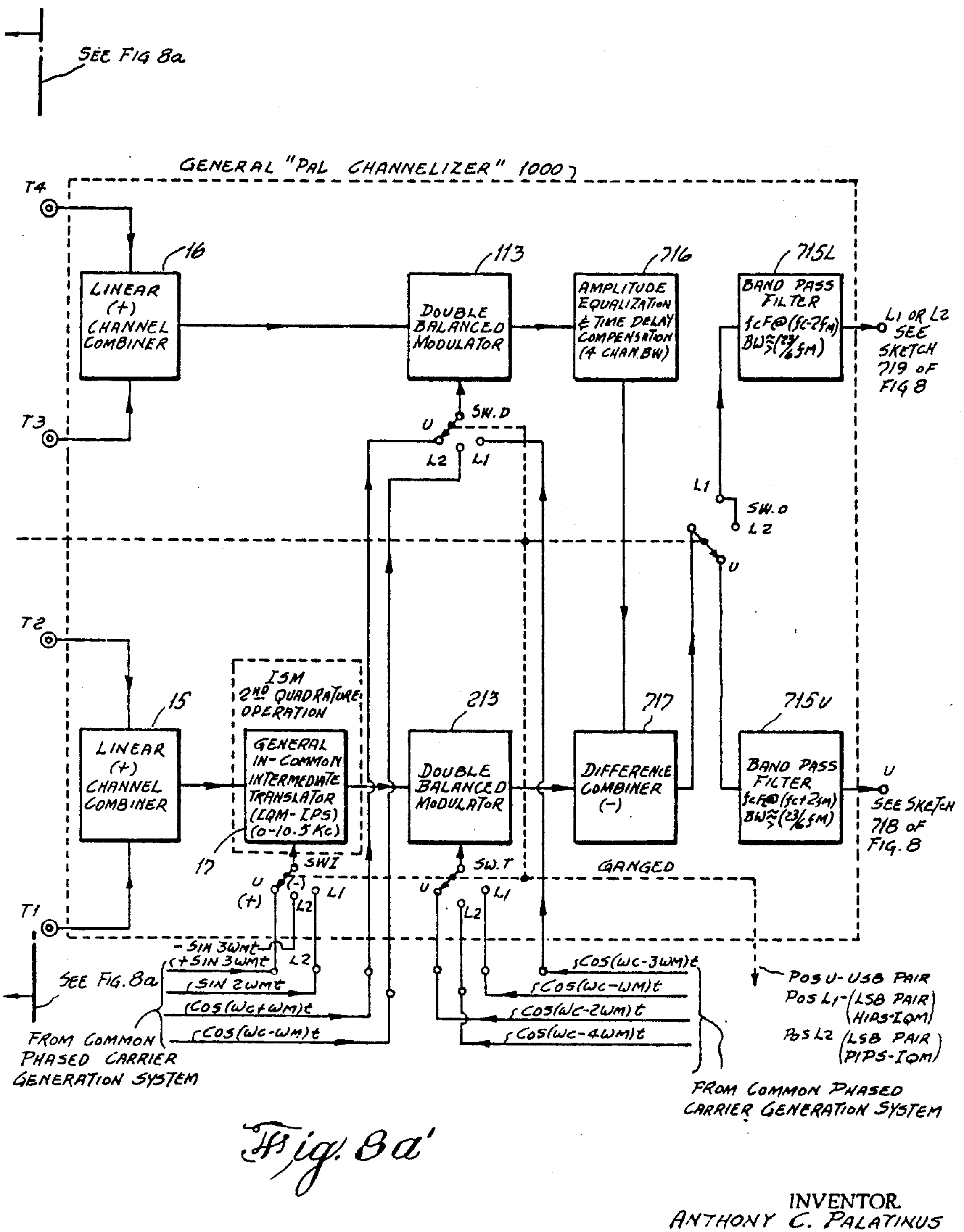

TECHNIQUE OF "PAL CHANNELIZER" PAIRING: FIGS. 8 and 8*a*

It has been shown that the intermediate sideband communications methods are keyed to a central reference signal and thereby benefits from the high stability and low aging performance characteristics acquired from such controlled signal sources in the present art.

To understand the phased carrier generation interrelationship within the intermediate sideband modulation (ISM) signal excitation process, consider this investigation of a two channel independent sideband (ISB) case of "HIPS–IQM" form wherein a phase change of $+e$ occurs for the audio carrier signal, $f_m$, in its frequency synthesis from the system reference carrier $f_c$. This change is equally imparted into the two channel paths of the "IQM" process via the first pair of modulators. In the general "IPS" technique, the $+e$ term is carried forth. Use of an intermediate carrier of $2f_m$ values injects a $+2e$ amount into the signal path resulting in a $+3e$ change at the translation channel output for a between channel difference of $+2e$.

From a coherent double sideband operation for the two oppositely offset I.F. carrier signal generation to the final pair of modulators, a phase term difference of $2e$ between the pair of final carrier signals is produced whereby one change for the LSB signal ($f_c - f_m$) is of $-e$ amount and the other change amount being the USB opposite thereof or $+e$ for ($f_c + f_m$). Subsequently, the translation channel output being of $+3e$ change modulates with the final carrier of $-e$ change for a $+2e$ variation result in the modulated output; while at the direct channel output, the single $+e$ change modulated with the final carrier of $+e$ change also produces the $+2e$ variation result. Thus, the combined two channel output remains phase coherent but with a $+2e$ shift made thereof.

However, in a generally more preferred embodiment as the exampled FIG. 7 "PIPS–IQM" combination having an intermediate carrier of $3f_m$, the translation channel output accumulates a phase change of $+e+3e=+4e$. Here the final pair of I.F. carriers are $(f_c-4f_m)$ with a $-4e$ change and $(f_c-f_m)$ for a $-e$ change. Thereupon, the direct channel output of $+e$ change modulates with the final carrier of $-e$ change to result in the cancellation of the phase change in the modulated output. For the modulation operation between the translation channel output and the final carrier of $-4e$ change, the $+4e$ changes of the translation channel is negated in the modulated output. Hence, a system phase lock is in effect, and the generated two channel ISB output remains unchanged.

While the audio carrier signal of $f_m$ is shown synthesized from the reference carrier $f_c$ in another design, either of the other audio carrier signals of $2f_m$, $3f_m$, or $4f_m$ may be generated by frequency synthesis from the reference and the remaining carrier signals derived by frequency division and product multiplier technique as required. Hence, the methods of intermediate sideband modulation (ISM), be it "HIPS," "IQM," "PIPS," are distinctly general in process and not functionally limited thereto.

The coherent double sideband operation for the I.F. pair offset carrier signal generation, either by way of embodiment of FIG. 4 or FIG. 7, maintains phase equalization between the two channels during the intermediary phasing signal processes, and the system's stability is governed by developing phase relations in step with the singular I.F. reference carrier signal.

While the mathematical relations derived analytically express the principles of the pair of basic modulation methods that verifies these operational compatible signal processing techniques, it is not to be construed that the subsequent structural translation of such conceptual theories into functional overall communication system complexes exploiting more traditional circuit implementation is accomplished as a trivial engineering task. From the underlying principles embodied within such communications approaches, awareness of coactions reveal a unified theory intimately relating the three significantly differing signal process techniques. This is particularly so notable since the "IQM" method, detailed as an operational case for the factor condition of $n=2$ in the aforementioned copending patent application, now herein also finds itself more fruitfully shown and described for the higher factor case of $n=3$.

As may be recognized from the experience of new modulation approaches, most of the technical evaluations and observations made for the initial "IQM" method of the copending patent application repeats itself for either the hybrid (HIPS) or pure (PIPS) technique taken alone, and in further pertaining to the pair of "intermediate phase shift" (IPS) modulation methods in grouped composition with "IQM."

Not to go unnoticed is the development of each intermediate sideband modulation (ISM) system introduced herein as functionally applicable and separate unto itself.

Admittedly, the advancement of "intermediate phase shift" in a pair of novel methods of intermediate sideband modulation implemented in conjunction with intermediate quadrature modulation channel operation is found judiciously disposed within a MC–ISB Communcations Systems as a functionally optimized complement thereof.

Although at this point of the specification, a congruent arrangement for general "ISM" operation comes into view, then even more revealing is the generation for an in-path signal process arrangement whereby it is immaterial whether the circuit stages are directed to handle the pairing of "PIPS–IQM" or "HIPS–IQM."

Developing therefore from the innovation of this family type of excitation, it becomes clear that a desirable operational advantage is to be secured over the classical sideband filter methods by the further implementation of the phase cancelling techniques of intermediate sideband modulation functions. Utilizing an existing channel vacancy or band slot for such type modulation availability without reliance upon asymmetric filtering of undesired sidebands, avoids the phase distortion effects of asymmetric sideband filters detrimental to waveform passage.

The effect of making available a usable band vacancy into which differing information content may be injected is set forth as a characteristic procedure that hereinafter is conveniently referred to as a "channelizing operation." which originates the essential elements of a "paired intermediate sideband modulation" process. Therefore, take note as stressed in the background material of this specification, the economic barriers of redundancy must be overcome with a significant reduction of in-path signal processing stages being of paramount need. To facilitate the proper understanding of the new methods of modulation as most suitable to the configurations of the copending patent application in which the manner of signal analysis is likewise addressed, the in-path audio stages have been deliberately shown as separately distinct to each modulation process. Thus, surprisingly, not so obvious is the inherent stage commonality of the intermediate quadrature operation for either of the two novel "IPS" techniques coacting with the "IQM" method case associated therewith. Indeed, a singular and in-common intermediate double balanced modulator functions in place of DBM 221 and DBM 706 of the composite "HIPS"–"IQM" technique shown in FIG. 4, and likewise for the DBM 231 and DBM 606 of the composite "PIPS"–"IQM" technique of FIG. 7. This further simplication requires only the singular and in-common low pass filtering to occur for the composite output of the in-common intermediate double balanced modulator.

Hence, LPF–223 of the "HIPS–IQM" arrangement of FIG. 4 remains in use, while the BPF 610 is eliminated. Thus, in the "PIPS–IQM" operation of FIG. 7, LPF 233 serves the in-common function, allowing the removal of BPF 610. The circuit stage saving is pronounced, particularly where a multi-channel system operation is implemented. The beneficial fruits of such high degree commonality is best exhibited by the FIG. 8 and 8*a* embodiments, which exemplify the multi-channel operation of "HIPS" and "PIPS" incorporated with their respectively associated "IQM" $n$ factor case of 2 and 3. FIGS. 8 and 8*a* thus distinguish therein the dominant embodiment for the pairing of the methods of symmetrical intermediate sideband modulation made available by way of this invention.

Note in FIG. 8 for this integrated embodiment, the "HIPS" intermediate carrier signal is modified to be of the sin $2W_mt$ form; and in keeping with this relation, the 1st and common product operation is made by the cos $W_mt$ carrier signal and in path quadrature is applied. The analytical signal relationships given with respect to the FIG. 4 and FIG. 7 circuit arrangements generally suffice for the understanding of this total in-commonality communications system operation, and therefore only the distinctive highlights of FIGS. 8 and 8*a* are discussed in detail, along with analysis of the modified "HIPS" process.

The observance that but one DBM and LPF combination fed by a in-common carrier signal is fundamentally linked and adaptively shared between the family pair of intermediate translation paths for the procedural accomplishment of the desired results leads to the heart of a more definitive designation to the operation thereof. The modus therebetween for linking the compatible intermediate pair of translation techniques establishes thereat a "plural adaptive link channelizer" pairing action; and subsection section 1000 implementing such operation is designated a "plural adaptive link," abbreviated as "PAL" channelizer.

Figure 9A:
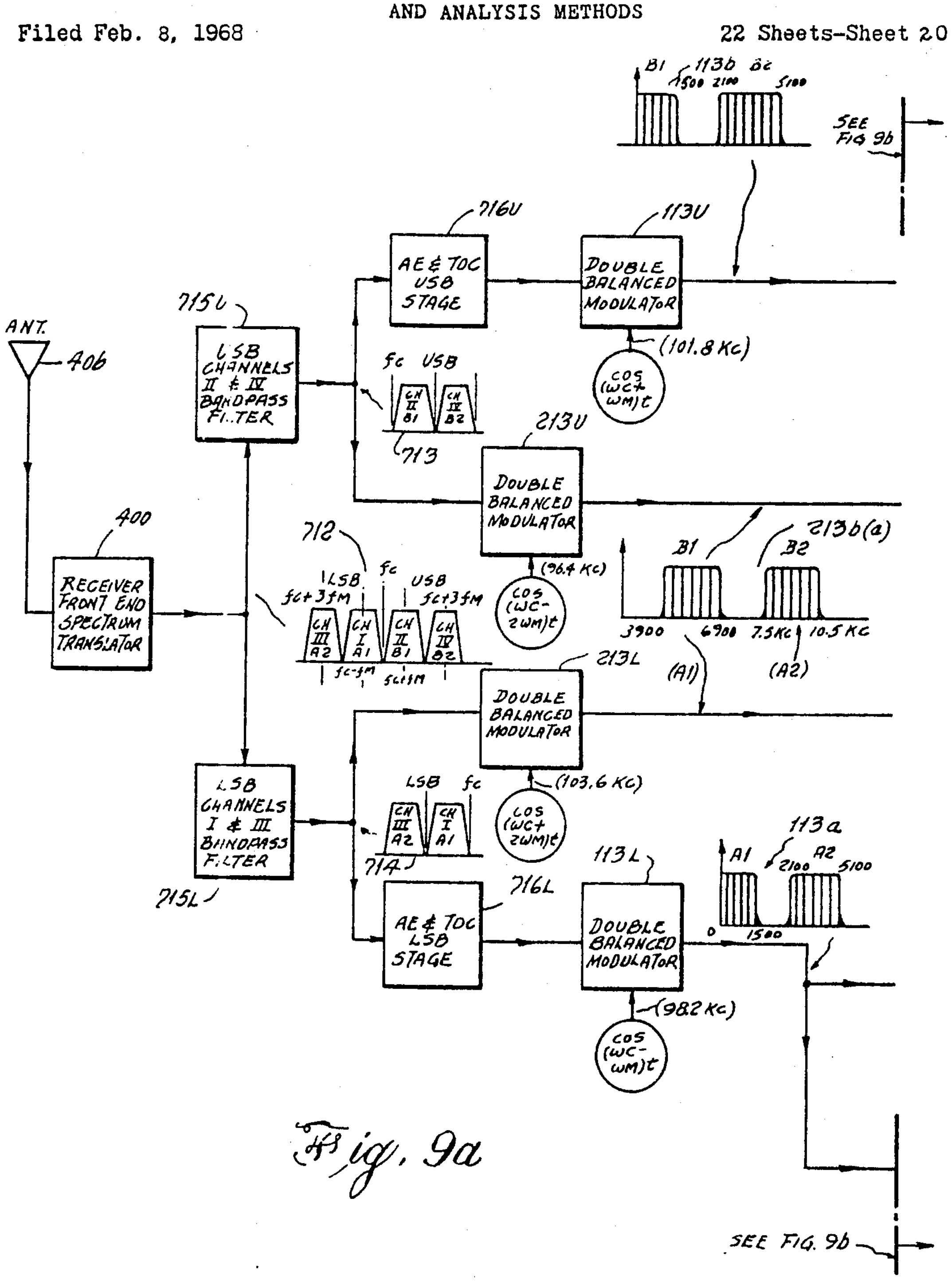
FIGS. 9*a*, *b* and *c* are elementary block diagrams illustrating multi-channel ISB reception by a Communications System structure exhibiting intermediate quadrature and hybrid/pure intermediate phase shift operation in accordance with the principles of this invention.
Figure 9B:
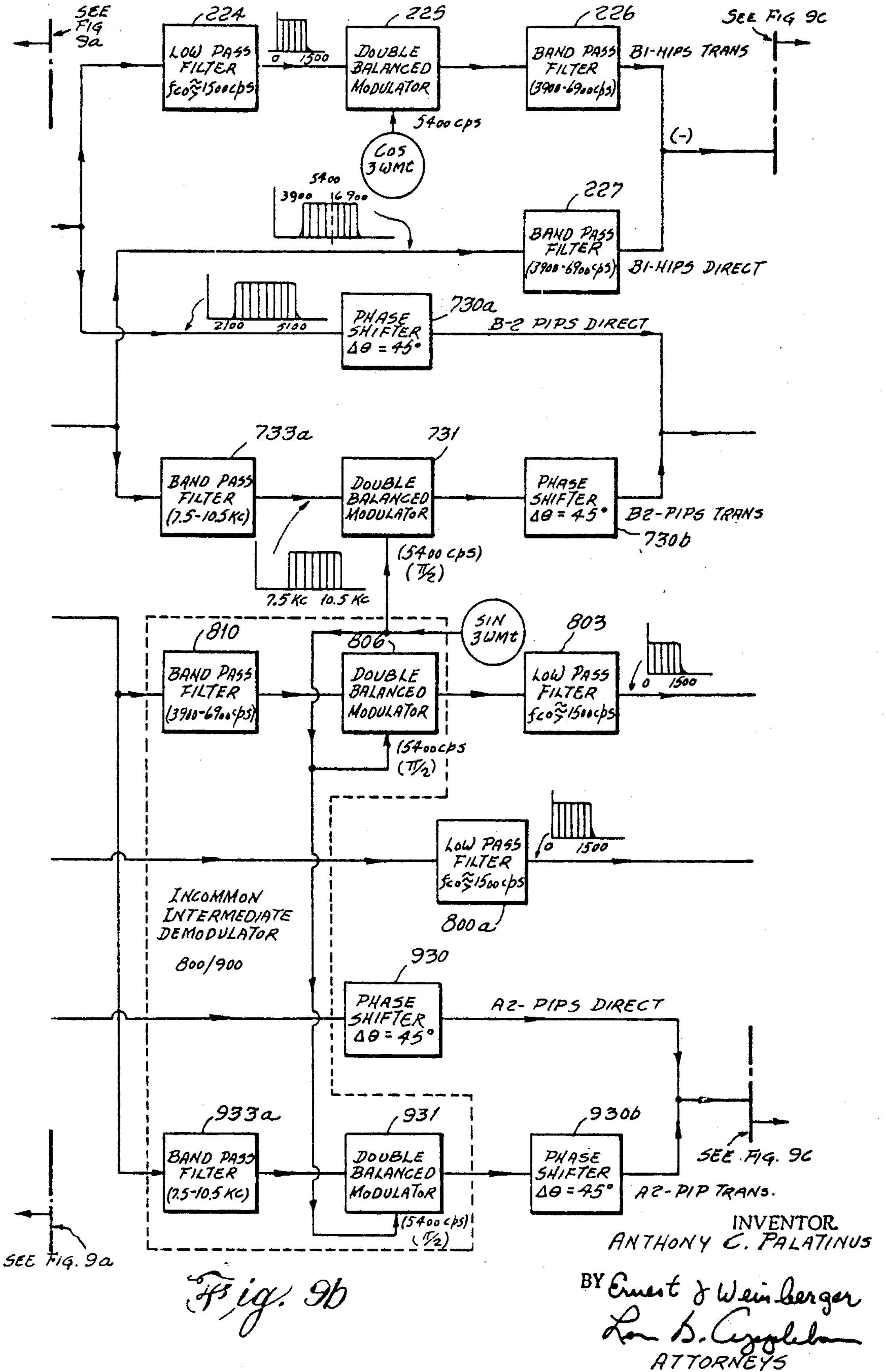
Figure 9C:
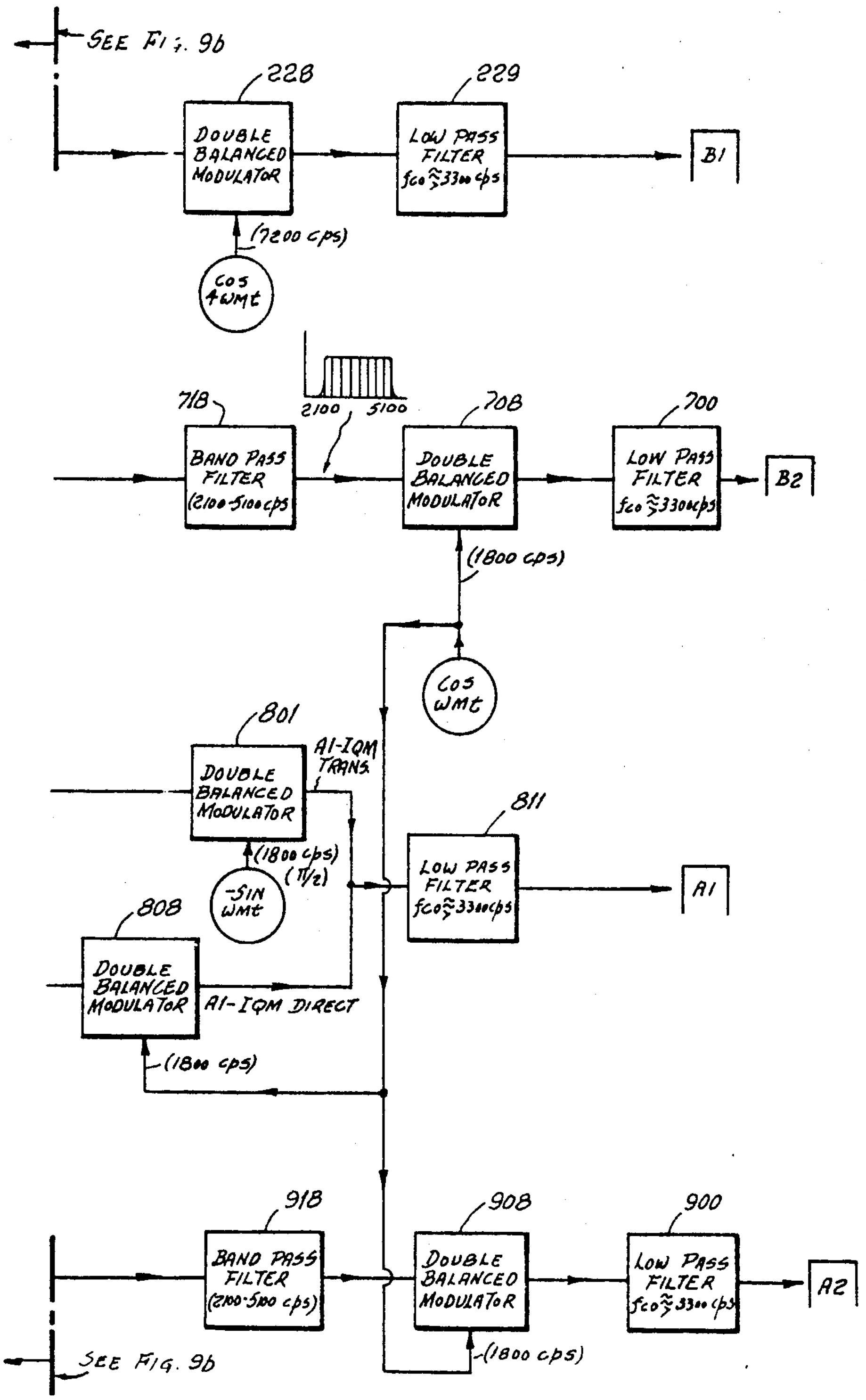

While the excitation processes are implemented by way of the circuit arrangements of FIGS. 8 and 8*a*, the demodulataion process is essentially demonstrated in the FIG. 9 embodiment, since the nature of the stage functions in use are bi-direction as results from the symmetrical filtering and DBM properties. However, the detailed description of such associative demodulation action is primarily made with respect to differing "IPS–IQM" composite where separation is conveniently kept for simplicity and understanding.

It is of practical manufacturing value that the broken line enclosed "pal channelizer" sub-system section 1000 assembles as an interchangeable module between the associative pair of intermediate modulation methods with specific design consideration required only for the channel bandwidths to be encompassed.

Therefore, as a module, the "pal channelizer" sub-system section 1000 comprises a pair of input linear channel combiners 15 and 16, and intermediate double balanced modulator with low pass filter output, a pair of in-common double modulators 113 and 213, an ampltiude equalization and time delay compensation stage 716, a subtractor network 717, and an R.F. bandpass filter 715; totaling nine (9) functional stages in its basic form.

At times, the cascade intermediate double balanced modulator-low pass filter combination is designated as in-common intermediate translator 17.

Thus the overall terming of the new excitation processes as "intermediate sideband modulation" becomes well understood since the direct and translation signal paths are in parallel and similar except for the intermediate translation operation; for which the direct path operation is appropriately amplitude equalized and time compensated to properly match the parallel paths prior to combining for the SSB channel results.

Observe then in FIG. 8, the 900 series elements, like the "IQM" series of FIG. 2, concern the "IQM," $n=2$ case for channel III output of band input A2; while the channel I output of A1 input by "HIPS" is obtained via 100 series elements. These two modulation approaches are made with in-common use of "pal channelizer" sub-system section 1000L. For the "pal channelizer" sub-system section 1000U, the joined inputs thereto consist of "IQM" case of $n=3$ technique for B1 input development into channel II over the 200 series stage paths, and the final channel output IV representing B2 input produced by the "PIPS" method using stage series 700.

In the case of the "IQM" method for A2 and B1, the functional operation of the in-common input double balanced modulator pairs 901 and 908, and 201 and 208, respectively; along with their output low pass filter pairs 903 and **900*a*, and 203 and 200*a***, respectively have been fully described in the prior paragraphs of this specification as well as in the material of the aforestated copending patent application.

For the modified "HIPS" technique, only the stage operations of DBM 108, BPF 118, and plus 90° phase shifter 130 are separate from the "pal channelizer" sub-system section 1000L. The "PIPS" channel IV operations also has phase shifters **730*a* and 730*b* in use, besides the DBM 708 and BPF 718, prior to application to the "pal channelizer" sub-section 1000U. In accord with its plural adaptive link property, "pal channelizer" sub-system section 1000L** therefore receives the following group signals at its terminal line inputs: $n=2$, "IQM" translated path of (0±1500 c.p.s.) at T1, "HIPS" translated path of (2100–5100 c.p.s.) at T2 and as "HIPS" direct path of (2100–5200 c.p.s.) at T3, and $n=2$, "IQM" direct path of (0±1500 c.p.s.) at T4. Signal content at terminals T1 and T2 are the 1st quadrature of content at T3 and T4.

Accordingly, "pal channelizer" sub-system section 1000U gives access to the following plural signals applied to its line input terminals: $n=3$, "IQM" translated path of (0±1500 c.p.s.) at T1, "PIPS" translated path of (2100–5100 c.p.s.) at T2, "PIPS" direct path of (2100–5100 c.p.s.) at T3, and $n=3$, "IQM" direct path of (0±1500 c.p.s.) at T4.

The line terminals of T1 and T2 connect as the pair of inputs to linear channel combiner 15L in section 1000L and linear channel combiner 15U for section 1000U. The line terminal pair, T3 and T4, supply the input pair to linear channel combiner 16L (and 16U) for section 1000L (and 1000U). Since linear channel combiners 16L and 16U respectively connect direct to the modulating signal input of double balanced modulators 113L and 113U, the signal processing operations over these paths remain unchanged. The combined signal outputs of channel combiners 15U and 15L undergo a second and intermediate quadrature operation. Linear channel combiner 15L feeds its combined two band signal to the modulation input of intermediate double balanced modulator, now itemized as 121/906 of "pal channelizer" of sub-section 1000L. The two band combination signal output of linear channel combiner 15U is supplied as the modulation signal to intermediate double balanced modulator, jointly noted as 731/206, of "pal channelizer" sub-section 1000U.

Only LPF of 8.7K c.p.s. cut-off frequency connects to DBM 121/906 output, and passes all of its product outputs to the modulating signal input of DBM 213L. In sub-section 1000U, the LPF 733 of 10.5K c.p.s. cut-off frequency value in the output of DBM 731/206 supplies all product components to the signal input of DBM 213U.

The distribution of the sideband structures generated at the outputs of the final pair of double balanced modulators, DBM 213 (L or U) and DBM 113 (L or U), follows in accord with the respective techniques in use such as given in the spectrum sketches of FIGS. 3 and 6*b*. In the case of either paired technique combination, "HIPS–IQM" or "PIPS–IQM," the channelizing of the sideband structures are positioned such that specific band pass filtering, prior to adjustment of phase-amplitude relations by AE & TDC stage 716 (L or U) and linear channel combining, need not be undertaken. While a broadly turned output of the double balanced modulators is a natural design condition, the more restrictive bandpass filter operation due to a two channel bandwidth design being 6900 c.p.s. of BPF 715L and BPF 715U in the embodiment of FIG. 8 occurs at the output of subtractor 717L and 717U respectively after the arithmetic channel combining has taken place. With $$BW \gtrsim \left(\frac{23}{6}\right) f_m$$

then BPF 715L is of $(f_c-2f_m)$ center frequency and BPF 715U $f_{cf}=(f_c+2f_m)$ whereat the accompanying undesired sideband content is removed therefrom.

At the output terminal L of sub-system 1000L, the pair of lower sidebands, outboard channel III for A2 input and inboard channel I for A1 input, results as shown in spectrum sketch 719 and feeds as one input to linear output combiner 720.

At the output terminal U of sub-section 1000U, the pair of upper sidebands, outboard channel IV for B2 content and inboard channel II for B1 band input, develops as shown in spectrum sketch 718 and is applied as the other input to the linear output combiner 720. The total common summed output of linear output combiner 720 constitutes the desired four channel output, as shown in typical spectrum sketch 721.

The generated carrier signals are repeated in FIG. 8 by the encircled closure representation of the phased form being supplied. The application of +sin $W_m t$ to DBM 201 of channel II–B1 for "IQM"–USB reflects the polarity change that discounts an inverted sideband result.

Generally, the specific polarity and phase form of the supplied audio carrier signals are related to the frequency offset direction of the final carrier signal pair, the arithmetic type combining used, and the output sideband region selection, and in another course dependent upon these factors other combinations may be developed. Note again this FIG. 8 embodiment, "Pal Channelizer 1000L possesses in common DBM 121/906 to which the intermediate carrier signal of sin $2W_m t$ is applied in accord with the "IQM" $n=2$ case as earlier described. For the modified "HIPS" technique in handling A1 band input for channel I output, a slight departure is taken from the prior example case of FIGS. 2 and 4, where a cos $2Wt$ intermediate carrier signal was in use, modified "HIPS" operation with a sin $2Wt$ carrier is demonstrated in a later signal analysis.

To account for this change and suit the common carrier input, 90 degree phase shift network 130 is shown inserted between BPF 118 and terminal T2 leading to the modulation input of DBM 121/909. This procedure is equivalent to placing the quadrature network at the carrier input to acquire the shift of sin $2W_m t$ to cos $2W_m t$. At this point, the equivalency of the input stages of HIPS–IQM and "PIPS–IQM" strikingly pronounced, and the subsequent cofunctional nature of the "pal channelizer" action stands out as the central operation thereto.

GENERAL "PAL CHANNELIZER": FIG. 8*a*

Remarkably, in effect, the "pal channelizer" sub-system section 1000 accepts four applied audio signal bands and produces therefrom only the R.F. signal output combination of two channel ISB operation. While shown in the embodiment of FIG. 8 as generating the pair of USB channels for the "PIPS–IQM" set in the "pal channelizer" sub-system section 1000U, and the pair of LSB channels of the "HIPS–IQM" combine in the "pal channelizer" sub-system section 1000L clearly a general "pal channelizer" sub-system section 1000 is suitable and one that develops the LSB–USB output of FIG. 4 and FIG. 7 is likewise attainable, as shown pointed out in FIG. 8*a*.

In strict detail, the design factors of "pal channelizer" sub-system section 1000 (U or L) bear some distinction with the particular duo-modulation operation to which it applies; and the prior descriptive material has been exacting in note of these requirements. However, a singular and in-common dual function that links the sub-system assembly to channelize the duo-modulation pairing accommodates adaptive performance practice in a less tailored compositional operation. One differing design factor therebetween is observed to be the cut-off frequency $f_{co}$ of the low pass filter output being 8.7 kc. in the "HIPS" case and 10.5 kc. for use with the "PIPS" technique. Here the higher cut-off frequency value (10.5 kc.) is standardized as suitable for the needs of the two methods. A second difference concerns the injected intermediate audio and oppositely offset I.F. carrier signals frequency values. However, as stated earlier, the applied carrier signals that can represent the virtual carrier frequency value of the overall system do not rely solely upon the carrier suppression effects of the double balanced modulators, but also experience suppression by the inpath filters. Double balanced modulator design as known can provide for substantial balance over a broad range of frequency, and thus be directed to accommodate the differing frequency values of concern. In FIG. 8, of course, in being positioned to handle the channel bandwidths to which it is assigned, the R.F. BPF 715 and AE & TDC 716 stages are fixed thereto. However, with the continuing exercise of invention, a universal "pal channelizer" sub-system section 1000 usable in either case establishes itself as shown in FIG. 8*a* with the natural economies that result therefrom.

In a more adaptable module assembly, the "pal channelizer" sub-system 1000 incorporates a pair of R.F. bandpass filters, and with switchable selection made between the two BPF's produces the desired application need. Then a singular AE & TDC 716 stage is now designed to handle the entire four BW channel region; and since a common audio low pass filter path is in use, this is readily done.

In keeping with the ready cost effectiveness theme of the methods of modulation given herein in FIG. 8*a*, the "HIPS" and "PIPS" initial audio product operation stages of DBM 108 and BPF 118 and DBM 708 and BPF 718 respectively are identical therewith. Equally, observe the like initial stages of "IQM" exist for DBM 901 and LPF 903 and DBM 908 and LPF **900*a* for $n$ factor of two as with DBM 201 and LPF 203 and DBM 208 and LPF 200*a* for the case of $n=3$. Hence, standardization thereof may be made as interchangeable therebetween, and broken line enclosed section 2000** of FIG. 8*a* serves this dual purpose.

The common input translation section 2000 of FIG. 8*a* provides the pair of first quadrature operations and feeds audio direct and in quadrature signal inputs to terminals T1, T2, T3, and T4 for either the "HIPS–IQM" pairing of lower sideband pair output or the "PIPS–IQM" pairing of either lower or upper sideband pair output. Thus incorporated with section 2000 are ganged switch sections SWIQM, SWIPS, SWOT2, SWOT3 and SWΔφ which coupled with the ganged switch operation of general "pal channelizer" 1000, allows for the selection of the desired pair combination and accordingly by producing thereby the ±90 degree phase change of phase shifter 1130 to be applied as either advancing or retarding with the "HIPS" or "PIPS" technique respectively as required.

To distinctly indicate the stage commonality of section 2000, the items are numbered in the 1100 series and the encircled carrier signal supply representations are duplicated. Thus, for the "IQM" first quadrature operation, the direct translation is made by DBM **1108*a* in tandem with LPF 1100*a* receiving cos $W_m t$ carrier signal. The quadrature translation function develops from DBM 1101 in tandem with LPF 1103 and the cos $W_m t$ signal is supplied via phase shifter $\pm\pi/2$ 1102** to become the carrier signals of ∓sin $W_m t$. Application of band signal input to broken-dotted line enclosed 1st quadrature operation produces the aforedescribed signals at terminals T1 and T4 in a quadrature relation.

Here phase shifter 1102 is shown representative of a switchable $\Delta\varphi=\pm\pi/2$ type respectively producing either a plus or minus sin $W_m t$ output as so selected. Ganged switch section SWΔφ has its contacts thus connected therewith such that, to avoid sideband inversion in the case of USB region "IQM" generation at position U, +sin $W_m t$ becomes the carrier signal supplied to DBM 1101 carrier input; likewise in position L2.

This is in accord with an "IQM" characteristic whereby the frequency displacement locates the unfolded direct and translated band content, while the combination of the carrier polarity and arithmetric nature of the combiner function in determining the inverted or non-inverted form of the resulting output.

Hence, internally phase shifter 1102 consists of a phase shift network pair, one being +90° change and the other of −90°, the required polarity path therethrough set by selector SW. SWΔφ. For the "IPS" technique, the first translation comprises DBM **1108*b* in tandem with BPF 1118 receiving the cos $W_m t$ carrier signal. In general the "IPS" 1st quadrature operation concerns the first translation process feeding via the in-path quadrature of $\pm\pi/2$ phase shifter 1130** to indicated position of group ganged 3P–DT switches SWOT2 and SWOT3; the wipers of which connect to terminals T2 and T3 respectively. It is worth repeating that such switch action as shown herein throughout may by design be of the well known electronic transmission gate nature and controlled by digital logic signals.

The in-path (2100–5100 c.p.s.) quadrature for the modified "HIPS" technique of FIG. 8 is given in lumped form differing from that of the "PIPS" circuit arrangement of FIG. 8. While a like 90° lumped stage can be used in the "PIPS" technique, notice $\pm\pi/2$ phase shifter 1130 is divided into a switchable arrangement of a −45° lagging phase shift network 1130*a* and a +45° leading phase shift network 1130*b*. With ganged switch set to position U and L2, the direct signal path to terminal T3 is advanced 45° while the translation path to terminal T2 is retarded 45°; whereby the signal content at terminal T2 is in quadrature. Using the direct path as reference, the translation path is retarded by $\pi/2$ amount, and this signal process implements the "PIPS" technique.

For "HIPS" with switches SWOT2 and SWOT3 in position L1, a 45° lag in the direct path and a 45° lead in the translation path results, whereby the signals at terminal T2 undergo $+\pi/2$ phase change with respect to reference signal at terminal T3. An analysis of the modified "HIPS" process with in-path quadratures is given in the following section.

The general "pal channelizer" is as separately given within broken lines enclosed section 1000 and highlights the full interchangeability acquired as the modulation workings of this specification climaxes in a four channel excitation system with merely the repeating of section 2000 in tandem with section 1000, as shown in FIG. 8*a*, and the supplying of the prescribed carrier signal input. Ganged switch operation of pal channelizer 1000 consists of a series of single pole-triple throw position switches, SW.I, SW.D, DW.T, and SW.O. At U position the USB pairing operation is connected, and positions L1 and L2 implement the LSB pairing actions in an MC–ISB system.

In effect, at position U, the "pal channelizer" 1000 is similar to the embodiment of the aforedescribed "pal channelizer" 1000U of FIG. 8. At position L2, the "IQM–PIPS" LSB pair is generated, and when placed into position L1, the "pal channelizer" 1000L of FIG. 8 is implemented.

Accordingly, SW.I provides the intermediate $$(\pm)\ \sin 3W_mt$$

carrier signal application to the general in-common intermediate translator 17, which is of 10.5 kc. cutoff frequency. Thus for position U and also position (−) L2, $\sin 3W_mt$ is supplied from a common carrier generation system, not shown in FIG. 8*a*. A pair of such carrier supply systems are described in the FIGS. 5 and 7 embodiments. At SW.I position L1, $\sin 2W_mt$ becomes the intermediate carrier signal. For the direct channel path, SW.D at position U supplies the offset carrier signal of $\cos (W_c+W_m)t$ to DBM 113; and at position L1, the offset carrier signal of $\cos (W_c-3W_m)t$ feeds thereto. In the case of supplying carrier signals to DBM 213 for the translation channel path, SW.T at position U provides the $\cos (W_c+2W_m)t$ signal; and in position L1, feeds thereto the supplied signal of $\cos (W_c-W_m)t$. For the specific mode output selection, SW.O in position U connects BPF 715U into the system for supplying the filtered USB pair output of channels II and IV, shown in sketch 718 of FIG. 8. Switch setting into position L1 produces the LSB pair output of channel I and III, shown in sketch 719 of FIG. 8, from BPF 715L.

Hence, the "pal channelizer" exhibits broad commonality, since it is clear that a LSB pair of "IQM–PIPS" duo-modulation output is also generated much like that of the described USB pair for the FIG. 8*a* embodiment. Designated as the L2 position of the ganged mode switch, the LBS "IQM–PIPS" pairing operation is brought about by supplying offset carrier signal $\cos (W_c-W_m)t$ to DBM 113, offset carrier signal $\cos (W_c-4W_m)t$ to DBM 213, and having the BPF 715L at the output remain unchanged. Now a plus or minus intermediate carrier signal $\sin 3W_mt$, continues to be supplied to general in-common intermediate translator 17, whereat 2nd quadrature operation occurs using $(+\sin 3W_mt)$ at position U and $(-\sin 3W_mt)$ when in position L2.

PAL CHANNELIZER ANALYSIS: HIPS—A1 CASE

To best understand the analysis of the "Pal Channelizer," which links differing sets of excitation principles, again the initial phase angles of the carrier signals are set to zero by having the time origins correspond to peaks in assuming cosine terms, along with the signals being assumed set at unity amplitudes. Such theoretical consideration is a recognized general procedure justifiably allowed for otherwise the rigorous analytical functions produce obscurring mathematical detail and physical interpretation suffers therefrom.

The specifics of this mathematical treatment follows the way of the earlier defined two frequency analysis for the modified HIPS technique, since the remaining FIG. 8*a* intermediate sideband modulation operations follow their prescribed course as set forth by the previous analyses.

The first quadrature process section 2000 of FIG. 8*a* is utilized as totally applicable. Thus with A1 band as cos signal input and a $\cos W_mt$ carrier signal, the first translation operation gives at the bandpass filter output the sum product result as produced at Ⓒ in the FIG. 4 embodiment, which is $$(\tfrac{1}{2})\{\cos [(2W_M-W_a)t+\phi_1]+\cos [(2W_M+W_a)t+\phi_2]\}$$

Proceeding thereupon to in-path quadrature, the signal input to the DBM of in-common intermediate translator 17 is advanced 90° to become $$-(\tfrac{1}{2})\{\sin [(2W_M-W_a)t+\phi_1]+\sin [(2W_M+W_a)t+\phi_2]\}$$

The product operation thereat with the common intermediate carrier signal of $\sin 2W_mt$ produces:

$$-(\tfrac{1}{2})\{\cos [W_at-\phi_1]-\cos [(4W_M-W_a)t+\phi_1] +\cos [-W_at-\phi_2]-\cos [(4W_M+W_a)t+\phi_2]\}$$

This signal output via a low pass filter feeds to DMB 213, where product multiplication with $\cos (W_c-W_m)t$ results in $$-(\tfrac{1}{2})\{\cos (W_at-\phi_1)-\cos[4W_M-W_a)t+\phi_1+\cos (W_at+\phi_2)-\cos [(4W_M+W_at+\phi_2]\}[\cos (W_c-W_M)t]$$
$$=(\tfrac{1}{2})\{\cos [(W_c-W_M-W_a)t+\phi_1] +\cos [(W_c-W_M+W_a)t-\phi_1] -\cos [(W_c-5W_M+W_a)t-\phi_1] -\cos [(W_c+3W_M-W_a)t+\phi_1] +\cos [(W_c-W_M+W_a)t+\phi_2] +\cos [(W_c-W_M-W_a)t-\phi_2] -\cos [(W_c-5W_M-W_a)t-\phi_2] -\cos [(W_c+3W_M+W_a)t+\phi_2]\}$$

Direct path operation gives $$\{\cos [(2W_M-W_a)t+\phi_1]+\cos [(2W_M+W_a)t+\phi_2]\}\cos (W_c-3W_M)t$$

which is expressed as:

$$(\tfrac{1}{2})\{\cos [(W_c-5W_M+W_a)t-\phi_1]+\cos [(W_c-W_M-W_a)t+\phi_1]+\cos [(W_c-5W_M-W_a)t-\phi_2]+\cos [(W_c-W_M+W_a)t+\phi_2]\}$$

Accordingly, the subtractive combining-bandpass filtering produces the transposed A1 channel I of $$\{\cos [(W_c-W_M+W_a)t-\phi_1] +\cos [(W_c-W_M-W_a)t-\phi_2]\}$$

Thus, the "HIPS" operation result for A1 band content is like band spectrum sketch ◇2 of FIG. 3. Observe therefrom that sum products of the "HIPS" translation are removed, wherein A1′ band content translation of the modulator 213L output is beyond and at lower frequency of the channel III A2 outboard content. Since the "pal channelizer" band pass filters encompass but two channels, the undesired "HIPS" content beyond this pass region is further rejected, as likewise occurs for the undesired content in the "PIPS" technique.

In FIG. 8*a* review, ganged switch position U accepts B1 input at SW.IQM and B2 input at SW.IPS to produce the respective channel II and IV USB pair output at terminal U. Position L2 receives A2 band content at SW."IPS" and A1 signal input at SW. "IQM" to develop the respective channel III by "PIPS" technique and channel I by "IQM" $n=3$ process in the lower sideband region at terminal L2. For the L1 position, the A1 band input is processed in accordance with the "HIPS" technique, while the A2 input undergoes $n=2$ case, "IQM," to generate the LSB pair at terminal L1.

While "pal channelizer" compatibility with either of the aforedescribed pair sets has been demonstrated, each bears a fruitful capability of its own. For example, the "HIPS–IQM" combination has a less complex carrier signal generation system; but, as earlier pointed out, sideband reinforcing does not occur in the "HIPS" process. The "PIPS–IQM" pair with its additive sideband reinforcing feature is therefore most frequently preferred, though more involved signal generation is required for the carriers. Understandably, the standard module of subsystem section 1000 is of great value with a view to manufacture, and of further importance is the high maintainability advantage since only a singular sub-system section 1000 need be kept in stock for replacement in the event of a breakdown. This statement likewise applies to section 2000.

The emergence of these uniquely assembled cofunctional sub-system sections 1000 and 2000 stands out as prominent features of the new methods of modulation involved and dominates in other areas where such duomodulation requirements find application. In a more expanded aspect, consider a broader elaboration that leads to a stereo left-right communications approach in the AM broadcasting field, where one channel represents left side information and the other channel contains right hand content. This capability presents itself, since as noted earlier in this specification, other bandwidths than exampled herein may be used.

For immediate purposes either method of intermediate sideband modulation (ISM) has been exampled hereinbefore in the handling of data information having 3K c.p.s. audio bandwidth. However, the demonstrated two frequency signal approach applied in the mathematical analysis of each modulation process further establishes the useful assignment of the systematic technique to other areas of transmission. In view of this, then for clarification of FIG. 8*a*, consider the physical interpretation of the "PIPS" sideband reinforcing action in the following way.

Omitting for the moment the applied band input and carrier signal phase shift stage, then the straight forward intermediate translation 17 operation produces a like phase form double sideband output as that obtained for the double sideband output at the I.F. region from the direct band content modulation taking place over another path via DBM 113. Thereupon, the I.F. translation at DBM 213 of this intermediate double sideband product results in frequency and phase coincidence of one pair of product terms with the direct I.F. double sideband components. With sideband pairs thus positioned at the like spectrum location, the subsequent combining would undesirably result in either cancellation or reinforcement of both.

However, let the intermediate phase shift type translation be in force, that is with both the in-path band input thereof and the supplied carrier signal thereto experiencing a like 90° shift, say $(-\pi/2)$.

In intermediate sideband modulation with the pair of input signals changing by like direction phase amount, the difference products retain their frequency inversion but result in negating the phase shift.

On the other hand, the inserted phase shifts add to each other for the non-inverted sum products producing the 180° phase inversion of the USB terms in the intermediate operation. This sideband inversion, expressed as a polarity change, is carried forth into the I.F. region, whereby one of the pair in the double sideband output is now in phase opposition to a corresponding sideband of the direct I.F. double sideband result. Combining then produces one side band reinforced and the phase cancellation of the other sideband. In the specific example case of FIGS. 5 and 7, subtractive combiner 717 gives USB Channel II output.

The availability of having various differing combinations in sideband and phasing selection is continuously stressed and it is not to be construed that the example process arrangements shown by the accompanying block diagrams limits "ISM" generation techniques thereto. As but an immediate example, with respect to the FIGS. 5 and 7 embodiments, substituting a summing type combiner at the channel outputs and injecting a positive sin $W_mt$ to carrier into the channel I signal path produces therefrom a "PIPS–IQM" lower sideband combination pair output of channels III and I respectively. Recall that the LSB pair out of the FIG. 8*a* embodiment at position L2 also results in "PIPS–IQM" combination which likewise is channels III and I respectively. The operability of the above two example selections is readily deduced from the sideband distribution sketch [1] of FIG. 6*b*. Since the difference combiner 717 is in use for FIG. 8*a*, then for this reversed condition the intermediate carrier is of $(-\sin 3W_mt)$ form and the "IQM" path receives carrier input $(+\sin W_mt)$.

The preferred FIG. 8*a* embodiment of "PIPS"–"IQM" USB arrangement at position U shows the $3f_m$ final separation as between $(W_c+W_m)$ and $(W_c-2W_m)$; but in accord with the outlined combining and phasing sense procedures, it becomes clear that $(W_c-2W_m)$ may be replaced by $(W_c+4W_m)$ for a like result.

Thus without detailing and with respect to two frequency signal analysis and subsequent assignment on an appropriate frequency scale, the dual frequency spaced relationship may represent double sideband input content externally developed elsewhere; whereupon the illustrated modulation apparatus functions in frequency translation to locate the subject content with respect to a new carrier position. In general, any signal band information input content, having a symmetrically structured spectra, which is usually the case for modulated waveform and of which recent narrow band frequency modulation is an example, may be suitably transposed due to the transmission operation obtained by way of intermediate sideband modulation with appropriate band limiting resulting therefrom. Accordingly, the first used carrier oscillator signal is frequency equated to the center frequency of the input content about which the spectrum components or bands are symmetrically positioned. The intermediate carrier signal continues to constitute the quadrature related frequency multiple of the first used carrier with the $n$ either $n=2$ or $n=3$ as the case may be. Thereupon, the final carrier signal pair are of like phase and frequency spaced apart by the frequency multiplied amount injected into the intermediate translation operation. Additional areas of information movement wherein "ISM" method apply towards the communication of data change will present themselves to others skilled in the art.

RECEIVER SYSTEM OPERATION: FIG. 9

For the explanation of a featured reception capacity within the confines of this communications system FIG. 9 embodiment, consider in use a receiving antenna 406' and a superheterodyne frequency stabilized R.F.–I.F. receiver front end spectrum translator 400 that comprises a R.F. pre-selector and first mixer with I.F. amplifier; along with a second mixer and second I.F. amplifier. Let the second I.F. amplifier center frequency correspond to the system carrier frequency and the second I.F. BW encompass the ISB common BW of channels I through IV as shown in spectrum sketch 712. The receiver tuning oscillator signals may be derived and supplied by a common frequency synthesizer or by an AFC/APC VFO operation of the system.

For purposes of convenience herein, only the two USB channel system reception operation, one channel being the implementation of the "HIPS" technique and the other exampling the "PIPS" approach, as illustrated in FIG. 9 wherein the stage reversals have already been made, is given primary consideration in the multi-channel reception description. In the exampled case, channel I, LSB, is shown connected in intermediate quadrature modulation position, with its $n$ factor handling path being for the new case of $n=3$, and its commonality with the other LSB "PIPS" channel operation is pointed out.

In the convention of the art, the signal process for reception now proceeds in the opposite manner to that given for FIGS. 2 and 5, that is, with a left to right direction in FIG. 9. Since by way of demodulation, a reverse signal process of that given in the modulation and transmission descriptions of FIGS. 2 and 5 takes place, no detailed treatment of the paths in the reception mode is required. In view of the foregoing description that includes the basic analysis of FIGS. 4 and 7, consideration is mainly given to the alternative aspects and other developing features brought forth in reception.

Again, only circled carrier signal source designations are illustrated and a typical circuit arrangement for the generation of the phased carrier signals from a singular audio reference may be designed with respect to a 5400 c.p.s. source in accordance with the technique used for the alternative carrier supply section shown in the FIG. 5 embodiment of my aforementioned copending patent application.

Here in the FIG. 9, the illustrated communications system structure accomplishes multi-channel ISB reception and the priorly established hundreds series stage numerization is continued for the congruent description thereof. In this respect, the "PIPS" technique is carried out via stage element series 700 and 900 respectively to establish the outboard USB audio channel B2 and the outboard LSB audio channel A2 output; while the inboard USB audio output B1 is produced over the 200 stage numbered items by the application of the "HIPS" type operation with a higher factor in substitution for the "IQM" method with $n$ being 3, such as shown associated with the "PIPS" technique in the inboard LSB demodulation for the A1 band output of the receiver.

The manner of "IQM" reception essentially follows the process delineated in my copending patent application and need not be related except to note the consolidation of in-common stages allowed. The higher factor case of "HIPS" is of novel interest and, while the demodulation case is described, this method of "HIPS" excitation in the higher factor mode becomes evident in the light of the prior material of this specification.

The four channel band output, shown in spectrum sketch 712, is supplied over two paths. One path feeds to USB channels II and IV bandpass filters 715U which has a bandpass region allowing passage at its output only the USB B1 and B2 channels, as shown in spectrum sketch 713. The other path connects to LSB channels 1 and III bandpass filter 715L and the output thereof consists of the LSB A1 and A2 channels, as shown in spectrum sketch 714.

Using the parenthesis enclosed notation for application of similar operations procedure with respect to the LSB content, then USB channel II and IV bandpass filter 715U (LSB channel I and III bandpass filter 715L) feeds its two channel output over two paths. One path connects to the modulation signal input of double balanced modulator 213U (213L), which is receiving the carrier signal input cos $(W_c-2W_m)t$ of 96.4K c.p.s. (cos $(W_c+2W_m)t$ of 103.6K c.p.s. frequency). The other path feeds to AE & TDC stage 716U (AE & TDC stage 716L). The function of amplitude equalization and time delay compensation operation, as stated in detail hereinbefore, is to account for the amplitude and phase differences resulting from the intermediate modulation operation that is to be experienced within one of a pair of channel paths.

AE & TDC stage 716U (AE & TDC stage 716L) feeds its output to the modulating signal input of double balanced modulator 113U (113L), which is receiving the carrier signal input cos $(W_c+W_m)t$ of 101.8K c.p.s. (cos $(W_c-W_m)t$ of 98.2K c.p.s. frequency).

The demodulated audio output of DBM 113U (113L) is shown in spectrum sketch **113*b* (113*a*) and consists of folded over (0–1500 c.p.s.) B1 (A1) band content along with band signals between (2100 to 5100 c.p.s.) representative of B2 (A2) demodulated information. DBM 113U (113L) output is supplied over two paths. One path connecting to low pass filter 224 (800*a*) of approximately greater than 1500 c.p.s. cutoff frequency and the other path feeds to 45° phase shifter 730*a* (930*a*). The phase shifted output therefrom serves as the B2 (A2) PIPS direct channel output. Low pass filter 224 (800*a*), of linear phase-frequency characteristic passes only the demodulated B1 (A1) signals and readily rejects the B2 (A2) band signal applied at its input. The (0–1500 c.p.s.) passed signal output of LPF 224 (800*a*) is supplied to the modulating signal input of double balanced modulator 225 (808**).

From this point, the signal processing over the above paths differ, with DBM 225 receiving cos $3W_mt$ carrier signal input for the "HIPS" translation operation and DBM 808 has the carrier signal input of cos $W_mt$ for the A1–"IQM" direct channel operation. Hence, DBM 225 (808) output consists of the unfolding of the (0–1500 c.p.s.) signal about a center frequency of 5400 c.p.s. (1800 c.p.s.) producing the band signal (2900 to 6900 c.p.s.) (300 to 3300 c.p.s.). The output of DBM 225 is fed to bandpass filter 226, which has a flat pass region of 3900 to 6900 c.p.s. and is of linear phase-frequency characteristics.

BPF-226 output represents the B1–HIPS translator channel output, and DBM 808 output comprises the A1–IQM direct path result.

Consider now the signal processing that takes place for the demodulated product output of DBM 213U (213L), the resultant audio content of which is as shown in spectrum sketch **213*b*(*a*)**. Accordingly, the channel II (I) B1 (A1) information content demodulates into the band region of 3900 to 6900 c.p.s. The channel IV B2 (III–A2) band signal is down frequency converted and transposed between the band limits of 7.5 to 10.5 c.p.s.

DBM 213U (213L) output is supplied over two paths, one path feeding to bandpass filter 227 (810) and the other path connecting to bandpass filter **733*a* (933*a*). BPF 227 (810) is of linear phase-frequency characteristic over its flat bandpass region of 3900 to 6900 c.p.s. and passes only the demodulated B1 (A1) band signals and readily rejects the B2 (A2) content. BPF 733*a* (933*a*) has its pass region from 7.5 kc. to 10.5 kc. and is of linear phase-frequency charasteristic; thereby passing only the demodulated B2 (A2) band signals but readily rejects the B1 (A1) signal content. The output of bandpass filter 227 represents the B1–HIPS direct channel results, which combines with the B1 HIPS translation channel output of BPF 226. The combining action is such that one of the double sideband outputs of BPF 226 is phase cancelled by BPF 227** signal output, and the desired B1 information content remains as the other double sideband signal in the 3900 to 6900 c.p.s. region.

The combined result feeds to the modulating signal input of double balanced modulator 228, which is here receiving the cos $4W_mt$ carrier signal, as required of the "HIPS" $n=3$ case.

The double sideband product output of DBM 228 is applied to low pass filter 229, which has a cut-off frequency suightly greater than 3300 c.p.s. LPF 229 passes only the difference frequency product output of DBM 228, which represents the B1 audio information content output in the 300 to 3300 c.p.s. band.

The demodulated B2 (7.5 kc. to 10.5 kc.) signal output of BPF **733*a* is fed to the modulating signal input of double balanced modulator 731, which is receiving sin $3W_mt$ (5400 c.p.s.) carrier signal input. The double sideband product output of DBM 731 consists of difference products (2100–5100 c.p.s.) and sum products (12.9–15.9 kc.) and is supplied to phase-shifter 730*b*, the output of which represents the B2 PIPS translation channel result. The sum products of (12.9–15.9 kc.) are beyond the audio range of interest. The phase shifted difference products at the output of phase shifter 730*b* combines with the phase shifted 2100 to 5100 c.p.s. B2 signal content output of phase shifter 730*a*. Having undergone in-path quadrature and carrier modulation quadrature, the phase relations of the "PIPS" signal process develops in a manner that reinforcing of signal content occurs, and the combined results are applied to bandpass filter 718, which has a 2100 to 5100 c.p.s. pass region. The 2100 to 5100 c.p.s. band signal output of BPF 718 feeds to the modulating signal input of DBM 708**, which is receiving the carrier signal input of cos $W_mt$.

The double sideband product output of DBM 708 is supplied to low pass filter 700, which is of slightly greater than 3300 c.p.s. cutoff frequency, and only the difference frequency product of 300 to 3300 c.p.s. is passed therethrough; this signal band output being representative of the B2 audio information content.

The "PIPS" technique demodulation over 900 series stages for audio band A2 output occurs in similar manner as given in the above description for the 700 series elements producing audio channel output B2.

The "IQM" method for A1 band signal output shown here in the 800 numbered series for the $n=3$ case differs in the intermediate carrier modulation operation from the detailed demodulation process of the $n=2$ case given in the aforementioned co-pending patent application. Now the intermediate double balanced modulator 806 is receiving the carrier input of sin $3W_mt$; this being 5400 c.p.s. frequency; and receives its modulating signal input from the output of bandpass filter 810, which readily passes the spectrum band B1 between frequencies 3900 to 6900 c.p.s.

Here note that the DBM 213L demodulated output, while like of DBM 213U output, is applied over two paths, one path feeding to BPF 810 and the other path connecting to BPF **933*a*. The bandpass filters 810 and 933*a* have their outputs respectively applied to DBM 806 and DBM 931, which are experiencing the identical carrier signal input of sin $3W_mt$. Accordingly, a singular and in-common intermediate demodulator 800/900 may be put in use much in principle with that exhibited and described in the earlier "pal channelizer" sub-system section 1000** of FIG. 8*b*. Only one bandpass filter **810/933*a* is then present, and now having a bandpass region encompassing (3900 to 10,500 c.p.s.). The common DBM 806/931 output subsequently connects over two paths, one path being to LPF 803 and the other path feeding to phase shifter 930*b***. Thereafter, the signal processing remains the same.

Hence, the received information content within the R. F. bands of channels I, II, III, and IV are processed and demodulated to respectively produce the original audio band signals communicated as A1 via IQM, B1 through "HIPS" process, and A2 and B2 using the "PIPS" technique.

While the FIG. 9 embodiment illustrates a multi-channel independent sideband reception operation, it is clear that either of two "intermediate phase shift" techniques can function by itself in a reception mode and thus "HIPS" and "PIPS" excitation and demodulation process represent overall methods of communication.

THEORY OF INTERMEDIATE PHASE SHIFT DEMODULATION

In general, with appropriate between channel equalization and compensation being assumed to occur and omitting coefficients in this simplified demodulation examination of the intermediate phase shift (IPS) process, the received sideband signal detection is mathematically expressed with respect to the "PIPS" signal path procedure in the following manner:

Let received I. F. band signal B2 of channel IV be designated as:

$$\sum_{n=1}^{N}\cos\left[(W_o+2W_M+W_n)t+\phi_n\right)$$

I. F. product demodulation at DBM 113U of $$\left\{\sum_{n=1}^{N}\cos\left[(W_o+2W_M+W_n)t+\phi_n\right]\right\}[\cos\,(W_o+W_M)t]$$

gives the difference output terms of $$\sum_{n=1}^{N}\cos\left[(W_M+W_n)t+\phi_n\right]$$

representing B2 of spectrum sketch **113*b***.

For the demodulation operation of DBM 213U, $$\left\{\sum_{n=1}^{N}\cos\left[(W_o+2W_M+W_n)t+\phi_n\right]\right\}[\cos(W_o-2W_M)t]$$

produces the product difference of $$\sum_{n=1}^{N}\cos\left[(4W_M+W_n)t+\phi_n\right]$$

shown as B2 in spectrum sketch **213*b*(*a*)**.

The intermediate translation operation at DBM 731 becomes:

$$\left\{\sum_{n=1}^{N}\cos\left[4W_M+W_n)t+\phi_n\right]\right\}[\sin\,3W_Mt]$$

or $$\left\{\sum_{n=1}^{N}\sin\left[(7W_M+W_n)t+\phi_n\right]-\sum_{n=1}^{N}\sin\left[(W_M+W_n)t+\phi_n\right]\right\}$$

With phase shifter **730*a* being −45° change and a +45° change made by shifter 730*b*, then in accord with sin $(X-\pi/2)=-\cos X$ forms, the difference frequency output of DBM 731** now becomes expressed as $$\sum_{n=1}^{N}\cos\left[(W_M+W_n)t+\phi_n\right]$$

Subsequent combining reinforces the $$\sum_{n=1}^{N}\cos\left[(W_M+W_n)t+\phi_n\right]$$

terms, which pass unattenuated through BPF 718; whereat the higher frequency terms in the sum products are readily suppressed.

At final DBM 708 audio translation, $$\left\{\sum_{n=1}^{N}\cos\left[(W_M+W_n)t+\phi_n\right]\right\}(\cos\,W_Mt)$$

produces the passed difference outbound result as audio band $$\sum_{n=1}^{N}\cos\left[(W_n)t+\phi_n\right]$$

Following a similar analysis now for "HIPS" demodulation processing of the other received USB, designated I. F. band signal B1 of channel II expressed as $$\sum_{n=1}^{N} \cos[(W_c+W_n)t+\phi_n]$$

then, DBM 113U product operation of $$\left\{\sum_{n=1}^{N} \cos[(W_c+W_n)t+\phi_n]\right\}[\cos(W_c+W_M)t]$$

produces difference result $$\sum_{n=1}^{N} \cos[(W_M-W_n)t-\phi_n]$$

as the folded over content B1 in sketch **113*b***.

Demodulation at DBM 213U is $$\left\{\sum_{n=1}^{N} \cos[(W_c+W_n)t+\phi_n]\right\}[\cos(W_c-2W_M)t]$$

and the lower audio products become $$\left\{\sum_{n=1}^{N} \cos[(2W_M+W_n)t+\phi_n]\right\}$$

shown as B1 in sketch **213*b*(*a*); and passes through BPF 227. The unfolding of difference products in DBM 225** product modulation results in $$\left\{\sum_{n=1}^{N} \cos[(W_M-W_n)t-\phi_n]\right\}[\cos 3W_Mt]$$
$$=\left\{\sum_{n=1}^{N} \cos[(4W_M-W_n)t-\phi_n] + \sum_{n=1}^{N} \cos[(2W_M+W_n)t+\phi_n]\right\}$$

whereby the entire band signal passes through BPF 226. For "HIPS" $n=3$ case, a subtractive combining process, while not shown in FIG. 9, is set to occur at the paths junction point. Accordingly, in the joining of the pair of BPF outputs, the $$\sum_{n=1}^{N} \cos[(2W_M+W_n)t+\phi_n]$$

terms cancel. The remaining DBM 228 product operation is then $$\left\{\sum_{n=1}^{N} \cos[(4W_M-W_n)t-\phi_n]\right\}(\cos 4W_Mt)$$

and produces a difference output of $$\sum_{n=1}^{N} \cos(W_nt+\phi_n)$$

as the desired result.

In repeated steps for LSB outputs, then in channel I via "IQM" $n=3$ process the input band A1 product operation at DBM 213L is $$\left\{\sum_{n=1}^{N} \cos[(W_c-W_n)t-\phi_n]\right\}[\cos(W_c+2W_M)t]$$

with difference product result being $$\sum_{n=1}^{N} \cos[(2W_M+W_n)t+\phi_n]$$

shown as A1 in spectrum sketch **213*b*(*a*). At DBM 113L**, $$\left\{\sum_{n=1}^{N} \cos[(W_c-W_n)t-\phi_n]\right\}[\cos(W_c-W_M)t]$$

gives $$\sum_{n=1}^{N} \cos[(W_M-W_n)t-\phi_n]$$

as the difference folded over band shown as A1 in sketch **113*a***.

The intermediate quadrature modulation action at DBM 806 is $$\left\{\sum_{n=1}^{N} \cos[(2W_M+W_n)t+\phi_n]\right\}[\sin 3W_Mt]$$

or $$\left\{\sum_{n=1}^{N} \sin[(5W_M+W_n)t+\phi_n] + \sum_{n=1}^{N} \sin[(W_M-W_n)t-\phi_n]\right\}$$

Filtering only the LSB terms, the final quadrature operation is made at DBM 801, whereat $$\left\{\sum_{n=1}^{N} \sin[(W_M-W_n)t+\phi_n]\right\}(\sin W_Mt)$$
$$=-\sum_{n=1}^{N} \cos[(2W_M-W_n)t-\phi_n] + \sum_{n=1}^{N} \cos[W_nt+\phi_n].$$

In the other path, DBM 808 product operation gives $$\left\{\sum_{n=1}^{N} \cos[(W_M-W_n)t-\phi_n]\right\}(\cos W_Mt)$$
$$=\left\{\sum_{n=1}^{N} \cos[W_nt+\phi_n] + \sum_{n=1}^{N} \cos[(2W_M-W_n)t-\phi_n]\right\}$$

Linear combining of the direct and the translation path outputs results in phase cancellation of inverted undesired sideband $$\left\{\sum_{n=1}^{N} \cos[(2W_M-W_n)t-\phi_n]\right.$$

and additive reinforcing of information band A1 output as $$\sum_{n=1}^{N} \cos[W_nt+\phi_n]$$

which is subsequently low pass filtered.

The final process demodulation for input band A2 using "PIPS" technique over channel III give product operation at DBM 213L of $$\left\{\sum_{n=1}^{N} \cos[(W_c-2W_M-W_n)t-\phi_n]\right\}[\cos(W_c+2W_M)t]$$

which gives LSB product $$\sum_{n=1}^{N} \cos[(4W_M+W_n)t+\phi_n]$$

representing A2 in sketch **213*b*(*a*)**.

At DBM 113L, $$\left\{\sum_{n=1}^{N} \cos[(W_c-2W_M-W_n)t-\phi_n]\right\}[\cos(W_c-W_M)t;$$

produces difference output $$\left\{\sum_{n=1}^{N} \cos[(W_M+W_n)t+\phi_n]\right.$$

shown as A2 in sketch **113*a***.

The intermediate phase shift by carrier quadrature is made at DBM 931 as $$\left\{\sum_{n=1}^{N} \cos[(4W_M+W_n)t+\phi_n]\right\}(\sin 3W_Mt)$$

and produces the LSB result $$\left\{-\sum_{n=1}^{N} \sin[(W_M+W_n)t+\phi_n]\right\}$$

The pair of phase shifters **930*a* and 930*b*** bring about in-path signal band $\pi/2$ phase shift; and this second quadrature in the form of sin $(X-\pi/2)=-$ cos X produces band signal $$\left\{\sum_{n=1}^{N}\cos\left[(W_M+W_n)t+\phi_n\right]\right\}$$

The following combining reinforces the pair of path outputs, whereupon final audio translation at DBM 908 is the product operation $$\left\{\sum_{n=1}^{N}\cos\left[(W_M+W_n)t+\phi_n\right]\right\}(\cos W_M t)$$

and the low pass filtered difference output is thus $$\sum_{n=1}^{N}\cos\left(W_n t+\phi_n\right)$$

Optimumly, the two LSB channels demodulation result of the FIG. 9 embodiment, when redirected by properly displaced carrier signal generation and injection, formulates a ISB receiver for LSB–USB content.

As evidenced herein by the above demodulation analysis and the prior descriptive structual arrangements for MC–ISB reception, then following therefrom SSB transceiver action for any one system operation of the illustrated "ISM" communication modes can be suitably constructed.

OTHER OVERALL COMMUNICATIONS SYSTEMS PERFORMANCE CAPABILITIES OF THE "PIPS" METHOD

On a transient response basis, the prior art single sideband systems are recognized as being usually quite poor where other than the single tone modulation is applied. The prime and secondary effects of the classical asymetrical crystal filter method have been pointed out. For the conventional phase shift method, the phase shift networks, as located in the signal processing paths, are observed to have a phase characteristic approximately proportional to the logarithm of the modulating frequency over the wide (10:1) audio range. This type relationship tends to indicate that undue phase distortion is inherent in the process whenever a band of great frequency ratio is modulated.

Further, where the 90° in-signal path phase shift operation of 10 to 1 frequency ratio is accomplished by a pair of phase shift networks, unequal time delays develop for differing frequencies in passing through the two phase shifting networks. However, since the information bearing components of a modulating band signal are processed by the 90° audio carriers of the intermediate quadrature modulation and the pure intermediate phase shift methods with passage through signal paths that have linear phase to modulation frequency characteristics, this results in fixed time delays to which delay equalization can be applied. Thus, no phase distortion results therein and the fidelity of waveform reproduction is sustained with excellent transient response. It should be recognized that the coherent phase relation between the pair of actual carrier local oscillator signals to the modulators 113 and 213 may be preserved in other ways known to the art, whereby the two heterodyne voltages have identical phase.

By accumulative phase equalization, adjustment is made to alleviate the phase differential; and the time and phase relationships of the pair of quadrature and the pair of phase shift band channels are properly retained prior to their combination.

It is of note that for a band directed to handle data information, for example, constant amplitude signals of audio frequency shift keying (AFSK) operations, then the undesired sideband elimination is dependent upon the balancing of two electrical quantities in phase and amplitude. The SSB signals are thus produced by in-phase reinforced combining and the destructive addition of out-of-phase components.

In this respect, it is of particular interest neither of the intermediate phase shift modulation operations requires I. F. or R. F. quadrature action; or any 90° phase shift at other than the given audio region. This feature is valuable since phase shift stability is more easily acquired at audio frequencies than at R. F.

For completeness of the overall communication, the multiple aspects of the reception mode of this presently described system is broadly considered at this point, and specific single sideband demodulation description is given earlier in the section directed to FIG. 9 drawing.

For a bi-lateral arrangement, the double balanced modulators like 108, 208 and those used in the intermediate operations along with the common final pair double balanced modulators 113 and 213, are of the well known diode ring modulator type, which are also known to be operable as demodulators. It is recognized that the transmission characteristics of the ring diode modulator, which is inherently double balanced by its symmetrical nature, is reversible. Its transmission curve as a function of frequency remains the same for the bilateral direction. In the case of the reversed operation, there is a change of unwanted frequencies, that is the undesirable modulation products. They are, however, readily suppressed by the output filter terminations of the DBM's. Thus, with double balanced modulators, of which ring diode modulators are but an example, the distinction between the modulation and the demodulation process is normally related to the numerical frequency values and their direction applied; where the former process results in higher frequency output for low frequency input and the latter process is the reverse translation operation. Hence, and overall communication system with a symmetrical bi-directional signal path processing of the intermediate sideband modulation operation, a two way type simultaneous transmit and reception mode of operation can further be established by way of this invention.

As a general observation, in view of the symmetrical and bi-directional characteristics for the signal processing paths of the symmetrical intermediate sideband modulation methods of independent sideband communications, it is clear that no sharp-cutoff bandpass filters of the asymmetric type are inherently necessary and a comparatively uniform time delay is acquired over a wide band of modulation frequencies.

The standard functional modules of the basic "IQM" $n=2$ system can with minimal modification, be interconnected to provide either the "HIPS" or the "PIPS" mode of communication. The elements of this interchangeable feature is most observant from the fundamental circuit arrangement of FIGS. 4 and 7. The FIG. 4 (or 7) embodiment shows the in-common final double balanced modulator pair along with the R.F.–BPF pair connected to the AE & TDC stage and output combiner. To thereupon accomplish the "HIPS" operation with the "IQM" modules, a double balanced modulator and a low pass filter are in excess and the quadrature network need not be used. However, the other low pass filter must be of a type to set at the new higher cut-off frequency 8.7K c.p.s. and perform thereto with linear phase-frequency characteristic. From the FIG. 7 embodiment, the implementation of the "PIPS" technique requires that the low pass filter in use here operates to a 10.5K c.p.s. cut-off frequency value; while the quadrature network must function in the generation of the intermediate carrier signal in conjunction with the remaining double balanced modulator and low pass filter interconnection. Recall that a frequency doubler in tandem with a quadrature phase shifter may be used in place of the product multiplier of the basic "IQM" $n=2$ mode. In this case, a second quadrature network is available for the in-path quadrature operation required of the "PIPS" arrangement. Such interrelated capability provides a system of various modes of transmission whereby the arrangement of the basic audio modules can be automatically switched in response to digital logic control to form a differing SSB modulation operation whenever a fault is detected in a basic module in use.

The inception of these new methods of intermediate sideband modulation concern phased systematic relations, and the in-path signal processes are implemented over parallel paths of linear phase-frequency characteristics for the functional signal analysis of this specification. This, however, does not dictate that complete reliance is placed upon constant linear phase bandpass regions. Indeed, the in-path circuit stages of like use in the parallel paths need only exhibit matched characteristics, and the intermediate circuit stages may be closely compensated in accord with their actual characteristics. Though herein specifically directed to account for channel matching due to the insertion of an intermediate translation operation, employing a form of amplitude equalization and time delay compensation is, in any event, found to be characteristic of all practical excitation systems geared to the full bandwidth handling of non-voice type information.

Sideband operation with but a single channel necessitates solving the asymmetric filter problem and where a dual like pair of channels is applied as in proir art phase shift or quadrature systems, characteristic differences between the associative practical stages of the corresponding channel exist; wherein either situation involves the design of particular gain response and phase difference correction parameters. Thus while matched modulators are preferred, discrepancies in design and stability adjustment of the modulators in use may be incorporated into the performance characteristics of the amplitude equalizer and time delay compensator stage to attain the required accuracy of the amplitude and phase relationships for significant suppression of the unwanted sideband signals in the combining process.

More attentive design considerations are duly directed to the amplitude equalization and time delay compensation step, and a proper guidance is obtainable from computer-derived tables such as exampled in the technical paper, "Pick a Delay Equalizer," by Mr. V. R. Cunningham, Electronic Design Magazine, May 24, 1966, pages 62–66.

Further, the audio region filters may be of the active filter type with compromise characteristics such as attainable from transitional Butterworth-Thompson (TBT) filter design given in the technical article, "If You Need Active Filters," by R. S. Melsheimer, Electronic Design 8, April 12, 1967, pages 78–82.

Present art designs for the indicated in-signal path stages suiting any of the "ISM" techniques exhibit linear dynamic range extending towards 60 db level.

Such unit stages also possess near linear transfer phase characteristics producing thereby an excitation system of minimal group or time delay distortion. As example, for the two bandwidth channel output I.F. symmetrical BPF 715 of FIG. 8 or 8*a*, one may utilize available symmetrical bandpass bandpass crystal filter satisfying the selectivity requirements prescribed with linear phase characteristics over a central 75% portion of its bandwidth. Hence with a total 8.8K c.p.s. bandwidth design, the required and usable 3K c.p.s. bands with 600 c.p.s. separation covers the 6.6K c.p.s. area of linear phase response, that is, ±3.3K c.p.s. from the central frequency; experiencing therethrough a constant time delay that may be readily equalized at R.F. or audio frequencies.

In sombre view of the existing stage design techniques stated above, the practical imperfections of the aforedescribed system implementation that proceeds from the systematic signal processing ideal of the "ISM" methods tend more toward insignificance rather than hinder the acquisition of the delineated operational results. Consequently, by virtue of the PAL channelizer, the bandwidth gap therebetween in either "HIPS" or "PIPS" processing is most aptly bridged with "IQM" mode derived spectrum content.

Overall, the contents of this specification indicates definable steps of many complex branches leading to the encompassing root of this communication system development.

In brief the "HIPS" technique is first introduced as SSB generation complementary to the "IQM" method, whereby the fold-over half bandwidth operation is accomplished at an intermediary stage to subsequently be unfolded about an offset carrier signal and have its undesired sideband content phase cancelled when combined with an amplitude and phase equalized sideband produced in a parallel path with respect to an oppositely offset carrier signal. Second, the "PIPS" method is initiated as a SSB modulation process complementary to a higher factor case of the prior "IQM" technique, wherein in-path quadrature of audio band ratio less than 2.5 to 1 occurs along with an audio carrier signal quadrature operation that, upon modulation with respect to a pair of oppositely offset carrier signals, and suitable channel equalization, produces the reinforcing of the desired sideband and the phase destruction of the undesired sideband.

Third, the above two paired complementary excitation processes are established within a composite MC–ISB system deriving therefrom a congruent arrangement of sub-system sections that allows adopting a plurability of information inputs to link through channels of high commonality.

Broadly speaking, the paired methods of "ISM" are information band translation operations that generate frequency disposed double sideband modulated products which, upon equalization and compensation, combine to be symmetrically filtered and displaced as two independent sideband channel outputs.

Instituting a near classical manner of signal processing, a "ISM" system implements an input translator for first quadrature operation and an intermediate translator for a second quadrature operation, both actions being taken in audio frequency range; along with a final oppositely offset dual translator for adjusted phase-frequency combining and subsequent symmetrical sideband filtering of a single sideband output at the I.F. region. In the pairing procedure, only an added input translator is required with the usable bandpass region extended for the intermediate translator and for the I.F. output sideband filtering. The "PAL" channelizer instrumentation thus constitutes the tandem arrangement of the in-common intermediate quadrature and the final output translations. The designated audio and intermediate frequency pairs of carrier signals are supplied thereto bridging the common path deployment of the compatible "HIPS–IQM" or "PIPS–IQM" paired "ISM" methods.

Whereas the bulk of this "ISM" descriptive presentation handles band signal content, it is a universal understanding in electronic art that such processing naturally encompasses signal modulation with but a singular frequency component. This outlook merely reaffirms the widespread and purposeful sweep of the already referred to variety of "ISM" methods upon exposure to other fields. For but a pair of examples, the "ISM" demodulation process for reception functionally serves as a selective filter and detector in wave analysis; and the "ISM" excitation process for transmission finds its extension in CW signal translation and modification. As final insurance, this improved manner of communication interchange illustrates an answer to the long sought for system commonality, wherein channel multiplicity brings with it the minimizing of in-path circuit complexity but with functional increase of existing stage use.

Like the past history observed for various other modulation approaches and such as encounted by the "IQM" example herein, the utilization thereof may be accomplished in differing fields of application. The particular exampled uses featured herein are directed to the achievement of high frequency, long range, relatively delay distortion minimized, data link multi-channel, independent, sideband communications. Multi-plex operations, along with multiple channel moding, may be given further application in accordance with the principles of this present communications system invention. Take full note that the embodiments of this instant systematic invention are shown in composite block diagram forms which suitably formulate workable performance operations in that each block stage used is representative of a fundamental well known circuit functioning within far from traditional manners of signal processing arrangement.

The compositional duality of the duo-modulation technique, heretobefore almost unnoticed in having been totally unobserved by prior art technology, benefits most effectively from the high degree of in-path stage commonality that is exhibited, and fully exploited in the "pal channelizer pairing" operation of this invention.

It will be understood that various changes in the details, materials, and arrangements of parts (and steps), which have been herein described and illustrated in order to explain the nature of the invention, may be made by those skilled in the art within the principle and scope of the invention as expressed in the appended claims.

I claim:

1. A single sideband modulation system having an input band of audio information signals which system comprises:

a first translator including in tandem connection therein a first double balanced modulator and an audio bandpass filter of linear phase-frequency characteristic for passing sum frequency products only, a second translator connected to the output of said audio bandpass filter including in tandem connection therein a second double balanced modulator and a low pass filter of linear phase-frequency characteristic for passing sum and difference frequency products, a source of stable reference carrier intermediate frequency value $f_c$, a first frequency synthesis means connected to receive said carrier intermediate frequency and providing therefrom an audio frequency signal, $f_M$, where $f_M$ represents the mid-base band frequency value of a band of audio information signals, a product multiplier having a pair of inputs and one output, said output being connected to the carrier input of said second double balanced modulator, a first transfer means connecting the audio frequency signal $f_M$ output of said first synthesis means to the carrier input of said first double balanced modulator of said first translator, and said pair of inputs of said product multiplier, a third double balanced modulator having its signal input connected to the output of said audio bandpass filter of said first translator, a fourth double balanced modulator having its signal input connected to the output of said low pass filter of said second translator, a second frequency synthesis means connected to receive said audio frequency signal $f_M$ and providing therefrom an audio frequency signal $3f_M$, of same sinusoidal phase function as said signal $f_M$, a dual frequency coherent signal generator having a signal input, a carrier input and a pair of outputs, said signal input being connected to receive the output of said first synthesis means, signal $f_M$, and the output of said second synthesis means, signal $3f_M$, and said carrier input being connected to receive said intermediate frequency $f_c$, providing at the outputs thereof a pair of coherent carrier signals of $(f_c+f_M)$ and $(f_c+3f_M)$ differing in frequency by twice said audio signal $f_M$, a third transfer means connecting the higher frequency $(f_c+3f_M)$ output of said coherent generator to the carrier input of said third double balanced modulator and connecting the lower frequency $(f_c+f_M)$ output to the carrier input of said fourth double balanced modulator, a first R.F. bandpass filter of linear phase-frequency characteristics connected to the output of said third double balanced modulator and passing sum and difference frequency product outputs therefrom, a second R.F. bandpass filter of linear phase-frequency characteristics connected to the output of said fourth double balanced modulator and passing sum and difference frequency product outputs therefrom only of frequencies greater than said intermediate frequency $f_c$, amplitude equalization and time delay compensation means having its input connected to the output of said first R.F. bandpass filter, a linear difference combining network having a pair of inputs and one output, one input thereof connected to the output of said equalization and compensation means and the other input connected to the output of said second R.F. bandpass filter, whereby the resulting output of said combining network is a single sideband output of frequency content above said intermediate frequency, $f_c$, said content representing the transposition of said band of audio information signals.

2. A single sideband modulation system having an input band of audio information signals which system comprises:

a first translator including in tandem connection a first double balanced modulator and an audio bandpass filter of linear phase-frequency characteristic for passing sum frequency products only, a lagging 45° phase shift network connected to the output of said audio bandpass filter, a leading 45° phase shift network also connected to the output of said audio bandpass filter, a second translator connected to the output of said lagging phase shift network and having included in tandem therein a second double balanced modulator and a low pass filter of linear phase-frequency characteristic for passing sum and difference frequency products, a source of stable carrier intermediate frequency value $f_c$, a first frequency synthesis means connected to receive said reference frequency and providing therefrom an audio frequency signal $f_M$, where $f_M$ represents the mid-base band frequency value of a band of audio information signals, a product multiplier having a pair of inputs and one output, said output connected to the carrier input of said second double balanced modulator, a first transfer means connecting the audio frequency signal $f_M$ output of said first synthesis means to the carrier input of said first double balanced modulator of said first translator, and to one input of said product multiplier, a second frequency synthesis means connected to rereceive said audio frequency signal $f_M$ and providing therefrom a pair of outputs, one output being an audio frequency signal $2f_M$ of an opposite sinusoidal phase function to said signal $f_M$, and connected to the other input of said product multiplier, and the other output belng an audio frequency signal $4f_M$ of same sinusoidal phase function as said signal $f_M$, a third double balanced modulator having its signal input connected to the output of said leading phase shift network, a fourth double balanced modulator having its signal input connected to the output of said low pass filter of said second translator, a dual frequency coherent signal generator having a signal input, a carrier input and a pair of outputs, said signal input connected to receive the output of said first synthesis means $f_M$ and the other output of said second synthesis means $4f_M$, and said carrier input connected to receive said carrier intermediate frequency $f_c$, providing at the output thereof a pair of coherent carrier signals of $(f_c-f_M)$ and $(f_c-4f_M)$ differing in frequency by thrice said audio signal $f_M$, a third transfer means connecting the higher frequency $(f_c-f_M)$ output of said coherent generator to the carrier input of said third double balanced modulator and connecting the lower frequency $(f_c-4f_M)$ output to the carrier input of said fourth double balanced modulator, a first R.F. bandpass filter of linear phase-frequency characteristic connected to the output of said third double balanced modulator and passing sum and difference frequency product outputs therefrom, a second R.F. bandpass filter of linear phase-frequency characteristics connected to the output of said fourth double balanced modulator and passing only sum frequency product outputs therefrom, amplitude equalization and time delay compensation means having its input connected to the output of said first R.F. bandpass filter, a linear difference combining network having a pair of inputs and one output, one input thereof connected to the output of said equalization and compensation means and the other input connected to the output of said second R.F. bandpass filter, whereby the resulting output of said combining network is a single sideband output having a frequency content above said carrier intermediate frequency, $f_c$.

3. A method for generating a single sideband information signal which comprises the steps of:

generating an audio information signal frequency band having a mid-frequency of $f_M$, translating said audio signal frequency band into a full band of sum frequency products centered about a frequency value twice the mid-band frequency value $f_M$ of said audio signal frequency band, converting said full band into an audio frequency band containing sum frequency and one-half bandwidth difference frequency products positioned at about a frequency twice said mid-band frequency value $f_M$, up converting said full band of sum products into an R.F. signal of sum and difference frequency products thereof, up converting said audio frequency band containing sum and one-half bandwidth difference products into an R.F. signal of sum and difference products of said one-half bandwidth difference products of said audio frequency band and only sum frequency products of said sum products of said audio frequency band, compensating and equalizing said R.F. signal of sum and difference frequency products for phase and amplitude differences from other said R.F. signal, linearly difference combining of said other said R.F. signal and said compensated and equalized R.F. signal.

4. A method for generating a single sideband information bearing signal which comprises the steps of;

generating an audio information signal frequency band, of mid frequency, $f_M$, translating said audio signal frequency band into a full band of sum frequency products centered about a frequency value twice the mid-band frequency value $f_M$ of said audio signal frequency band, phase shifting said full band of sum frequency products to provide a quadrature signal thereof, converting in quadrature said quadrature signal of said full band into a full audio frequency band possessing sum and difference frequency products centered about a frequency thrice said mid-band frequency value, $f_M$, up converting said full band of sum products into an R.F. signal of sum and difference frequency products thereof, up converting said full audio frequency band possessing sum and difference frequency products into an R.F. signal of only sum frequency products thereof, compensating and equalizing said R.F. signal of sum and difference frequency products for phase and amplitude differences from said R.F. signal of only sum frequency products, linearly difference combining of said R.F signal of only sum frequency products and said compensated and equalized R.F. signal of sum and difference frequency products.

5. A single sideband demodulation system which comprises:

a direct channel including therein in tandem connection, amplitude equalization and time delay compensation means, an intermediate frequency double balanced modulator, an audio bandpass filter of linear phase-frequency characteristics for passing difference frequency products, a 45 degree phase shift network;

a translation channel including in tandem connection therein an intermediate frequency double balanced modulator, a first audio bandpass filter of linear phase-frefrequency characteristics for passing difference frequency products, an audio double balanced modulator, a second audio bandpass filter of linear phase-frequency characteristics for passing difference frequency products, a 45 degree phase shift network;

means for generating a stable reference intermediate carrier frequency signal, $f_c$, means for generating from said reference intermediate carrier frequency an audio reference carrier frequency signal $f_M$, where $f_M$ represents the mid-base band frequency value of a band of audio information signals, means for producing from said audio reference carrier frequency, $f_M$, an audio intermediate carrier signal of thrice said audio signal $f_M$ and of a quadrature phase function thereto, means for generating from said audio reference carrier frequency, $f_M$, an audio intermediate carrier frequency $3f_M$, and for generating from said reference intermediate carrier frequency $f_c$, a pair of coherent audio offset carrier intermediate frequency signals $(f_c-f_M)$ and $f_c-4f_M)$ frequency values each having same sinusoidal phase function as said audio reference carrier frequency signal, a first transfer means connecting the higher frequency $(f_c-f_M)$ of said pair of offset carrier intermediate frequency signals to the carrier input of said intermediate frequency double balanced modulator of said direct channel, and also connecting the lower frequency $(f_c-4f_M)$ of said pair of offset carrier intermediate frequency signals to the carrier input of said intermediate frequency double balanced modulator of said translation channel, second transfer means connecting said audio intermediate carrier signal, $3f_M$, to the carrier input of said audio double balanced modulator, a linear combining network having a pair of inputs and one output, one input connected to the output of said phase shift network of said direct channel and the other input connected to the output of said phase shift network of said translation channel, a double balanced modulator having its signal input connected to said output of said linear combining network and receiving said audio reference carrier frequency signal, $F_M$, as its carrier input, a low pass filter of linear phase-frequency characteristics connected to the output of said double balanced modulator and passing difference frequency products, whereby the resulting output of said low pass filter contains the demodulated frequency content of said band of information signals when a radio frequency band having frequency content representative of said audio information signals above said reference intermediate carrier frequency $f_c$, is applied simultaneously to the signal inputs of said direct and said translation channels.

6. A method of independent sideband modulation utilizing a differing pair of excitation techniques for the simultaneous generation of two single sideband channels bearing dissimilar intelligence signals which comprises the steps of:

generating a first audio information signal frequency band, simultaneously generating a second audo information signal frequency band, translating said first audio information signal frequency band into a one-half-bandwidth frequency band possessing all of said audio information signal, simultaneously translating in quadrature said first audio information signal frequency band into a quadrature signal form of said one-half bandwidth frequency band containing all of said information, simultaneously frequency converting said second audio information signal frequency band to center a full band signal of sum frequency products about a frequency twice the mid-band frequency value $f_M$ of said first and second audio information signal frequency band, phase shifting said full band signal of sum products to produce the quadrature full band signal thereof, linearly combining said one-half bandwidth frequency band and said full band signal of sum products, linearly combining said quadrature signal form of said one-half bandwidth frequency band and said quadrature full band signal of sum products, frequency transposing in quadrature said combined quadrature signal form into a full audio frequency band centered about a frequency thrice said mid-band frequency value $f_M$ and having sum and difference products of said quadrature one-half bandwidth frequency band and said quadrature full band signal, up frequency converting said combined signal form of one-half bandwidth frequency band and full band signal of sum products into an R.F. signal of sum and difference products of said combined signal form centered about a frequency less than a reference carrier intermediate frequency value $f_c$ by said mid-band frequency value $f_M$, up frequency converting said full audio frequency band into an R.F. signal constituting sum frequency products of said full audio frequency band centered about same frequency value as said sum and difference products of said combined signal form, compensating and equalizing said sum and difference products of said combined signal form for phase and amplitude differences from said sum frequency products of said full audio frequency band, linearly difference combining said sum frequency products of said full audio frequency band and the compensated and equalized sum and difference products of said combined signal form.

References Cited

UNITED STATES PATENTS

| | | | |
|---|---|---|---|
| 2,960,573 | 11/1960 | Hodgson et al. | |
| 3,217,256 | 11/1965 | Palatinus | 325—138 |
| 3,418,580 | 12/1968 | Brooks | 325—137 |

ROBERT L. GRIFFIN, Primary Examiner

A. J. MAYER, Assistant Examiner

U.S. Cl. X.R.

179—15; 325—50